US012623230B2

(12) United States Patent
Kang et al.

(10) Patent No.: US 12,623,230 B2
(45) Date of Patent: May 12, 2026

(54) FOOD DISPOSER AND OPERATING METHOD OF THE FOOD DISPOSER

(71) Applicant: Samsung Electronics Co., Ltd., Suwon-si (KR)

(72) Inventors: Mijo Kang, Suwon-si (KR); Jungwon Choi, Suwon-si (KR); Kyungah Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 375 days.

(21) Appl. No.: 18/222,018

(22) Filed: Jul. 14, 2023

(65) Prior Publication Data

US 2024/0017269 A1 Jan. 18, 2024

Related U.S. Application Data

(63) Continuation of application No. PCT/KR2023/009945, filed on Jul. 12, 2023.

(30) Foreign Application Priority Data

Jul. 13, 2022 (KR) ........................ 10-2022-0086390
Jan. 11, 2023 (KR) ........................ 10-2023-0004326

(51) Int. Cl.
*B02C 25/00* (2006.01)
*B02C 18/00* (2006.01)
*F26B 17/10* (2006.01)

(52) U.S. Cl.
CPC .......... *B02C 25/00* (2013.01); *B02C 18/0092* (2013.01); *F26B 17/103* (2013.01)

(58) Field of Classification Search
CPC ... B02C 25/00; B02C 18/0092; F26B 17/103; F26B 3/04; F26B 3/20; F26B 9/003; F26B 2200/02
See application file for complete search history.

(56) References Cited

U.S. PATENT DOCUMENTS 8,707,862 B1 * 4/2014 Oliver .................. A47J 36/165 99/348
2008/0197059 A1 * 8/2008 Mallett .................. A61B 50/36 209/702

(Continued)

FOREIGN PATENT DOCUMENTS

JP 10-137720 5/1998
JP 2000-126740 5/2000

(Continued)

OTHER PUBLICATIONS

PCT/ISA/220; PCT/ISA210; PCT/ISA/237 dated Oct. 12, 2023 in International Patent Application No. PCT/KR2023/009945.

*Primary Examiner* — Omeed Alizada
(74) *Attorney, Agent, or Firm* — STAAS & HALSEY LLP

(57) ABSTRACT

A food disposer and an operating method of a food disposer. The method includes measuring a distance from a distance sensing module to a by-product stored in a storage container, through the distance sensing module, which is arrangeable relative to a cover that seals an upper portion of the storage container and spaced apart from a transfer pipe by a certain distance, and outputting a notification related to emptying of the by-product from the storage container based on the measured distance being less than or equal to a critical distance.

19 Claims, 31 Drawing Sheets

(56) References Cited

U.S. PATENT DOCUMENTS

| | | | | |
|---|---|---|---|---|
| 2014/0306042 | A1* | 10/2014 | Chesack | E03C 1/2665 241/36 |
| 2021/0270600 | A1* | 9/2021 | Yoshioka | G01S 17/46 |
| 2023/0034798 | A1* | 2/2023 | Choi | G01S 7/4813 |
| 2023/0162588 | A1* | 5/2023 | Keller | B65F 1/14 100/45 |

FOREIGN PATENT DOCUMENTS

| | | |
|---|---|---|
| JP | 2003-53306 | 2/2003 |
| KR | 10-2007-0006258 | 1/2007 |
| KR | 10-0683936 | 2/2007 |
| KR | 10-0715346 | 5/2007 |
| KR | 10-2010-0008059 | 1/2010 |
| KR | 10-2010-0093278 | 8/2010 |
| KR | 20-0464935 | 1/2013 |
| KR | 10-1781518 | 9/2017 |
| KR | 10-1800006 | 11/2017 |
| KR | 10-1802141 | 12/2017 |
| KR | 10-2018-0073808 | 7/2018 |
| KR | 10-2019-0000244 | 1/2019 |
| KR | 10-2021-0078612 | 6/2021 |
| KR | 10-2023-0095230 | 6/2023 |

* cited by examiner

FIG. 20

2001

| MEASURED DISANCE | LOADING AMOUNT | LOADING RATIO |
| --- | --- | --- |
| 240mm | 1L | 25% |
| 180mm | 2L | 50% |
| 80mm | 4L | 100% |

FOOD DISPOSER AND OPERATING METHOD OF THE FOOD DISPOSER

CROSS-REFERENCE TO RELATED APPLICATION

This application is a continuation application, under 35 U.S.C. § 111 (a), of international application No. PCT/KR2023/009945, filed on Jul. 12, 2023, which claims priority under 35 U.S.C. § 119 to Korean Patent Application No. 10-2022-0086390, filed on Jul. 13, 2022 and Korean Patent Application No. 10-2023-0004326, filed on Jan. 11, 2023, the disclosures of which are incorporated herein by reference in their entireties.

TECHNICAL FIELD

An embodiment of the disclosure relates to a food disposer and an operating method of the food disposer.

BACKGROUND ART

A food disposer refers to a device that reduces the amount of food waste by drying, pulverization, microbial fermentation, and the like. In general, by-products produced in a food disposer have to be collected and transferred to a storage box by a user. Because the user has the inconvenience of having to manually transfer by-products to the storage box whenever such by-products are produced, there is a need for automatic transfer of the by-products.

However, when the by-products are automatically transferred to the storage box, the by-products may overflow from the storage box when the user does not empty the storage box within an appropriate time. Accordingly, it may be inconvenient for the user to periodically check whether the storage box is full of by-products.

DESCRIPTION OF EMBODIMENTS

Solution to Problem

According to an embodiment of the disclosure, a food disposer includes a disposal assembly configured to produce a by-product by drying or pulverizing food, a transfer pipe, connectable to the disposal assembly, to transfer the by-product produced in the disposal assembly while the transfer pipe is connected to the disposal assembly, a storage container, connectable to a lower portion of the transfer pipe, to store the by-product in the disposal assembly transferred through the transfer pipe while the storage container is connected to the lower portion of the transfer pipe, a distance sensing module arrangeable relative to a cover that seals an upper portion of the storage container and spaced apart from the transfer pipe by a certain distance, the distance sensing module being configured to measure a distance from the distance sensing module to the by-product stored in the storage container, and at least one processor configured to control an output interface to output a notification related to emptying of the by-product from the storage container based on a distance from the distance sensing module to the by-product, which is measured by the distance sensing module, being less than or equal to a critical distance.

According to an embodiment of the disclosure, an operating method of a food disposer includes measuring, by a distance sensing module, a distance from the distance sensing module to a by-product that is produced by a disposal assembly by drying or pulverizing food and stored in a storage container, the distance sensing module being arrangeable relative to a cover that seals an upper portion of the storage container and spaced apart from a transfer pipe that transfers the by-product from the disposal assembly to the storage container by a certain distance, and outputting a notification related to emptying of the by-product from the storage container based on the measured distance being less than or equal to a critical distance.

BRIEF DESCRIPTION OF DRAWINGS

FIG. 20 is a diagram showing a table for identifying a loading amount of a by-product, according to an embodiment of the disclosure.

MODE OF DISCLOSURE

Figure 1:
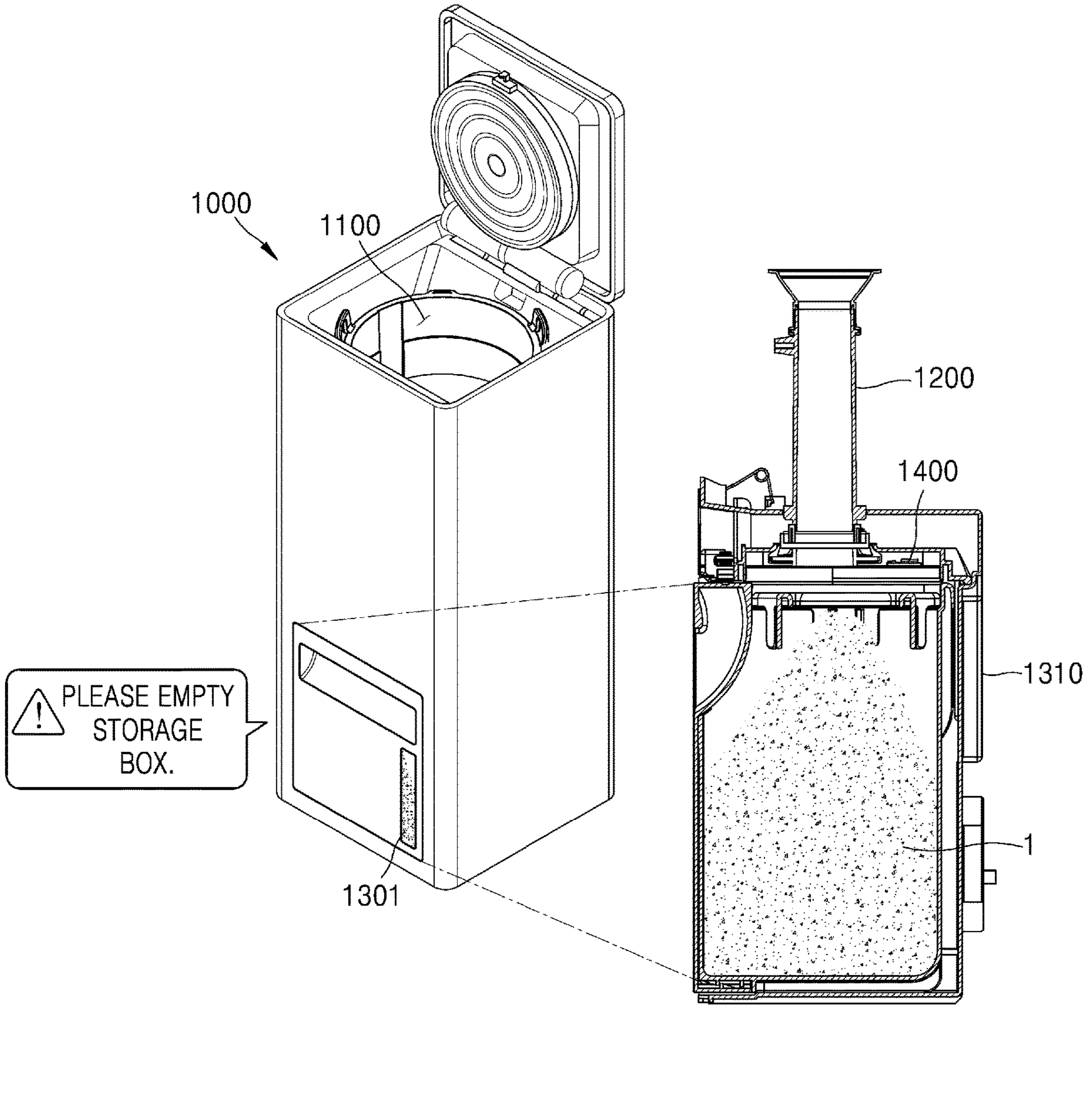
FIG. 1 is a diagram for describing a food disposer according to an embodiment of the disclosure.

The terms as used herein are briefly described, and an embodiment of the disclosure is described in detail.

As for the terms as used herein, common terms that are currently widely used are selected as much as possible while taking into account functions in an embodiment of the disclosure. However, the terms may vary depending on the intention of those of ordinary skill in the art, precedents, the emergence of new technology, and the like. Also, in a specific case, there are also terms arbitrarily selected by the applicant. In this case, the meaning of the terms will be described in detail in the description of the embodiment of the disclosure. Therefore, the terms as used herein should be defined based on the meaning of the terms and the description throughout the disclosure rather than simply the names of the terms.

Throughout the disclosure, the expression "at least one of a, b or c" indicates only a, only b, only c, both a and b, both a and c, both b and c, all of a, b, and c, or variations thereof.

Throughout the disclosure, the expression "a portion includes a certain element" means that a portion further includes other elements rather than excludes other elements unless otherwise stated. Also, the terms such as "portion" and "module" as used herein mean units that process at least one function or operation, and may be implemented as hardware, software, or a combination of hardware and software.

Hereinafter, an embodiment of the disclosure will be described in detail with reference to the accompanying drawings, so that those of ordinary skill in the art may easily carry out the disclosure. However, an embodiment of the disclosure may be implemented in various different forms and is not limited to the embodiment described herein. In order to clearly explain an embodiment of the disclosure, parts irrelevant to the description are omitted in the drawings, and similar reference numerals are assigned to similar parts throughout the disclosure.

FIG. 1 is a diagram for describing a food disposer 1000 according to an embodiment of the disclosure.

The food disposer 1000 according to an embodiment of the disclosure may be a device that reduces the amount of food waste by drying or pulverizing food. Food may include food garbage or food waste. The food disposer 1000 according to an embodiment of the disclosure may include a disposal assembly 1100, a transfer pipe 1200, a storage container 1310, a distance sensing module 1400, and at least one processor (not shown), but the disclosure is not limited thereto.

The disposal assembly 1100 may be a module that produces a by-product 1 by drying or pulverizing food input by a user. The transfer pipe 1200 may be a part that transfers the by-product 1 produced in the disposal assembly 1100 to the storage container 1310. The storage container 1310 may be a part that stores the by-product 1 produced in the disposal assembly 1100. Hereinafter, the storage container 1310 may also be referred to as a storage box (or a storage tank). That is, the food disposer 1000 according to an embodiment of the disclosure may be a device that automatically transfers the by-product 1 produced by drying or pulverizing food to the storage container 1310 without user intervention. Accordingly, according to an embodiment of the disclosure, the inconvenience of the user having to directly transfer the by-product 1 to the storage container 1310 whenever food waste is disposed of may be reduced.

The by-product 1 transferred through the transfer pipe 1200 may be accumulated in the storage container 1310 in the form of mountain peak. Because the by-product 1 is accumulated in the form of mountain peak, the by-product 1 may overflow even when the by-product 1 does not fill the storage container 1310. For example, even when the by-product 1 does not appear to fill the storage container 1310 through the transparent window 1301 provided on one side of the storage container 1310, the by-product 1 may substantially overflow near the transfer pipe 1200.

According to an embodiment of the disclosure, in order to prevent the by-product 1 automatically transferred through the transfer pipe 1200 from overflowing in the storage container 1310, the food disposer 1000 may provide an emptying notification to the user in an appropriate time, may control the operation of the disposal assembly 1100, or may control the opening and closing of the transfer pipe 1200.

For example, the at least one processor of the food disposer 1000 may use the distance sensing module 1400 to identify the loading height of the by-product 1 in the storage container 1310. When the loading height of the by-product 1 is greater than a critical height, the food disposer 1000 may provide a notification to empty the by-product 1 of the storage container 1310 (e.g., 'Empty the storage box'), may control the disposal assembly 1100 to stop disposing of food, or may control the transfer pipe 1200 to be closed. In this case, even though the user does not periodically check the amount of the by-product 1 loaded in the storage container 1310, the overflow of the by-product 1 may be prevented by emptying the storage container 1310 when the notification is provided. The operation by which the food disposer 1000 provides the emptying notification by using the distance sensing module 1400 will be described below in detail with reference to FIG. 8.

The distance sensing module 1400 according to an embodiment of the disclosure may be provided in a cover that seals the upper portion of the storage container 1. In this case, when the distance sensing module 1400 is close to the transfer pipe 1200, foreign matters may splash on the distance sensing module 1400 when the by-product 1 falls. Therefore, the distance sensing module 1400 may be apart from the transfer pipe 1200 by a certain distance. The distance sensing module 1400 may measure the distance to the by-product 1 stored in the storage container 1310, and may transmit information about the measured distance to the at least one processor. The distance sensing module 1400 will be described in detail below with reference to FIG. 4.

Hereinafter, a configuration of a food disposer 1000 according to an embodiment of the disclosure will be described in more detail with reference to FIG. 2.

Figure 2:
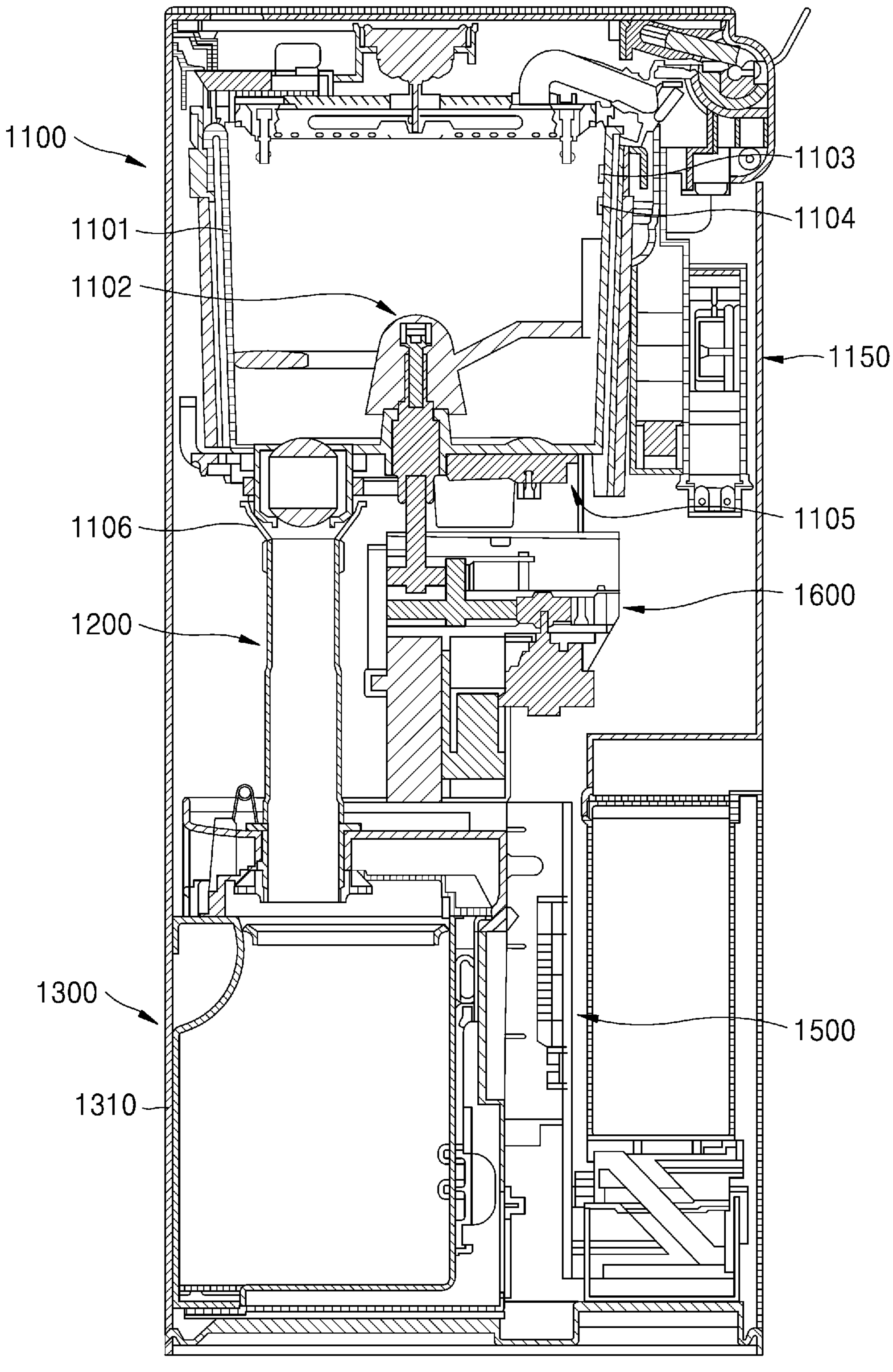
FIG. 2 is a cross-sectional view of a food disposer according to an embodiment of the disclosure.

FIG. 2 is a cross-sectional view of the food disposer 1000 according to an embodiment of the disclosure.

Referring to FIG. 2, the food disposer 1000 may include a disposal assembly 1100, a deodorization assembly 1150, a transfer pipe 1200, a storage assembly 1300 including a storage container 1310, a distance sensing module 1400, at least one processor 1500, and a driver 1600. However, all of the elements illustrated in FIG. 2 are not essential elements. The food disposer 1000 may be implemented with more elements than the elements illustrated in FIG. 2, or may be implemented with fewer elements than the elements illustrated in FIG. 2. The respective elements will be described below.

The disposal assembly 1100 may be a device that stores the food and dries, pulverizes, or agitates the food. The disposal assembly 1100 may include a storing portion 1101, an agitator 1102, a temperature sensor 1103, a humidity sensor 1104, a heater 1105, and an opening/closing portion 1106, but the disclosure is limited thereto.

According to an embodiment of the disclosure, the storing portion 1101 may be a space in which food is stored. A user may open an upper cover of the food disposer 1000 and put food into the storing portion 1101. The storing portion 1101 may have a cylindrical shape, but the disclosure is not limited thereto.

According to an embodiment of the disclosure, the agitator 1102 may include a rotary grinder or a power transmission member. One end of the power transmission member may be connected to the rotary grinder, and the other end of the power transmission member may be connected to the driver 1600. The rotary grinder may include a plurality of blades. For example, the blades may be provided at different heights from each other. The disposal assembly 1100 may pulverize or agitate the food in the storing portion 1101 by rotating the rotary grinder.

According to an embodiment of the disclosure, the temperature sensor 1103 or the humidity sensor 1104 may be provided to sense the temperature or humidity within the storing portion 1101. The at least one processor 1500 may obtain temperature information or humidity information of the storing portion 1101 through the temperature sensor 1103 or the humidity sensor 1104. The at least one processor 1500 may use the temperature information or the humidity information to control the operations of the elements used to dispose of the food, such as the agitator 1102, a convection fan, a fan driver, the heater 1005, and the driver 1600.

The heater 1105 may be provided adjacent to the outer surface of the storing portion 1101. The heater 1105 may be provided, for example, below the storing portion 1101, but the disclosure is not limited thereto. The heater 1105 may generate heat by a hot wire provided therein. When the temperature inside the storing portion 1101 is increased by the heater 1105, moisture in the food may be evaporated and dried. The evaporated moisture may be discharged to the deodorization assembly 1150.

The opening/closing portion 1106 may be provided to discharge, from the storing portion 1101, a by-product produced after the disposal of the food. The opening/closing portion 1106 may be provided in a lower portion of the storing portion 1101. The opening/closing portion 1106 may close a discharge port of the disposal assembly 1100 while the food is being disposed of in the storing portion 1101, and may open the discharge port of the disposal assembly 1100 after the disposal of the food is completed. The opening/closing portion 1106 may include, for example, a ball valve, but the disclosure is not limited thereto. The ball valve in the opening/closing portion 1106 may be closed or opened by the driver 1600. In a normal mode in which the food disposer 1000 is not operating, the discharge port of the disposal assembly 1100 may be in a state of being closed by the opening/closing portion 1106. The opening/closing portion 1106 will be described in more detail below with reference to FIGS. 16 and 17.

The deodorization assembly 1150 may be a device that filters air containing an odor generated in the storing portion 1101 of the disposal assembly 1100. The deodorization assembly 1150 may include at least one filter. The air filtered by the deodorization assembly 1150 may be discharged to the outside through an exhaust hole.

The transfer pipe 1200 may be a part that connects the storing portion 1101 of the disposal assembly 1100 to the storage container 1310. The by-product produced after disposal in the storing portion 1101 may be transferred to the storage container 1310 along the transfer pipe 1200. When the by-product is transferred from the storing portion 1101 to the storage container 1310, the by-product may be transferred in a free fall manner.

The storage assembly 1300 including the storage container 1310 may be a part that receives, from the storing portion 1101, the by-product produced by drying or pulverizing food in the disposal assembly 1100 and stores the received by-product. The storage assembly 1300 may have a sealed structure so that the stored by-product or odor that may be generated from the by-product do not leak to the outside.

The food disposer 1000 may include the at least one processor 1500. The food disposer 1000 may include one processor or may include a plurality of processors. The at least one processor 1500 according to the disclosure may include at least one of a central processing unit (CPU), a graphics processing unit (GPU), an accelerated processing unit (APU), a many integrated core (MIC), a digital signal processor (DSP), or a neural processing unit (NPU). The at least one processor 1500 may be implemented in the form of an integrated system-on-chip (SoC) including one or more electronic components. The at least one processor 1500 may each be implemented as separate hardware (H/W). The at least one processor 1500 may be referred to as a microcomputer (MICOM) (a microprocessor computer or a microprocessor controller), a microprocessor unit (MPU), or a microcontroller unit (MCU).

The at least one processor 1500 according to the disclosure may be implemented as a single core processor or may be implemented as a multicore processor.

The at least one processor 1500 may control overall operations of the food disposer 1000. For example, the at least one processor 1500 may control rotation of the agitator 1102 by operating the driver 1600 so as to pulverize or agitate food. In order to heat the storing portion 1101, the at least one processor 1500 may control the heater 1105 to heat the hot wire. The at least one processor 1500 may control the operation of the convection fan to convect gas in the storing portion 1101. The at least one processor 1500 may control the driver 1600 to open the opening/closing portion 1106 so as to transfer the by-product remaining after disposal of food to the storage container 1310.

In addition, when the distance from the distance sensing module 1400 provided in a cover (hereinafter referred to as a storage container cover) that seals the upper portion of the storage container 1310 to the by-product stored in the storage container 1310 is less than a critical distance, the at least one processor 1500 may control an output interface to output a notification related to emptying of the by-product from the storage container 1310.

Hereinafter, the transfer pipe 1200 and the storage assembly 1300 will be described in more detail with reference to FIG. 3.

Figure 3:
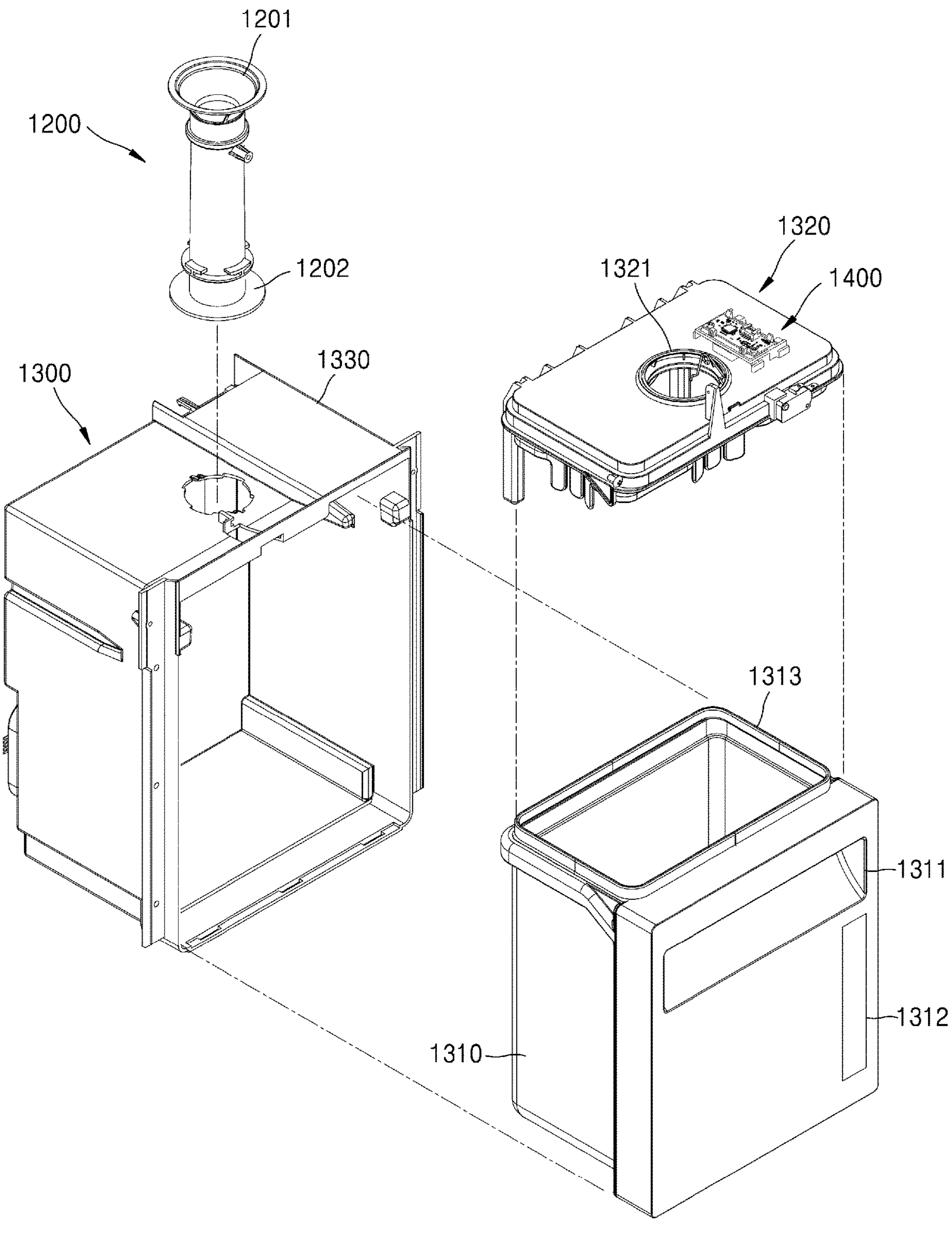
FIG. 3 is a diagram for describing a transfer pipe and a storage assembly according to an embodiment of the disclosure.

FIG. 3 is a diagram for describing the transfer pipe 1200 and the storage assembly 1300 according to an embodiment of the disclosure.

According to an embodiment of the disclosure, the transfer pipe 1200 may include an upper gasket 1201 or a lower gasket 1202. The upper gasket 1201 may be provided between the transfer pipe 1200 and the disposal assembly 1100. That is, the upper gasket 1201 may come into contact with the discharge port of the disposal assembly 1100. The lower gasket 1202 may be provided between the storage container cover 1320 and the transfer pipe 1200. The lower gasket 1202 is in contact with the storage container cover 1320, but may be apart from the storage container cover 1320 according to the movement of the storage container cover 1320. Because the transfer pipe 1200 includes the upper gasket 1201 and the lower gasket 1202, airtightness inside the transfer pipe 1200 may be improved. That is, the upper gasket 1201 and the lower gasket 1202 may seal the smell of food or by-product. According to an embodiment of the disclosure, the transfer pipe 1200 may be fixed to the storage container case 1330. Therefore, even when the storage container cover 1320 moves due to the mounting or detachment of the storage container 1310, the transfer pipe 1200 may be fixed to the storage container case 1330 and be immobile.

The storage assembly 1300 may include the storage container 1310, the storage container cover 1320, and the storage container case 1330, but the disclosure is not limited thereto. The storage container 1310 may include a gripping portion 1311 or a transparent window 1312. A user may mount or detach the storage container 1310 to or from the storage container case 1330 by using the gripping portion 1311. The transparent window 1312 may be provided at a position where the transparent window 1312 is seen from the outside when the storage container 1310 is mounted to the storage container case 1330. The transparent window 1312 may be formed in the height direction of the storage container 1310 so that the user may observe the height of the by-product thereinside.

According to an embodiment of the disclosure, the storage container 1310 may further include a handle portion 1313. The handle portion 1313 may be, for example, a part that the user may grip when detaching and transporting the storage container 1310. For example, a portion of the handle portion 1313 may be rotatably fixed to upper portions of both side surfaces of the storage container 1310. The handle portion 1313 may be provided to face both sides of the upper end of the storage container 1310 when the user does not transport the storage container 1310 or when the storage container 1310 is mounted to the storage container case 1330. The handle portion 1313 may be located so as not to protrude upward from the storage container 1310 when the user does not grip the handle portion 1313.

The storage container cover 1320 may be provided to seal the upper portion of the storage container 1310 when the storage container 1310 is mounted to the storage container case 1330. The storage container cover 1320 may be fixed to the upper portion of the storage container case 1330 in the internal space. According to an embodiment of the disclosure, the storage container cover 1320 may include the distance sensing module 1400 that senses the amount of the by-product in the storage container 1310. The distance sensing module 1400 may be spaced apart from a transfer pipe penetration portion 1321 by a certain distance. That is, the distance sensing module 1400 may be provided at a position spaced apart from the transfer pipe 1200 by a certain distance when the storage container 1310 is mounted to the storage container case 1330. According to an embodiment of the disclosure, because the distance sensing module 1400 is spaced apart from the transfer pipe 1200 or the transfer pipe penetration portion 1321 by a certain distance, the by-product may be prevented from splashing on the distance sensing module 1400 when the by-product falls into the storage container 1310 through the transfer pipe 1200. Accordingly, according to an embodiment of the disclosure, deterioration in performance of the distance sensing module 1400 due to foreign matters (by-products) may be prevented. The distance sensing module 1400 will be described in more detail below with reference to FIG. 4.

According to an embodiment of the disclosure, the storage container case 1330 may have an internal space formed so that the storage container 1310 is mounted thereto. The open surface of the storage container case 1330 may be a portion to or from which the storage container 1310 is mounted or detached. For example, the storage container 1310 may be detached from the open surface of the storage container case 1330 and may be mounted to the open surface of the storage container case 1330.

Figure 4:
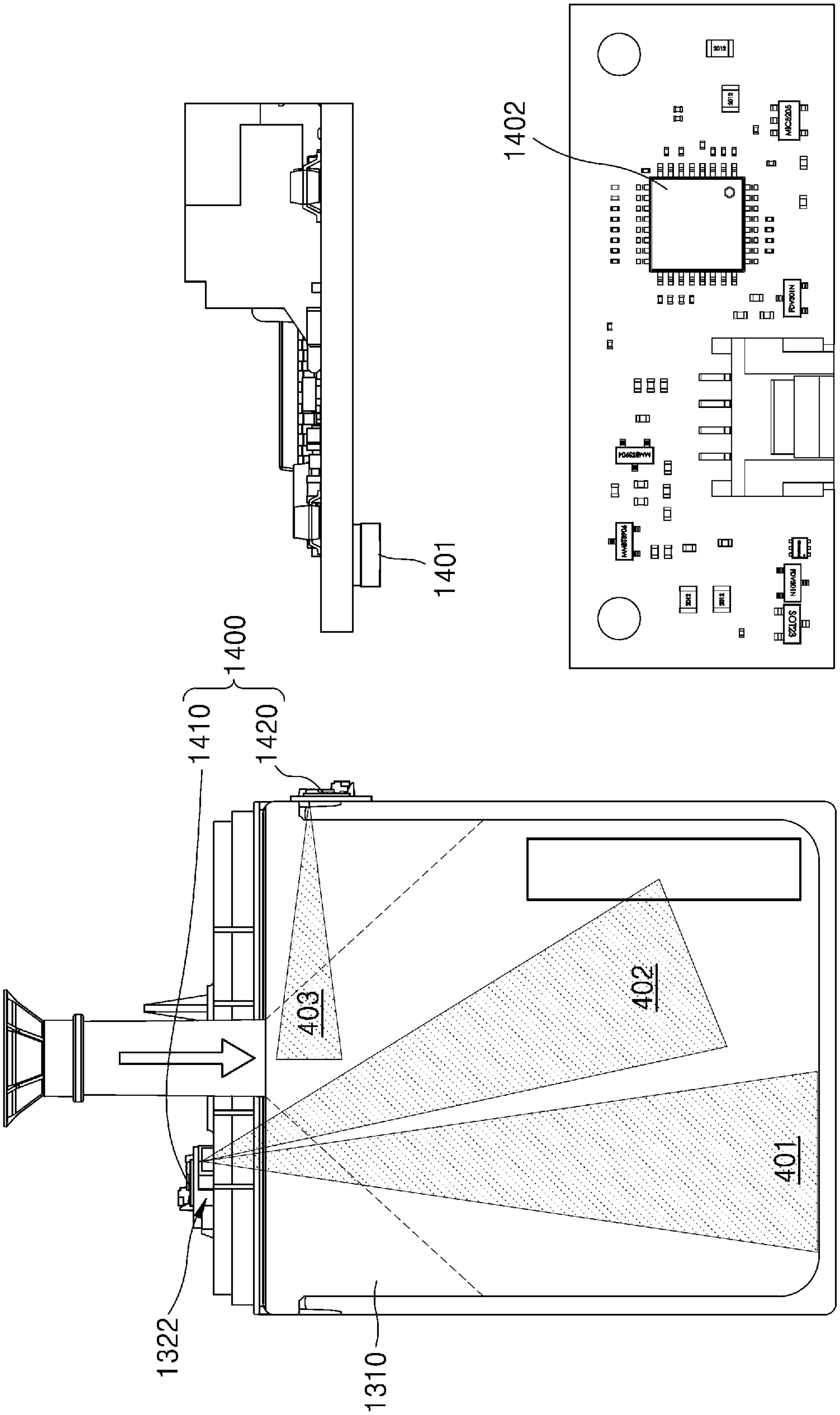
FIG. 4 is a diagram for describing a distance sensing module according to an embodiment of the disclosure.

FIG. 4 is a diagram for describing the distance sensing module 1400 according to an embodiment of the disclosure.

The distance sensing module 1400 according to an embodiment of the disclosure may be a module that senses a distance to an object (e.g., by-product). The distance sensing module 1400 may include at least one of an optical sensor (e.g., a time-of-flight (ToF) sensor, a position sensitive device (PSD), etc.), a light detection and ranging (LIDAR) sensor, or an ultrasonic sensor, but the disclosure is not limited thereto.

The distance sensing module 1400 according to an embodiment of the disclosure may be provided on at least one of the upper end, the side surface, or the rear surface of the storage container 1310. The food disposer 1000 may include one distance sensing module 1400 or may include a plurality of distance sensing modules. Hereinafter, for convenience of explanation, the distance sensing module 1400 provided on the storage container cover 1320 that seals the upper portion of the storage container 1310 is defined as a first distance sensing module 1410, and the distance sensing module 1400 provided on one side surface of the storage container 1310 is defined as a second distance sensing module 1420. The food disposer 1000 according to an embodiment of the disclosure may include only one of the first distance sensing module 1410 and the second distance sensing module 1420, or may include both of the first distance sensing module 1410 and the second distance sensing module 1420.

According to an embodiment of the disclosure, the first distance sensing module 1410 and the second distance sensing module 1420 may be the same type of sensors or may be different types of sensors. For example, both of the first distance sensing module 1410 and the second distance sensing module 1420 may be ToF sensors. Alternatively, the first distance sensing module 1410 may be a ToF sensor and the second distance sensing module 1420 may be an ultrasonic sensor, but the disclosure is not limited thereto. Hereinafter, for convenience of explanation, a case where both of the first distance sensing module 1410 and the second distance sensing module 1420 are ToF sensors will be described as an example.

According to an embodiment of the disclosure, the storage container cover 1320 may further include a seating portion 1322 on which the first distance sensing module 1410 is seated. According to an embodiment of the disclosure, the seating portion 1322 may be designed to have a thickness greater than a threshold value. When the seating portion 1322 is designed to be thick, the distance from the bottom surface of the storage container 1310 to the first distance sensing module 1410 increases. Accordingly, when a by-product is put into the storage container 1310, it is possible to prevent foreign matters from being attached to the first distance sensing module 1410 or to prevent moisture from penetrating into the first distance sensing module 1410.

According to an embodiment of the disclosure, the first distance sensing module 1410 may be provided horizontally on the storage container cover 1320. In addition, the first distance sensing module 1410 may be tilted toward the transfer pipe 1200. For example, because the by-product is accumulated in the form of mountain peak around the position of the transfer pipe 1200, the first distance sensing module 1410 may be mounted to be tilted at a certain angle so as to sense the peak height of the by-product. In this case, the certain angle may be determined by taking into account the by-product stacking shape (e.g., gentle or inclined), the peak height of the by-product, the moving speed of the by-product, and the mounting position of the first distance sensing module 1410. The first distance sensing module 1410 tilted at the certain angle will be described in more detail below with reference to FIG. 10.

When the first distance sensing module 1410 is provided horizontally on the storage container cover 1320, the sensing area of the first distance sensing module 1410 may be a first range 401. When the first distance sensing module 1410 is tilted at the certain angle on the storage container cover 1320, the sensing area of the first distance sensing module 1410 may be a second range 402. Therefore, when the same amount of a by-product is accumulated in the storage container 10, a second distance measured when the first distance sensing module 1410 is tilted at a certain angle may be less than a first distance measured when the first distance sensing module 1410 is provided horizontally.

On the other hand, the sensing area of the second distance sensing module 1420 provided on the side surface of the storage container 1310 may be a third range 403. Therefore, in the case of using the second distance sensing module 1420, the food disposer 1000 may identify whether the by-product is accumulated to the height at which the second distance sensing module 1420 is located (whether the by-product reaches the peak). The operation of the food disposer 1000 using the second distance sensing module 1420 will be described in detail below with reference to FIGS. 12 and 13.

According to an embodiment of the disclosure, the distance sensing module 1400 may include a sensor 1401 and an MCU 1402. The sensor 1401 may include a light emitter that emits light and a light receiver that receives incident light. The light emitter and the light receiver may be configured as one module or may be configured separately.

The MCU 1402 may process raw data obtained from the sensor 1401. According to an embodiment of the disclosure, the MCU 1402 may directly transmit the raw data to the at least one processor 1500 (e.g., a main processor) of the food disposer 1000, and may transmit a result of preprocessing the raw data to the main processor. For example, the MCU 1402 may transmit, to the main processor, distance values measured for a certain time or a certain number of distance values. In addition, the MCU 1402 may transmit, to the main processor, an average value of the remaining distance values excluding the highest value and the lowest value among the distance values measured for the certain time or an average value of the remaining distance values excluding the highest value and the lowest value among the certain number of distance values. Because the sensing area of the sensor 1401 has a conical shape, a difference may occur between a distance value of an edge portion of the sensing area and a distance value of a central portion of the sensing area. Accordingly, in order to increase the accuracy of the distance value, the MCU 1402 may output the average value to the main processor. However, the distance value that is output by the MCU 1402 is not limited to the average value, and the MCU 1402 may also output, for example, a median value, a minimum value, or a maximum value.

According to an embodiment of the disclosure, the distance sensing module 1400 may communicate with the main processor through a universal asynchronous receiver/transmitter (UART), but the disclosure is not limited thereto. The distance sensing module 1400 may perform communication through inter-integrated circuit (I2C).

According to an embodiment of the disclosure, the sensor 1401 may be provided on a first surface of the distance sensing module 1400, and the MCU 1402 may be provided on a second surface of the distance sensing module 1400. For example, the sensor 1401 may be provided on a surface facing the storage container 1310, and the MCU 1402 may be provided on a surface opposite thereto.

Hereinafter, a sensor case 1403 that adjusts the sensing area of the distance sensing module 1400 will be described with reference to FIG. 5.

Figure 5:
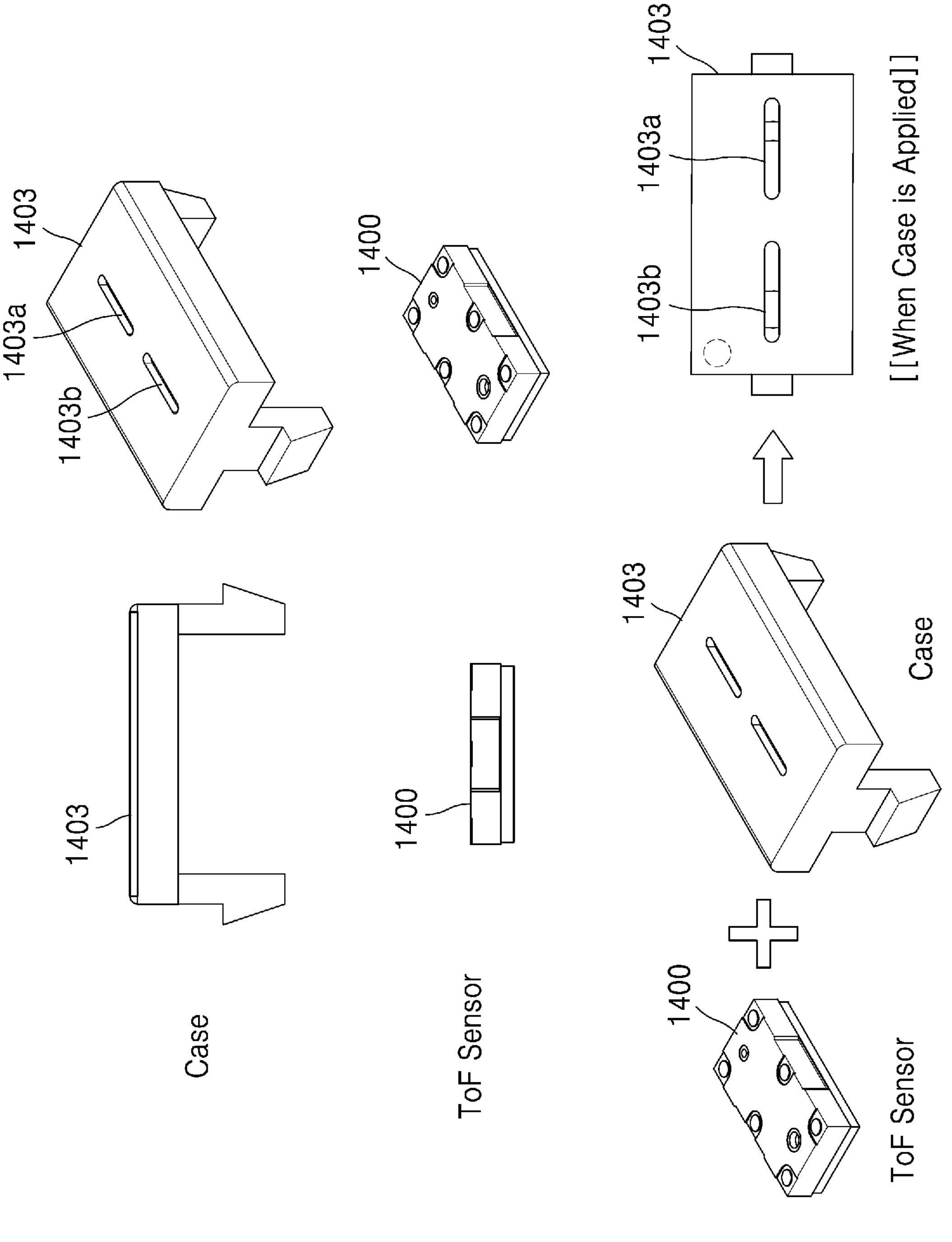
FIG. 5 is a diagram for describing a sensor case coupled to a distance sensing module, according to an embodiment of the disclosure.

FIG. 5 is a diagram for describing the sensor case 1403 coupled to the distance sensing module 1400, according to an embodiment of the disclosure. In FIG. 5, a case where the distance sensing module 1400 is a ToF sensor will be described as an example.

The sensing area of the ToF sensor, which is an example of the distance sensing module 1400, has a conical shape of about 20 degrees to about 30 degrees. However, in order to prevent an erroneous operation due to the sensing of the wall surface of the storage container cover 1320 or the storage container 1310, it may be necessary to adjust the sensing area of the distance sensing module 1400. Accordingly, according to an embodiment of the disclosure, the distance sensing module 1400 may be coupled to the sensor case 1403 and provided on one side surface of the storage container cover 1320 or the storage container 1310. The sensor case 1403 may include a light emitter slit 1403*a* through which some of light emitted by the light emitter passes and a light receiver slit 1403*b* through which some of light incident on the light receiver passes.

According to an embodiment of the disclosure, the sensing area of the distance sensing module 1400 may be adjusted through a first width of the light emitter slit 1403*a* and a second width of the light receiver slit 1403*b*. For example, as the first width of the light emitter slit 1403*a* and the second width of the light receiver slit 1403*b* become narrower, the sensing area of the distance sensing module 1400 may also become narrower. The first width of the light emitter slit 1403*a* may be equal to or different from the second width of the light receiver slit 1403*b*.

Figure 6A:
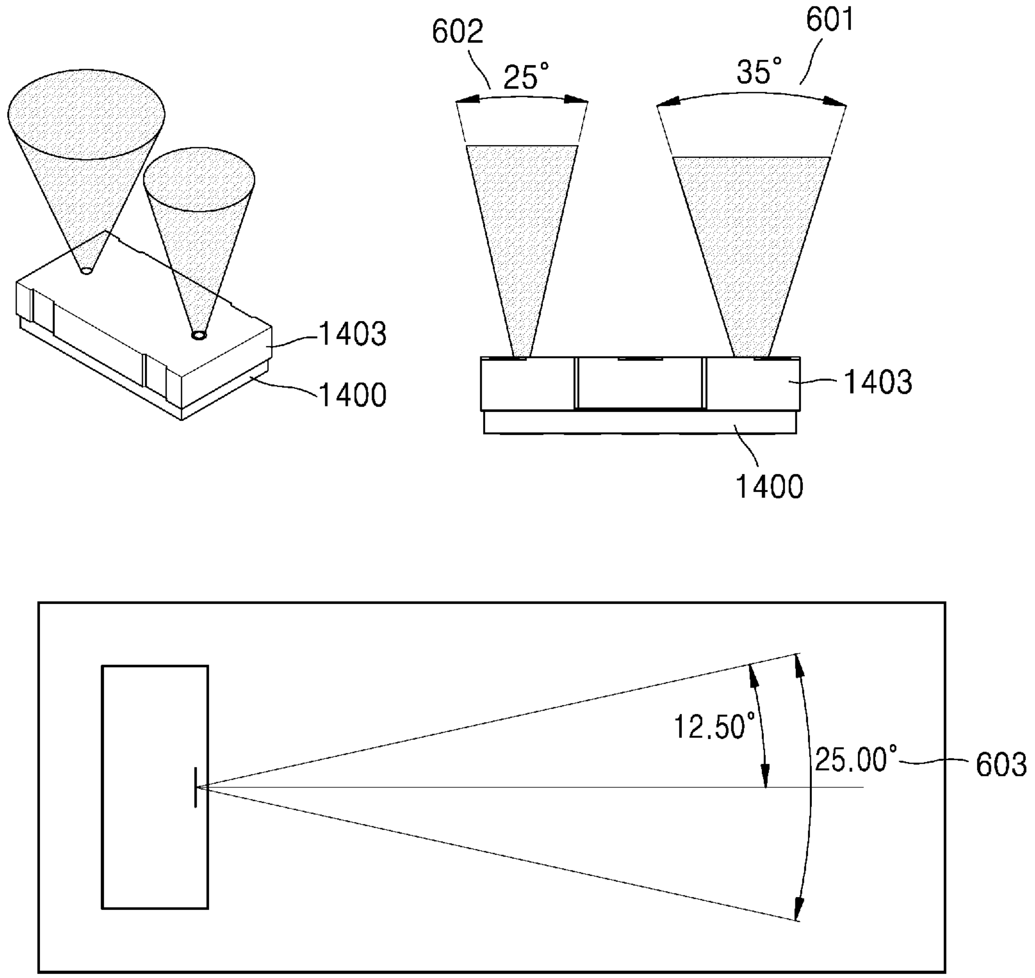
FIG. 6A is a diagram for describing a sensing area of the distance sensing module, according to an embodiment of the disclosure.
Figure 6B:
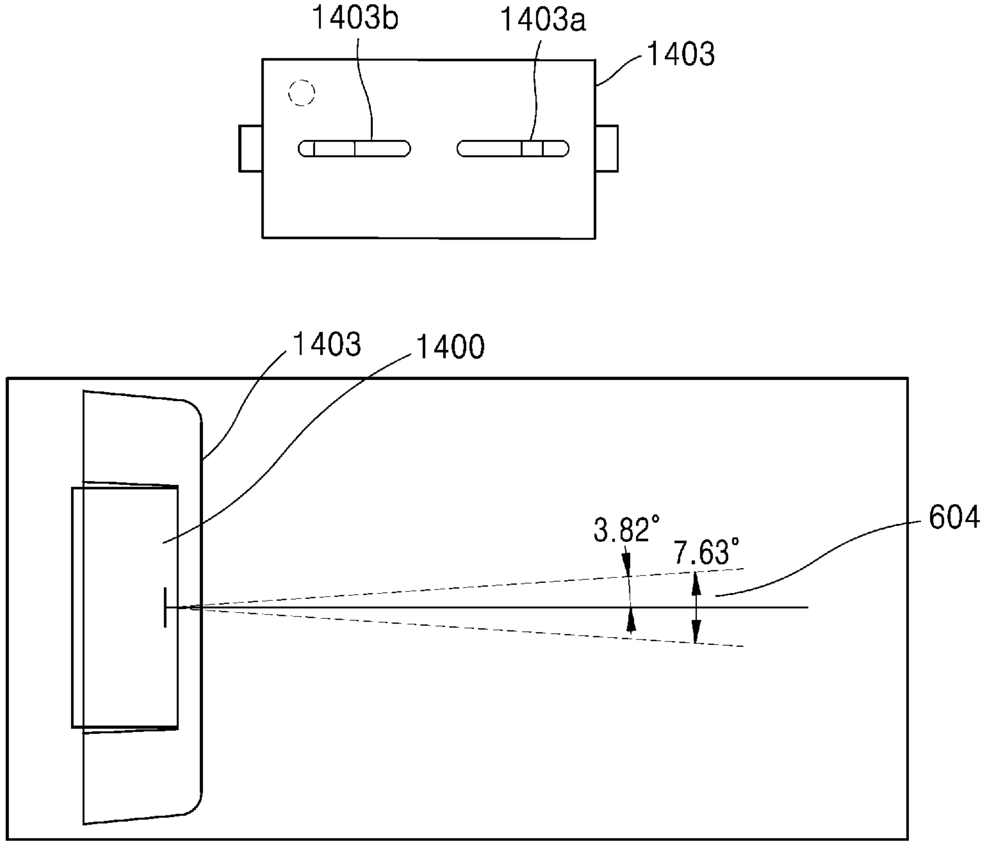
FIG. 6B is a diagram for describing the sensing area of the distance sensing module to which the sensor case is coupled, according to an embodiment of the disclosure.

Referring to FIGS. 6A and 6B, a change in the sensing area of the distance sensing module 1400 before and after the coupling of the sensor case 1403 will be described in detail.

FIG. 6A is a diagram for describing the sensing area of the distance sensing module 1400, according to an embodiment of the disclosure. The distance sensing module 1400 of FIG. 6A may be in a state in which the sensor case 1403 is not coupled thereto.

Referring to FIG. 6A, a field of view (FOV) 601 of the light emitter may be about 35 degrees, and an FOV 602 of the light receiver may be about 25 degrees. Light emitted by the light emitter in the measurement direction of the distance sensing module 1400 may be reflected from a target object (e.g., by-product) and incident on the light receiver, and the light receiver may receive incident reflected light and calculate the distance to the target object (e.g., byproduct) based on the received reflected light.

The sensing area in which the distance sensing module 1400 may sense the target object may be determined by the FOV of the light emitter and the FOV of the light receiver. In general, the sensing area of the distance sensing module 1400 may be determined similarly to the FOV of the light receiver. For example, the sensing area of the distance sensing module 1400 may be a range 603 of 25 degrees with respect to a normal line passing through the center of the light receiver.

FIG. 6B is a diagram for describing the sensing area of the distance sensing module 1400 to which the sensor case 1403 is coupled, according to an embodiment of the disclosure.

Referring to FIG. 6B, the sensor case 1403 may be coupled to the distance sensing module 1400 so as to reduce the sensing area of the distance sensing module 1400. The sensor case 1403 may include a light emitter slit 1403*a* through which light emitted by the light emitter passes and a light receiver slit 1403*b* through which light incident on the light receiver passes.

The light emitter slit 1403*a* may be formed to block some of the light emitted by the light emitter. That is, the light emitter slit 1403*a* may be formed to pass some of the light emitted by the light emitter and block the remaining part of the light emitted by the light emitter. For example, the light emitter slit 1403*a* may be formed to pass light emitted in a partial angle range of the FOV of the light emitter and block light emitted in the remaining angle range thereof.

The light receiver slit 1403*b* may be formed to block some of the light incident on the light receiver. That is, the light receiver slit 1403*b* may be formed to pass some of the light incident at the FOV of the light receiver and block the remaining part of the light incident at the FOV of the light receiver. For example, the light receiver slit 1403*b* may be formed to pass light incident in a partial angle range of the FOV of the light receiver and block light incident in the remaining angle range thereof.

Therefore, when the sensor case 1403 is coupled to the distance sensing module 1400, the sensing area of the distance sensing module 1400 may be reduced. For example, the sensing area of the distance sensing module 1400 to which the sensor case 1403 is coupled may be a range 604 of 7.63 degrees with respect to a normal line passing through the center of the light receiver. Because the sensing area of the distance sensing module 1400 is reduced after the coupling of the sensor case 1403, it is possible to prevent the distance sensing module 1400 from erroneously recognizing the distance to the wall surface of the storage container cover 1320 or the storage container 1310, instead of the distance to the by-product inside the storage container 1310.

According to an embodiment of the disclosure, the first width of the light emitter slit 1403*a* or the second width of the light receiver slit 1403*b* may be reduced, and thus, the sensing area of the distance sensing module 1400 may be adjusted to be smaller than the range of 7.63 degrees.

Figure 7:
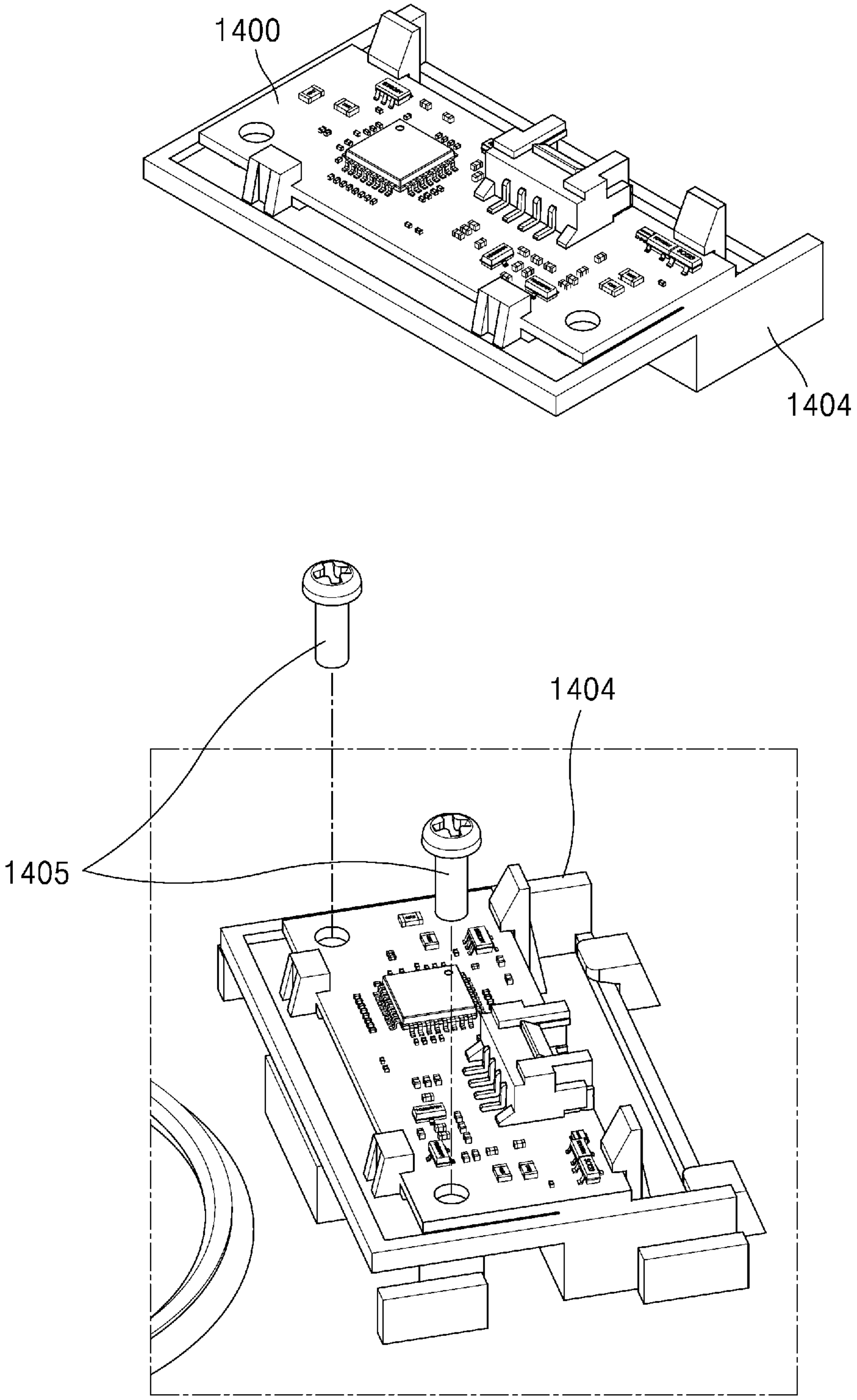
FIG. 7 is a diagram for describing a transparent cover coupled to the distance sensing module, according to an embodiment of the disclosure.

FIG. 7 is a diagram for describing the transparent cover 1404 coupled to the distance sensing module 1400, according to an embodiment of the disclosure.

According to an embodiment of the disclosure, in order to prevent foreign matters from being attached to the sensor 1401 included in the distance sensing module 1400, the first surface of the first distance sensing module 1410 on which the sensor 1401 is provided may be coupled to the transparent cover 1404 for preventing foreign matters from being attached thereto. The entire transparent cover 1404 may include a transparent material, or only a portion of the transparent cover 1404 in contact with the sensor 1401 may include a transparent material.

According to an embodiment of the disclosure, in order to minimize an air gap and prevent crosstalk, a screw fastening structure 1405 may be applied when the distance sensing module 1400 and the transparent cover 1404 are coupled to each other. The air gap may refer to a space between the distance sensing module 1400 and the transparent cover 1404. When the air gap occurs between the distance sensing module 1400 and the transparent cover 1404, light emitted by the light emitter may be diffusely reflected. Crosstalk (propagation of noise) may be caused by diffuse reflection, and the distance sensing module 1400 may erroneously sense the distance to the by-product in the storage container 1310. According to an embodiment of the disclosure, when the air gap is minimized by applying the screw fastening structure 1405, the erroneous sensing rate of the distance sensing module 1400 may be reduced.

In a case where the transparent cover 1404 is coupled to the distance sensing module 1400, the transparent cover 1404 may prevent the by-product from splashing on the distance sensing module 1400 when the by-product falls into the storage container 1310 through the transfer pipe 1200. Therefore, the performance of the sensor 1401 may be prevented from deteriorating due to foreign matters or moisture permeation.

Hereinafter, a method, performed by the food disposer 1000, of identifying the loading height of a by-product in the storage container 1310 by using the distance sensing module 1400, adaptively providing a notification or providing information about the loading amount according to the loading height of the by-product, and controlling the operation of the disposal assembly 1100 will be described in detail.

Figure 8:
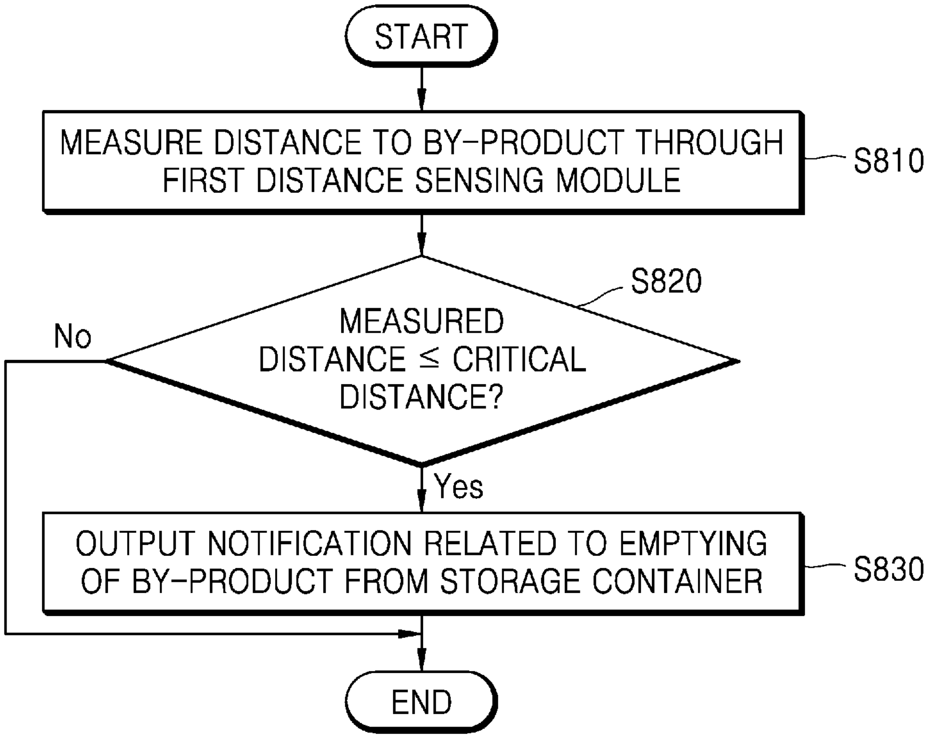
FIG. 8 is a flowchart of an operating method of a food disposer, according to an embodiment of the disclosure.

FIG. 8 is a flowchart of an operating method of the food disposer 1000, according to an embodiment of the disclosure.

In operation S810, the food disposer 1000 according to an embodiment of the disclosure may measure the distance to the by-product in the storage container 1310 through the first distance sensing module 1410 provided in the cover (storage container cover 1320) that seals the upper portion of the storage container 1310.

Because the first distance sensing module 1410 is located at the upper end of the storage container 1310, as the distance from the first distance sensing module 1410 to the by-product increases, the loading height of the by-product may decrease and the loading amount of the by-product may decrease. In addition, as the distance from the first distance sensing module 1410 to the by-product decreases, the loading height of the by-product may increase and the loading amount of the by-product may increase. That is, the distance from the first distance sensing module 1410 to the by-product may be inversely proportional to the loading height or amount of the by-product.

According to an embodiment of the disclosure, the food disposer 1000 may obtain, as the distance from the first distance sensing module 1410 to the by-product, an average value of the remaining distance values excluding the lowest value and the highest value among the distance values that are measured for a certain time by the first distance sensing module 1410. For example, when the distance values that are measured for 300 ms by the first distance sensing module 1410 are 90.0 mm, 89.9 mm, 90.1 mm, 89.9 mm, 90.2 mm, 90.0 mm, 89.5 mm, 89.9 mm, 90.0 mm, and 91.0 mm, the food disposer 1010 may obtain, as the distance value from the first distance sensing module 1410 to the by-product, 90 mm that is an average value of the remaining distance values excluding the maximum value, i.e., 91.0 mm, and the minimum value, i.e., 89.5 mm.

In addition, according to an embodiment of the disclosure, the food disposer 1000 may obtain, as the distance from the first distance sensing module 1410 to the by-product, an average value of the remaining distance values excluding the lowest value and the highest value among a certain number of distance values that are measured by the first distance sensing module 1410. For example, when five distance values that are measured by the first distance sensing module 1410 are 90.0 mm, 89.9 mm, 90.1 mm, 89.7 nm, and 90.3 mm, the food disposer 1010 may obtain, as the distance value from the first distance sensing module 1410 to the by-product, 90 mm that is an average value of the remaining distance values excluding the maximum value, i.e., 90.3 mm, and the minimum value, i.e., 89.7 mm.

According to an embodiment of the disclosure, the MCU 1402 of the first distance sensing module 1410 may calculate the average value, and the at least one processor 1500 (e.g., the main processor) of the food disposer 1000 may calculate the average value. Because the sensing area of the first distance sensing module 1410 has a conical shape, a distance may occur between a distance value of an edge portion of the sensing area and a distance value of a central portion of the sensing area. Accordingly, the food disposer 1000 may use the average value in order to increase the accuracy of the distance value from the first distance sensing module 1410 to the by-product.

According to an embodiment of the disclosure, the food disposer 1000 may use, as the distance value from the first distance sensing module 1410 to the by-product, an average value of all distance values without excluding the lowest value and the highest value among the distance values measured for a certain time or among the certain number of distance values. For example, the food disposer 1000 may obtain, as the distance from the first distance sensing module 1410 to the by-product, an average value of distance values measured for a certain time by the first distance sensing module 1410 or an average value of a certain number of distance values measured by the first distance sensing module 1410.

On the other hand, the food disposer 1000 may use a median value instead of the average value. For example, the food disposer 1000 may obtain, as the distance value from the first distance sensing module 1410 to the by-product, a median value of the remaining distance values excluding the lowest value and the highest value among the distance values measured for a certain time or a median value of the remaining distance values excluding the lowest value and the highest value among the certain number of distance values measured by the first distance sensing module 1410.

According to an embodiment of the disclosure, the first distance sensing module 1410 may be spaced apart from the transfer pipe 1200 by a certain distance. The by-product may be accumulated in the storage container 1310 in the peak shape around the transfer pipe 1200. In this case, when the optical sensor is mounted toward the transfer pipe 1200, erroneous sensing may be caused by the attachment of foreign matters. Therefore, in order to prevent erroneous sensing caused by the attachment of foreign matters, the first distance sensing module 1410 may be spaced apart from the transfer pipe 1200 by a certain distance. Because the by-product is accumulated in the peak shape around the transfer pipe 1200, the straight-line distance to the by-product, which is measured by the first distance sensing module 1410 spaced apart from the transfer pipe 1200 by a certain distance, may be greater than the straight-line distance from the bottom of the transfer pipe 1200 to the peak of the by-product.

According to an embodiment of the disclosure, the first distance sensing module 1410 may be tilted on the storage container cover 1320 at a certain angle (hereinafter referred to as a ‘tilting angle’) in a direction in which the transfer pipe 1200 is located. In this case, because the sensor 1401 of the first distance sensing module 1410 may face the peak of the by-product, the food disposer 1000 may identify the loading height of the peak of the by-product by using the distance from the first distance sensing module 1410 to the by-product.

In operation S820, the food disposer 1000 according to an embodiment of the disclosure may compare the distance measured by the first distance sensing module 1410 (hereinafter also referred to as ‘measured distance’) with a critical distance. The critical distance may be a distance preset for providing a notification related to emptying of the by-product. For example, the critical distance may be the distance to the by-product that may be measured by the first distance sensing module 1410 when the distance between the peak of the by-product and the upper end of the storage container 1310 (the storage container cover 1320) has a certain value (e.g., about 10 nm to about 20 mm). The critical distance may be varied by a user or an administrator.

According to an embodiment of the disclosure, the critical distance may be previously determined through an experiment or the like. For example, the critical distance may be previously determined by at least one of the accumulated shape of the by-product (e.g., gentle, inclined, etc.), the moving speed of the by-product, the distance between the first distance sensing module 1410 and the transfer pipe 1200, or the tilting angle of the first distance sensing module 1410. As the by-product is accumulated more inclinedly, the critical distance may be longer, and as the by-product is accumulated more gently, the critical distance may be shorter. As the distance between the first distance sensing module 1410 and the transfer pipe 1200 increases, the critical distance may increase. As the tilting angle of the first distance sensing module 1410 increases, the critical distance may decrease.

In operation S830, when the distance (hereinafter also referred to as 'measured distance') from the first distance sensing module 1410 to the by-product, which is measured by the first distance sensing module 1410, is less than or equal to the critical distance, the food disposer 1000 may output a notification related to emptying of the by-product from the storage container 1310.

According to an embodiment of the disclosure, the food disposer 1000 may provide a notification to empty the byproduct of the storage container 1310 to the user through the output interface of the food disposer 1000. For example, the food disposer 1000 may output, through an audio output interface (e.g., a speaker), a guide voice indicting to empty the storage container 1310 or may output, through the audio output interface, a certain sound indicating that the storage container 1310 is full of a by-product. In addition, the food disposer 1000 may output, on a display (e.g., liquid crystal display (LCD)), a message indicating to empty the by-product from the storage container 1310 and may display, on the display, an image (e.g., icon) indicating that the storage container 1310 is full of a by-product. In addition, the food disposer 1000 may blink a light-emitting diode (LED) lamp in a specific color indicating that the storage container 1310 is in a state in which a by-product needs to be emptied.

According to an embodiment of the disclosure, the food disposer 1000 may output a notification related to emptying of the by-product from the storage container 1310 through a user terminal connected to the food disposer 1000. The operation by which the user terminal outputs the notification will be described in detail below with reference to FIG. 11.

When the distance from the first distance sensing module 1410 to the by-product, which is measured by the first distance sensing module 1410, reaches the critical distance, the food disposer 1000 according to an embodiment of the disclosure outputs the notification to the user, so that byproduct automatically transferred through the transfer pipe 1200 is prevented from overflowing in the storage container 1310.

Figure 9A:
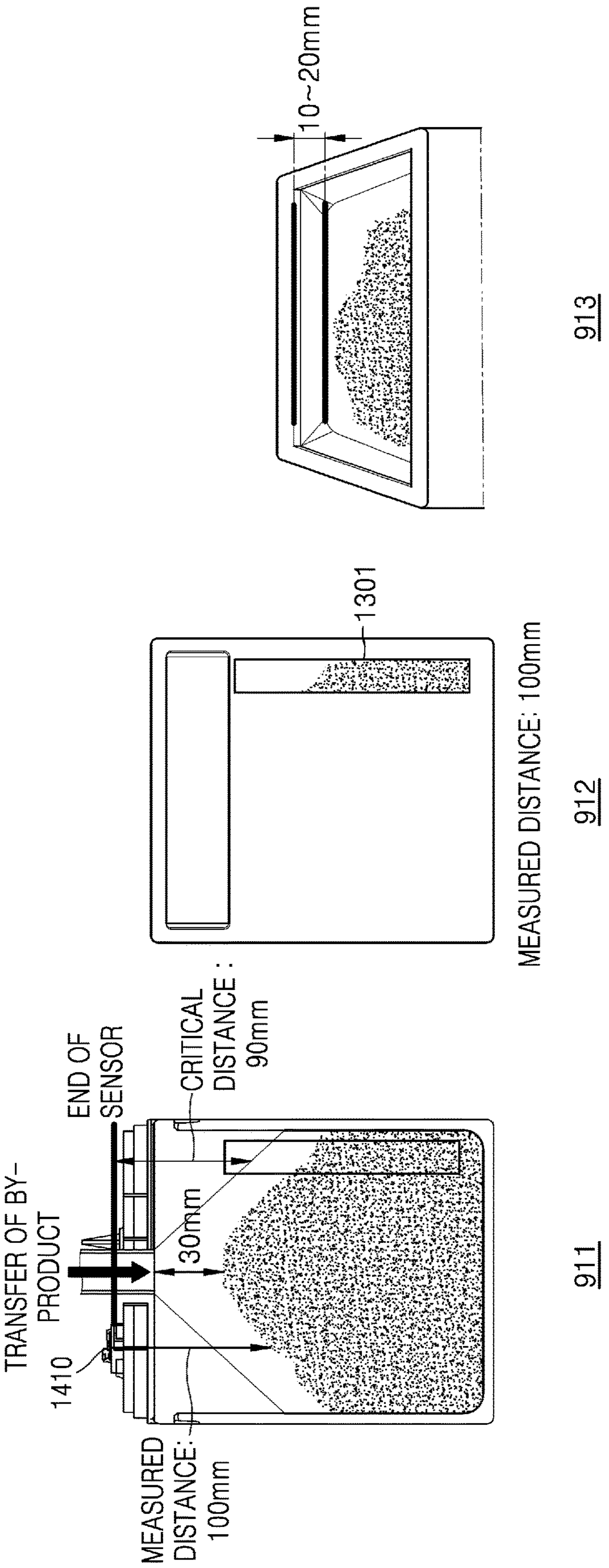
FIG. 9A is a diagram for describing a case where a distance from a first distance sensing module to a by-product is greater than a critical distance, according to an embodiment of the disclosure.
Figure 9B:
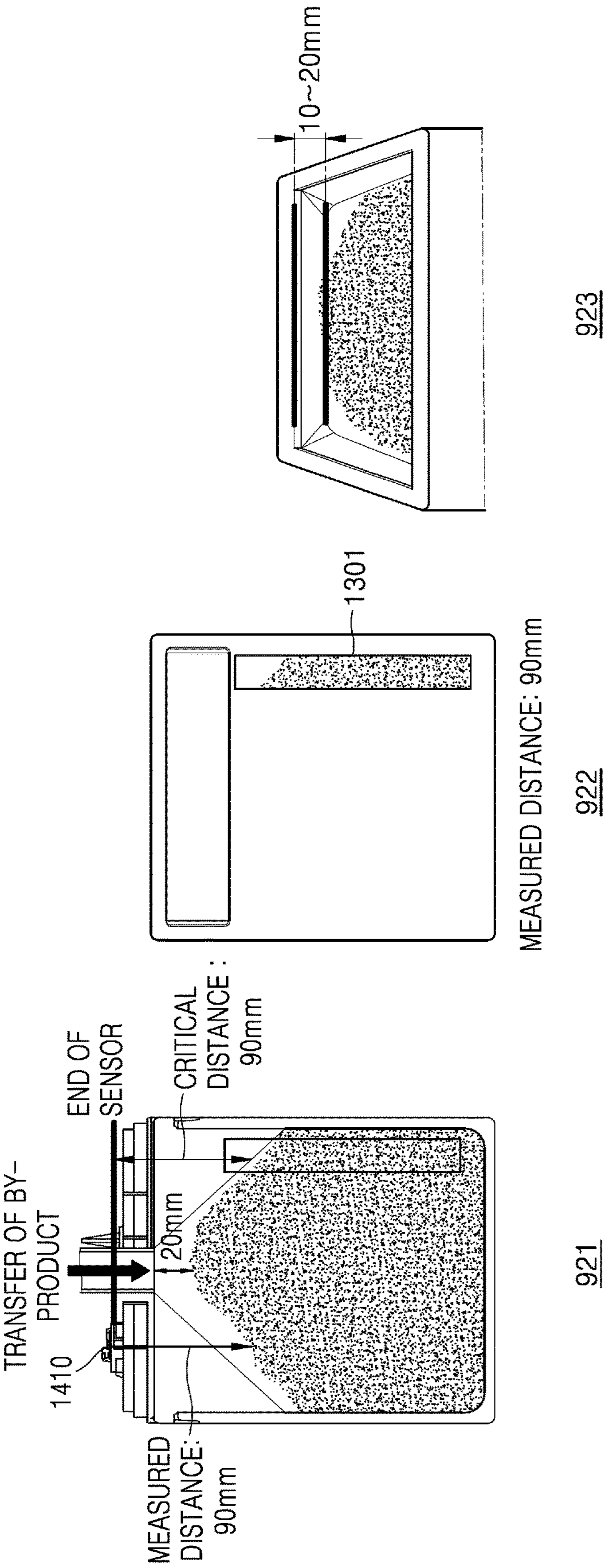
FIG. 9B is a diagram for describing a case where the distance from the first distance sensing module to the by-product reaches the critical distance, according to an embodiment of the disclosure.
Figure 9C:
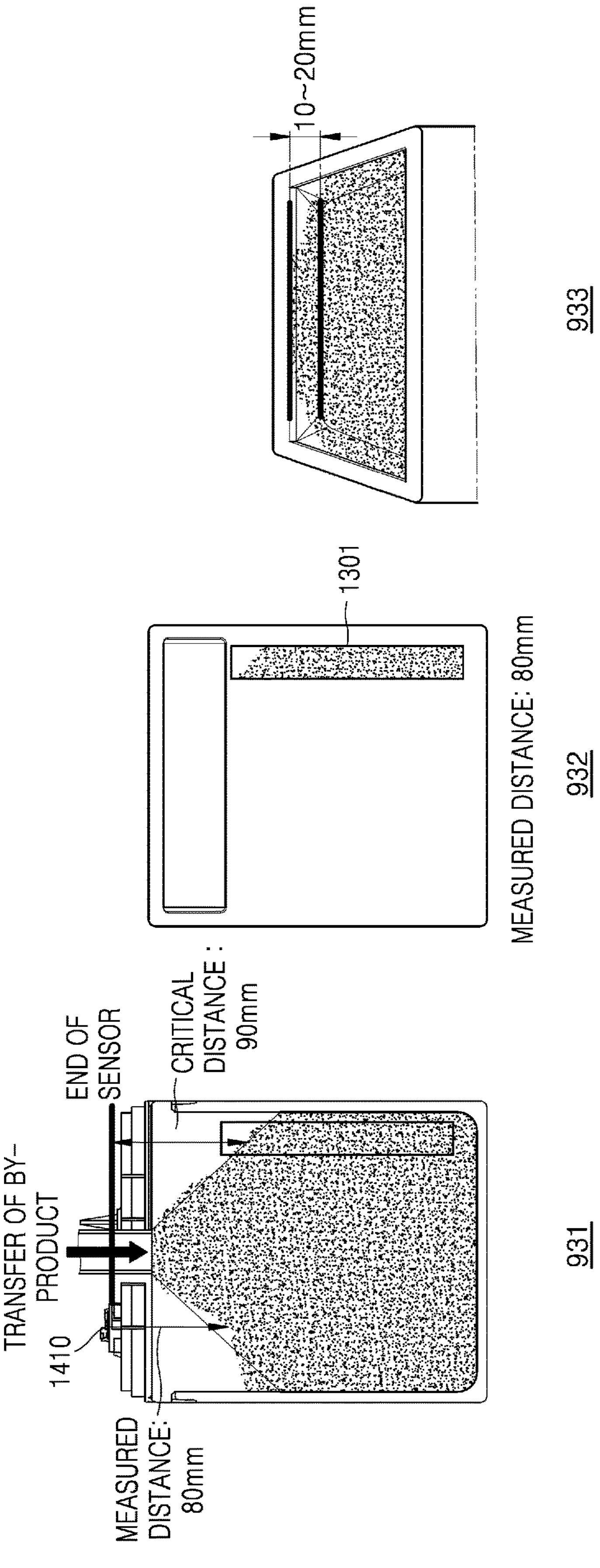
FIG. 9C is a diagram for describing a case where the distance from the first distance sensing module to the by-product is less than the critical distance, according to an embodiment of the disclosure.

Referring to FIGS. 9A, 9B, and 9C, the state of the by-product in the storage container 1310 according to the distance (measured distance) from the first distance sensing module 1410 to the by-product will be described.

FIG. 9A is a diagram for describing a case where the distance from the first distance sensing module 1410 to the by-product is greater than the critical distance, according to an embodiment of the disclosure. FIG. 9B is a diagram for describing a case where the distance from the first distance sensing module 1410 to the by-product reaches the critical distance, according to an embodiment of the disclosure. FIG. 9C is a diagram for describing a case where the distance from the first distance sensing module 1410 to the by-product is less than the critical distance, according to an embodiment of the disclosure.

Referring to FIGS. 9A, 9B, and 9C, the first distance sensing module 1410 may be provided horizontally on the storage container cover 1320. In this case, the critical distance for the first distance sensing module 1410 may be set so that the notification is output when the distance from the bottom of the transfer pipe 1200 to the peak of the by-product is 10 mm to 20 mm. For example, when the distance to the by-product, which is measured by the first distance sensing module 1410, is 90 mm and the distance from the bottom of the transfer pipe 1200 to the peak of the by-product is 10 mm to 20 mm, the critical distance may be set to 90 mm. In FIGS. 9A, 9B, and 9C, a case where the critical distance is 90 mm is described as an example, but the disclosure is not limited thereto.

Referring to FIG. 9A, the distance (measured distance) to the by-product, which is measured by the first distance sensing module 1410, may be about 100 mm and may be greater than the critical distance of about 90 mm (911). In this case, the distance from the bottom of the transfer pipe 1200 to the peak of the by-product may be about 30 mm. When the measured distance is 100 mm, the user may confirm that the storage container 1310 is not full of the by-product through the transparent window 1312 of the storage container 1310 (912). When the storage container cover 1320 is opened, the user may confirm that the storage container 1310 is not actually full of the by-product (913). Accordingly, when the measured distance (100 mm) is greater than the critical distance (90 mm), the food disposer 1000 may not provide the notification related to emptying of the by-product from the storage container 1310.

Referring to FIG. 9B, the distance (measured distance) to the by-product, which is measured by the first distance sensing module 1410, may be about 90 mm and may reach the critical distance of about 90 mm (921). In this case, the distance from the bottom of the transfer pipe 1200 to the peak of the by-product may be about 20 mm. When the measured distance is 90 mm, the user may confirm that the storage container 1310 is not full of the by-product through the transparent window 1312 of the storage container 1310 (922). However, when the storage container cover 1320 is opened, the user may confirm that the storage container 1310 is not full of the by-product, but is considerably full of the by-product (923). Therefore, when the measured distance (90 mm) reaches the critical distance (90 mm) (that is, when the measured distance is less than or equal to the critical distance), the food disposer 1000 may provide the notification related to emptying of the by-product from the storage container 1310 in order to prevent the by-product from overflowing in the storage container 1310.

Referring to FIG. 9C, when the user does not empty the by-product from the storage container 1310 even though the notification related to emptying of the by-product from the storage container 1310 is provided, the distance (measured distance) to the by-product, which is measured by the first distance sensing module 1410, may be 80 mm, which is less than the critical distance of 90 mm. Even when the measured distance is 80 mm, the user may confirm that the storage container 1310 is not full of the by-product through the transparent window 1312 of the storage container 1310 (932). However, when the storage container cover 1320 is opened, the by-product may overflow in the vicinity of the transfer pipe 1200 (933). Accordingly, when the measured distance (80 mm) is less than the critical distance (90 mm), the food disposer 1000 may continuously provide the notification related to emptying of the by-product from the storage container 1310.

Numerical values in FIGS. 9A, 9B, and 9C are only examples for explanation, and the disclosure is not limited thereto.

Figure 10:
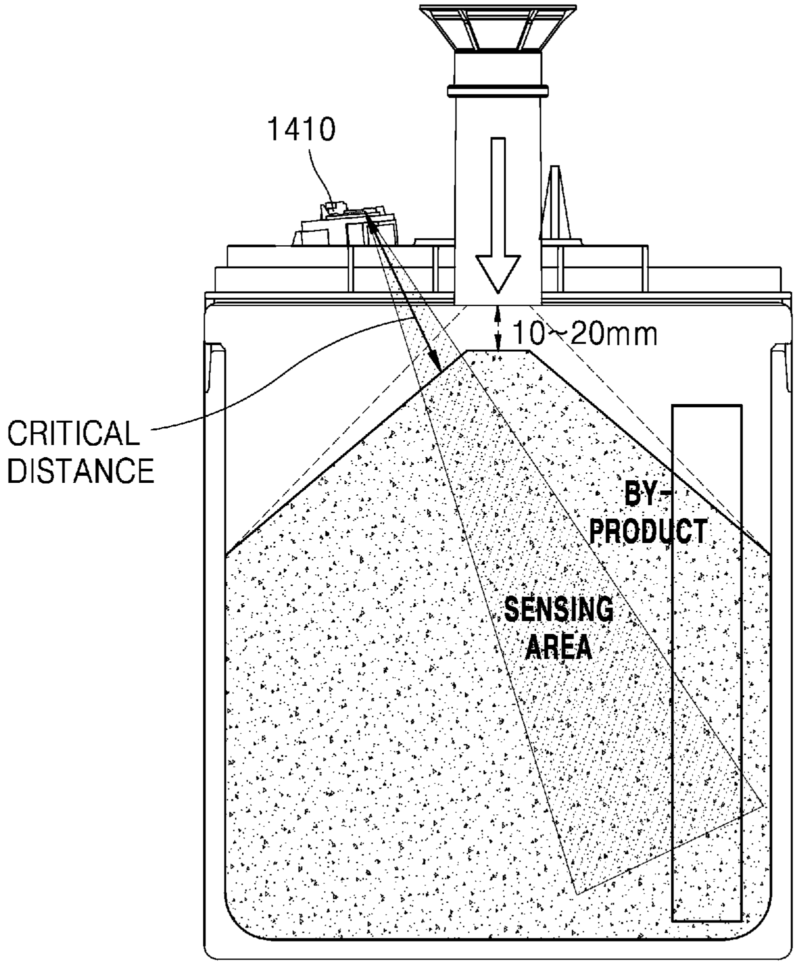
FIG. 10 is a diagram for describing the first distance sensing module tilted at a certain angle, according to an embodiment of the disclosure.

FIG. 10 is a diagram for describing the first distance sensing module 1410 tilted at a certain angle, according to an embodiment of the disclosure.

Referring to FIG. 10, because the by-product is accumulated in the form of mountain peak around the position of the transfer pipe 1200, the first distance sensing module 1410 may be tilted at a certain angle (hereinafter referred to as a tilting angle) on the storage container cover 1320 in order to sense the loading height of the by-product on the peak side. The tilting angle of the first distance sensing module 1410 may be determined by taking into account the accumulated shape of the by-product (e.g., gentle or inclined), the moving speed of the by-product, and the distance between the first distance sensing sensor and the transfer pipe 1200. According to an embodiment of the disclosure, the food disposer 1000 may manually or automatically adjust the tilting angle of the first distance sensing module 1410.

According to an embodiment of the disclosure, when the peak of the by-product is about 10 mm to about 20 mm from the upper end of the storage box, the critical distance to the first distance sensing module 1410 may be determined so that the notification related to the emptying of the by-product is properly provided to the user. The critical distance may vary according to the tilting angle of the first distance sensing module 1410. For example, as the tilting angle of the first distance sensing module 1410 increases, the critical distance may be set to be short.

According to an embodiment of the disclosure, when the distance to the by-product (the peak of the by-product), which is measured by the first distance sensing module 1410 tilted at the certain angle, is less than the critical distance, the food disposer 1000 may provide the notification to empty the by-product of the storage container 1310. Therefore, the peak of the by-product may be prevented from overflowing into the transfer pipe 1200.

Figure 11:
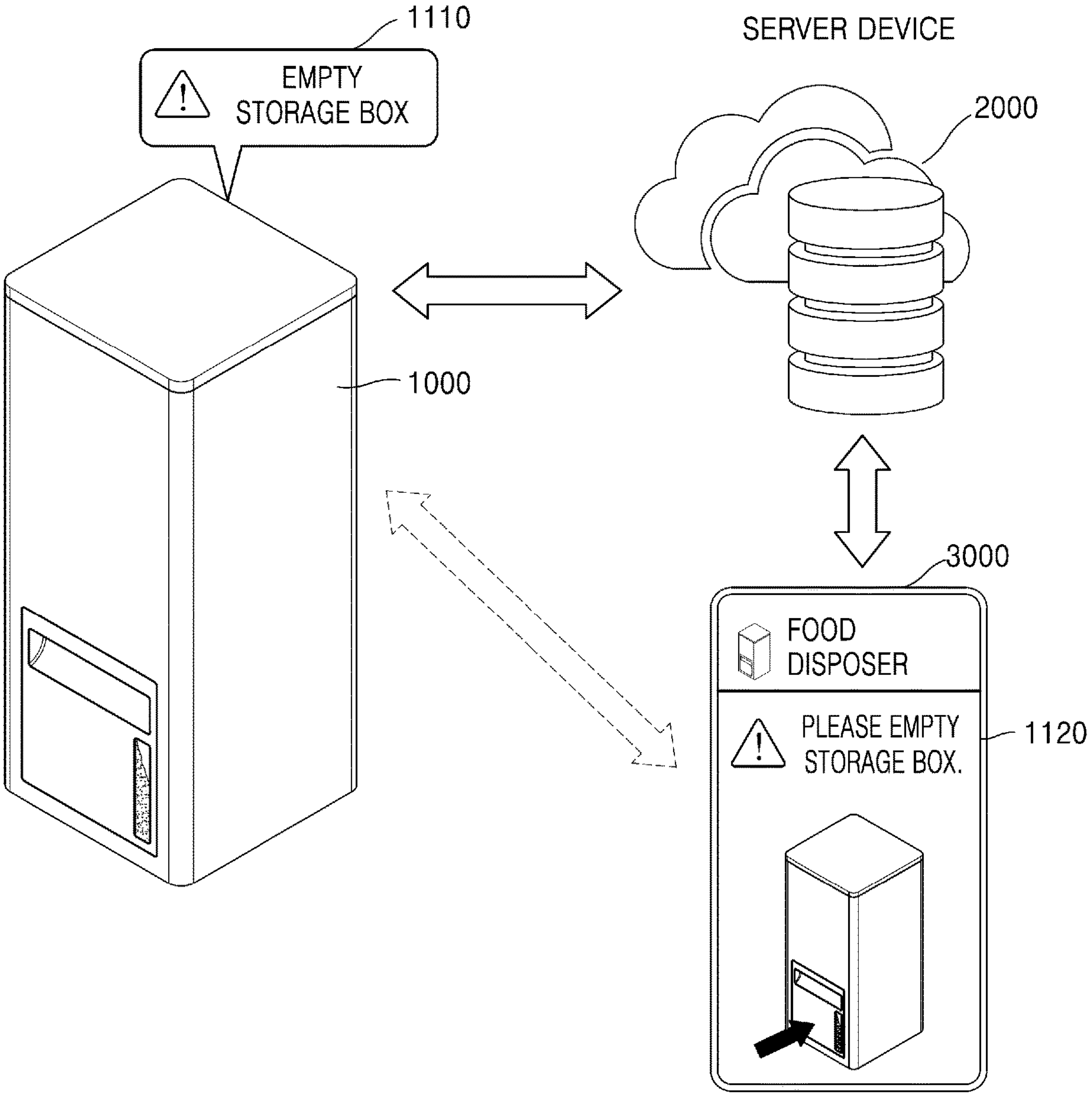
FIG. 11 is a diagram for describing an operation of providing a notification related to emptying of by-products from a storage container, according to an embodiment of the disclosure.

FIG. 11 is a diagram for describing the operation of providing the notification related to emptying of the by-product from the storage container 1310, according to an embodiment of the disclosure.

Referring to FIG. 11, the food disposer 1000 may provide a notification 1110 related to emptying of the by-product from the storage container 1310 (e.g., emptying the storage box) through the output interface (e.g., the display, the audio output interface, etc.) of the food disposer 1000. In addition, the food disposer 1000 may provide a notification 1120 related to emptying of the by-product from the storage container 1310 through a user terminal 3000 connected to the food disposer 1000. In this case, the food disposer 1000 may be indirectly connected to the user terminal 3000 through a server device 2000 or may be directly connected to the user terminal 3000 through short-range communication.

According to an embodiment of the disclosure, the server device 2000 may include a communication interface that performs communication with an external device. The server device 2000 may communicate with the food disposer 1000 or the user terminal 3000 through the communication interface. According to an embodiment of the disclosure, the food disposer 1000 may access the server device 2000 by transmitting identification information of the food disposer 1000 or user identification information (e.g., login information, account information, etc.) to the server device 2000 and obtain authentication of the identification information of the food disposer 1000 or the user identification information (e.g., login information, account information, etc.) from the server device 2000.

According to an embodiment of the disclosure, the server device 2000 may include an artificial intelligence (AI) processor. The AI processor may generate an AI model by training an artificial neural network. The 'training' of the artificial neural network may mean generating a mathematical model that allows the connections of neurons constituting the artificial neural network to make optimal decisions while appropriately changing weights based on data.

The user terminal 3000 according to an embodiment of the disclosure may be a device that is connected to the server device 2000 and displays information provided by the server device 2000. According to an embodiment of the disclosure, the user terminal 3000 may transmit and receive information to and from the server device 2000 through a specific application (e.g., a home appliance management application) installed on the user terminal 3000.

According to an embodiment of the disclosure, the user terminal 3000 may be a device that is connected to the server device 2000 with the same account information as that of the food disposer 1000. The user terminal 3000 may be directly connected to the food disposer 1000 through a short-range wireless communication channel or may be indirectly connected to the food disposer 1000 through the server device 2000.

The user terminal 3000 according to an embodiment of the disclosure may be implemented in various forms. For example, the user terminal 3000 according to the disclosure may be a mobile terminal, a refrigerator including a display, a television (TV), a computer, and a microwave oven including a display, but the disclosure is not limited thereto. In addition, the mobile terminal may be a smartphone, a laptop computer, a tablet personal computer (PC), a digital camera, an e-book terminal, a digital broadcasting terminal, a personal digital assistant (PDA), a portable multimedia player (PMP), a navigation, an MP3 player, and the like, but the disclosure is not limited thereto. For example, the mobile terminal may include a wearable device worn by a user. Hereinafter, for convenience of explanation, a case where the user terminal 3000 is a smartphone will be described as an example.

According to an embodiment of the disclosure, the user terminal 3000 may execute a specific application (e.g., a home appliance management application) provided by the server device 2000 based on a user input. In this case, the user may confirm the operating state of the food disposer 1000 (e.g., pulverizing, drying, power off, etc.) and the state of the by-product in the storage container 1310 (e.g., the notification to empty the by-product, the loading amount of the by-product, etc.) through the execution window of the application. For example, when the distance to the by-product, which is measured by the first distance sensing module 1410 of the food disposer 1000, is within the critical distance, the food disposer 1000 may transmit, to the server device 2000, notification information related to emptying of the by-product from the storage container 1310. At this time, the server device 2000 may output the notification (e.g., 'Please empty the storage box') related to emptying of the by-product from the storage container 1310 through the execution window of the application installed on the user terminal 3000. The user may confirm the notification related to emptying of the by-product displayed on the execution window of the application installed on the user terminal 3000 and empty the by-product from the storage container 1310 in time.

Figure 12:
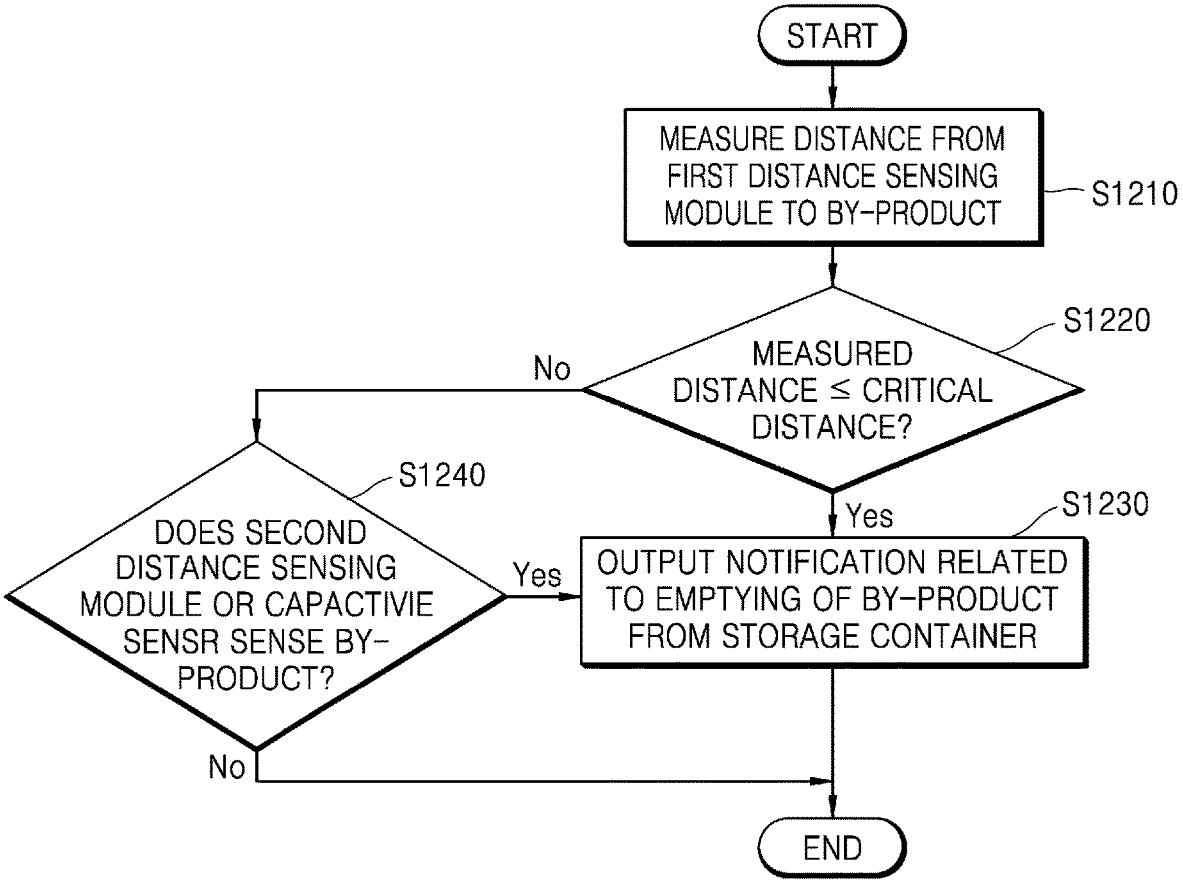
FIG. 12 is a flowchart of a method of outputting a notification related to emptying of by-products from a storage container by using a second distance sensing module or a capacitive sensor, according to an embodiment of the disclosure.

FIG. 12 is a flowchart of a method of outputting the notification related to emptying of the by-product from the storage container 1310 by using the second distance sensing module 1420 or the capacitive sensor, according to an embodiment of the disclosure. In FIG. 12, a case where the food disposer 1000 further includes, in addition to the first distance sensing module 1410, the second distance sensing module 1420 or the capacitive sensor will be described as an example.

In operation S1210, the food disposer 1000 according to an embodiment of the disclosure may measure the distance to the by-product in the storage container 1310 through the first distance sensing module 1410 provided in the storage container cover 1320. In operation S1220, the food disposer 1000 according to an embodiment of the disclosure may compare the distance measured by the first distance sensing module 1410 with the critical distance. The critical distance may be a distance preset for providing a notification related to emptying of the by-product. In operation S1230, when the distance from the first distance sensing module 1410 to the by-product, which is measured by the first distance sensing module 1410, is less than or equal to the critical distance, the food disposer 1000 according to an embodiment of the disclosure may output the notification related to emptying of the by-product from the storage container 1310. That is, when the distance from the first distance sensing module 1410 to the by-product, which is measured by the first distance sensing module 1410, is less than or equal to the critical distance, the loading height of the by-product reaches the critical height, and thus, the food disposer 1000 may output the notification related to emptying of the by-product from the storage container 1310. Because operation S1210 to S1230 corresponds to operations S810 to S830 of FIG. 8, a redundant description thereof is omitted.

In operation S1240, when the distance from the first distance sensing module 1410 to the by-product, which is measured by the first distance sensing module 1410, is greater than the critical distance (NO in S1220), the food disposer 1000 may determine whether the by-product is detected by the second distance sensing module 1420 or the capacitive sensor.

For example, the food disposer 1000 may determine whether the peak of the by-product is detected by the second distance sensing module 1420 provided on one side of the storage container 1310. Alternatively, the food disposer 1000 may determine whether the by-product is detected by the capacitive sensor provided below the outer circumferential surface of the transfer pipe 1200.

According to an embodiment of the disclosure, when the distance to the by-product, which is measured by the first distance sensing module 1410, is greater than the critical distance (NO in S1220) and no by-product is detected by the second distance sensing module 1420 or the capacitive sensor (NO in S1240), the storage container 1310 has enough space to store the by-product, and thus, the food disposer 1000 may not provide the notification related to emptying of the by-product.

On the other hand, according to an embodiment of the disclosure, when the distance to the by-product, which is measured by the first distance sensing module 1410, is greater than the critical distance (NO in S1220) and the by-product is detected by the second distance sensing module 1420 or the capacitive sensor (YES in S1240), the peak of the by-product reaches the vicinity of the transfer pipe 1200, and thus, the food disposer 1000 may provide the notification related to emptying of the by-product from the storage container 1310 (S1230). For example, when the by-product is accumulated very steeply, the difference between the loading height of both ends of the by-product and the loading height of the peak of the by-product may be significant. At this time, even when the distance to the by-product, which is measured by the first distance sensing module 1410 spaced apart from the transfer pipe 1200 by a certain distance, does not reach the critical distance, the second distance sensing module 1420 provided slightly below the storage container cover 1320 or the capacitive sensor provided below the outer circumferential surface of the transfer pipe 1200 may sense the peak of the by-product. Therefore, according to an embodiment of the disclosure, when the peak of the by-product is sensed by the second distance sensing module 1420 or the capacitive sensor, the food disposer 1000 may prevent the by-product from overflowing near the transfer pipe 1200 by providing the notification related to emptying of the by-product from the storage container 1310.

The operation by which the food disposer 1000 provides the notification related to emptying of the by-product from the storage container 1310 when the byproduct is sensed by the second distance sensing module 1420 or the capacitive sensor will be described in more detail with reference to FIGS. 13 and 14.

Figure 13:
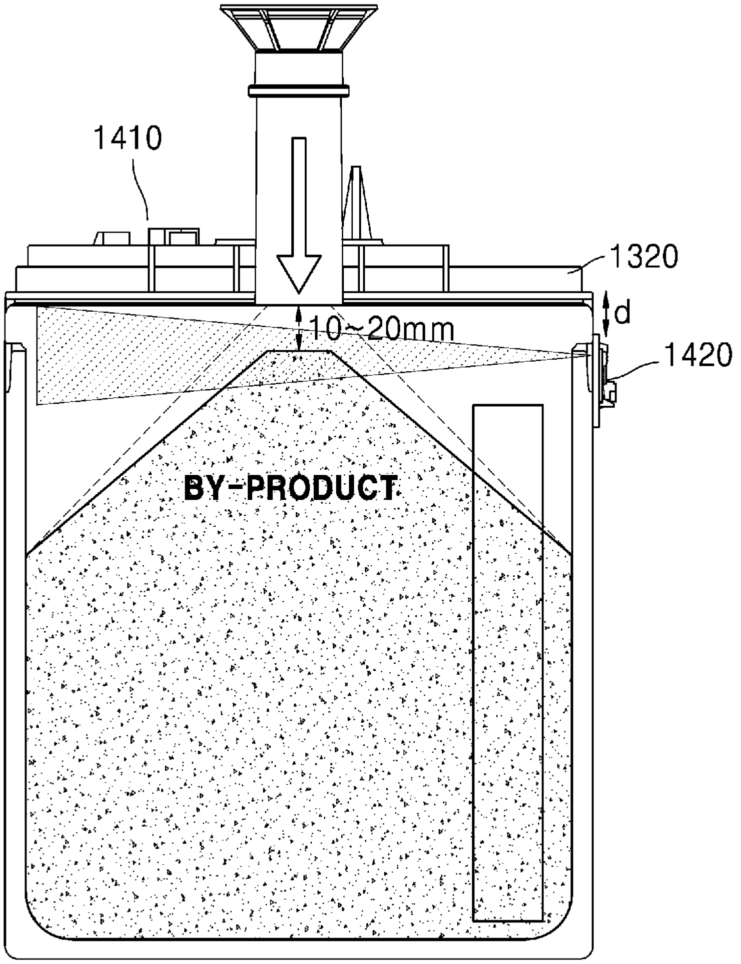
FIG. 13 is a diagram for describing the second distance sensing module according to an embodiment of the disclosure.

FIG. 13 is a diagram for describing the second distance sensing module 1420 according to an embodiment of the disclosure.

Referring to FIG. 13, the food disposer 1000 may further include, in addition to the first distance sensing module 1410, the second distance sensing module 1420. The first distance sensing module 1410 may be provided on the storage container cover 1320 that seals the upper portion of the storage container 1310, and the sensor 1401 of the first distance sensing module 1410 may face downward. On the other hand, the second distance sensing module 1420 may be provided on one side of the storage container 1310, and the sensor 1401 of the second distance sensing module 1420 may be provided to face the storage container 1310. For example, when the second distance sensing module 1420 is provided on the right side of the storage container 1310, the sensor 1401 of the second distance sensing module 1420 may face the left side.

According to an embodiment of the disclosure, the second distance sensing module 1420 may be located below the storage container cover 1320 by a certain distance d. For example, when the food disposer 1000 is designed to provide the notification when the shortest distance between the peak of the by-product and the storage container cover 1320 is 10 mm to 20 mm, the second distance sensing module 1420 may be provided below the storage container cover 1320 by 10 mm to 20 mm. That is, the second distance sensing module 1420 may be located at the loading height of the by-product for which the notification is to be provided.

Accordingly, the second distance sensing module 1420 may sense the by-product accumulated above the height at which the second distance sensing module 1420 is located. When the by-product is sensed by the second distance sensing module 1420, the loading height of the peak of the by-product exceeds the critical height. Therefore, the food disposer 1000 may provide the notification related to emptying of the by-product from the storage container 1310. In addition, in order to prevent the by-product newly produced in the disposal assembly 1100 from being discharged to the storage container 1310 through the transfer pipe 1200, the food disposer 1000 may control the opening/closing portion 1106 to close the discharge port of the disposal assembly 1100. The food disposer 1000 may control the disposal assembly 1100 not to dry or pulverize food in the disposal assembly 1100. The operation by which the food disposer 1000 controls the opening/closing portion 1106 or controls the disposal assembly 1100 will be described in detail below with reference to FIGS. 15A to 18.

In FIG. 13, a case where the food disposer 1000 includes the first distance sensing module 1410 and the second distance sensing module 1420 has been described as an example, but the disclosure is not limited thereto, and the food disposer 1000 may include only one of the first distance sensing module 1410 and the second distance sensing module 1420.

Figure 14:
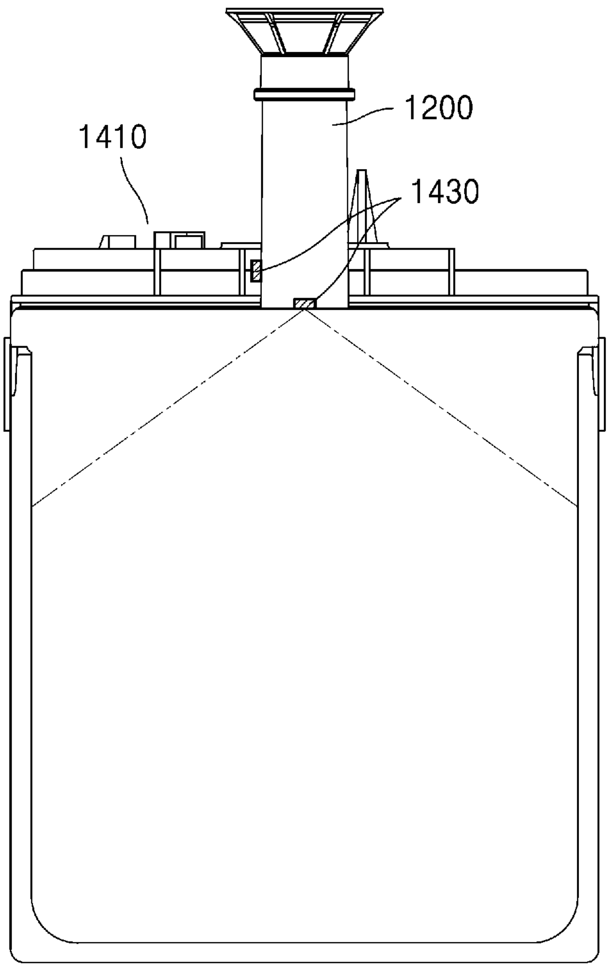
FIG. 14 is a diagram for describing the capacitive sensor according to an embodiment of the disclosure.

FIG. 14 is a diagram for describing a capacitive sensor 1430 according to an embodiment of the disclosure.

According to an embodiment of the disclosure, the food disposer 1000 may further include, in addition to the first distance sensing module 1410, the capacitive sensor 1430. The capacitive sensor 1430 may be provided below the outer circumferential surface of the transfer pipe 1200. In this case, the capacitive sensor 1430 may sense the peak of the by-product when the peak of the by-product approaches the transfer pipe 1200 as the by-product is gradually loaded into the storage container 1310. The capacitive sensor 1430 may be a non-contact touch sensor. The capacitive sensor 1430 may determine the presence or absence of the byproduct by sensing a change in capacitance when the byproduct is present and when the byproduct is absent. A voltage output from the capacitive sensor 1430 may change according to a capacitance value.

According to an embodiment of the disclosure, because the capacitive sensor 1430 is located below the outer circumferential surface of the transfer pipe 1200, a case where the capacitive sensor 1430 senses the byproduct may mean that the storage container 1310 is full of the by-product. Accordingly, the food disposer 1000 may identify through the capacitive sensor 1430 that the storage container 1310 is full of the by-product.

According to an embodiment of the disclosure, when the food disposer 1000 identifies through the capacitive sensor 1430 that the storage container 1310 is full of the by-product, the food disposer 1000 may provide a notification related to emptying of the by-product from the storage container 1310. In addition, in order to prevent the by-product newly produced in the disposal assembly 1100 from being discharged to the storage container 1310 through the transfer pipe 1200, the food disposer 1000 may control the opening/closing portion 1106 to close the discharge port of the disposal assembly 1100. The food disposer 1000 may control the disposal assembly 1100 not to dry or pulverize food in the disposal assembly 1100. The operation by which the food disposer 1000 controls the opening/closing portion 1106 or controls the disposal assembly 1100 will be described in detail below with reference to FIGS. 15A to 18.

According to an embodiment of the disclosure, the food disposer 1000 may include a plurality of capacitive sensors 1430. For example, the food disposer 1000 may include a first capacitive sensor, a second capacitive sensor, and a third capacitive sensor along the lower portion of the outer circumferential surface of the transfer pipe 1200. At this time, when at least one of the first capacitive sensor, the second capacitive sensor, or the third capacitive sensor sense the by-product, the food disposer 1000 may provide a notification related to emptying of the by-product from the storage container 1310 or may control the operation of the opening/closing portion 1106 or the disposal assembly 1100.

In FIG. 14, a case where the food disposer 1000 includes the first distance sensing module 1410 and the capacitive sensor 1430 has been described as an example, but the disclosure is not limited thereto, and the food disposer 1000 may include only one of the first distance sensing module 1410 and the capacitive sensor 1430.

Hereinafter, a method, performed by the food disposer 1000, of controlling the opening and closing of the discharge port of the disposal assembly 1100 in order to prevent the by-product automatically transferred through the transfer pipe 1200 from overflowing in the storage container 1310 will be described with reference to FIG. 15A.

Figure 15A:
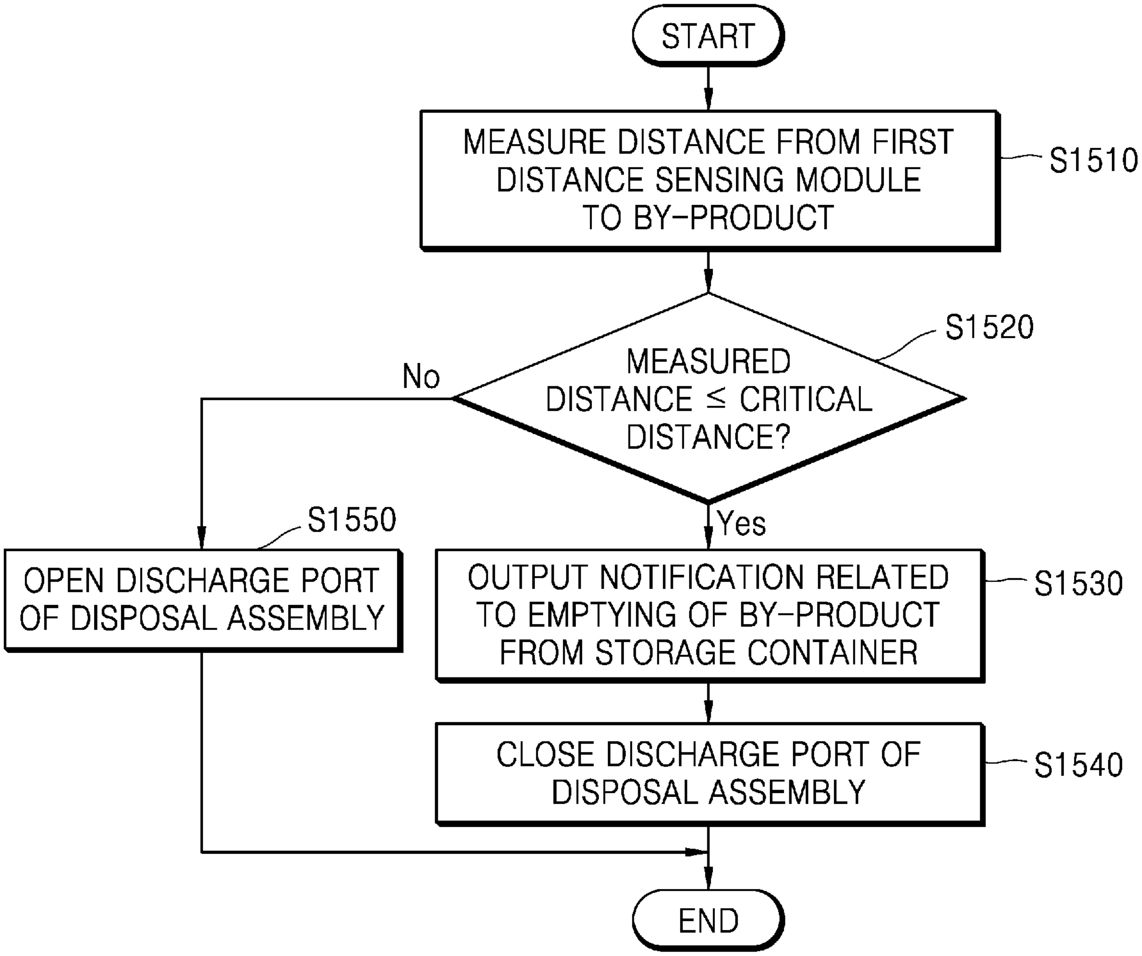
FIG. 15A is a flowchart of a method of controlling opening and closing of a discharge port of a disposal assembly, according to an embodiment of the disclosure.

FIG. 15A is a flowchart of a method of controlling the opening and closing of the discharge port of the disposal assembly 1100, according to an embodiment of the disclosure.

In operation S1510, the food disposer 1000 according to an embodiment of the disclosure may measure the distance to the by-product in the storage container 1310 through the first distance sensing module 1410 provided in the storage container cover 1320. In operation S1520, the food disposer 1000 according to an embodiment of the disclosure may compare the distance measured by the first distance sensing module 1410 with the critical distance. The critical distance may be a distance preset for providing the notification related to byproduct emptying or closing the discharge port of the disposal assembly 1100. In operation S1530, when the distance from the first distance sensing module 1410 to the by-product, which is measured by the first distance sensing module 1410, is less than or equal to the critical distance (YES in S1520), the food disposer 1000 according to an embodiment of the disclosure may output the notification related to emptying of the by-product from the storage container 1310. That is, when the distance from the first distance sensing module 1410 to the by-product, which is measured by the first distance sensing module 1410, is less than or equal to the critical distance, the loading height of the by-product reaches the critical height, and thus, the food disposer 1000 may output the notification related to emptying of the by-product from the storage container 1310. Because operation S1510 to S1530 corresponds to operations S810 to S830 of FIG. 8, a redundant description thereof is omitted.

In operation S1540, when the distance from the first distance sensing module 1410 to the by-product, which is measured by the first distance sensing module 1410, is less than or equal to the critical distance (YES in S1520), the food disposer 1000 according to an embodiment of the disclosure may close the discharge port of the disposal assembly 1100.

According to an embodiment of the disclosure, when the distance from the first distance sensing module 1410 to the by-product is less than or equal to the critical distance, the food disposer 1000 may control the opening/closing portion 1106 to close the discharge port of the disposal assembly 1100 in order to prevent the by-product newly produced in the disposal assembly 1100 from being discharged to the storage container 1310 through the transfer pipe 1200.

Figure 16:
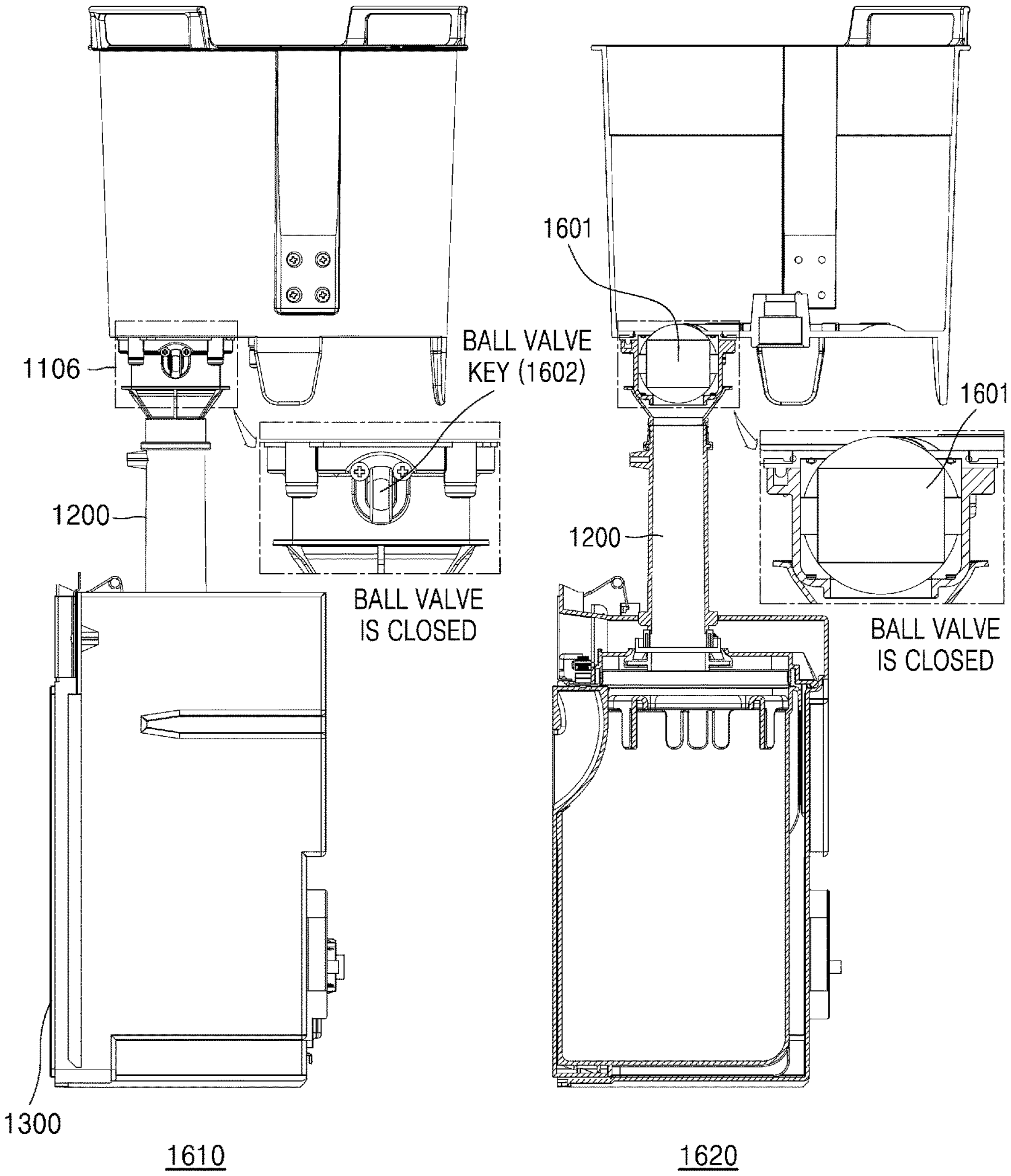
FIG. 16 is a diagram for describing a state in which the discharge port of the disposal assembly is closed, according to an embodiment of the disclosure.
Figure 17:
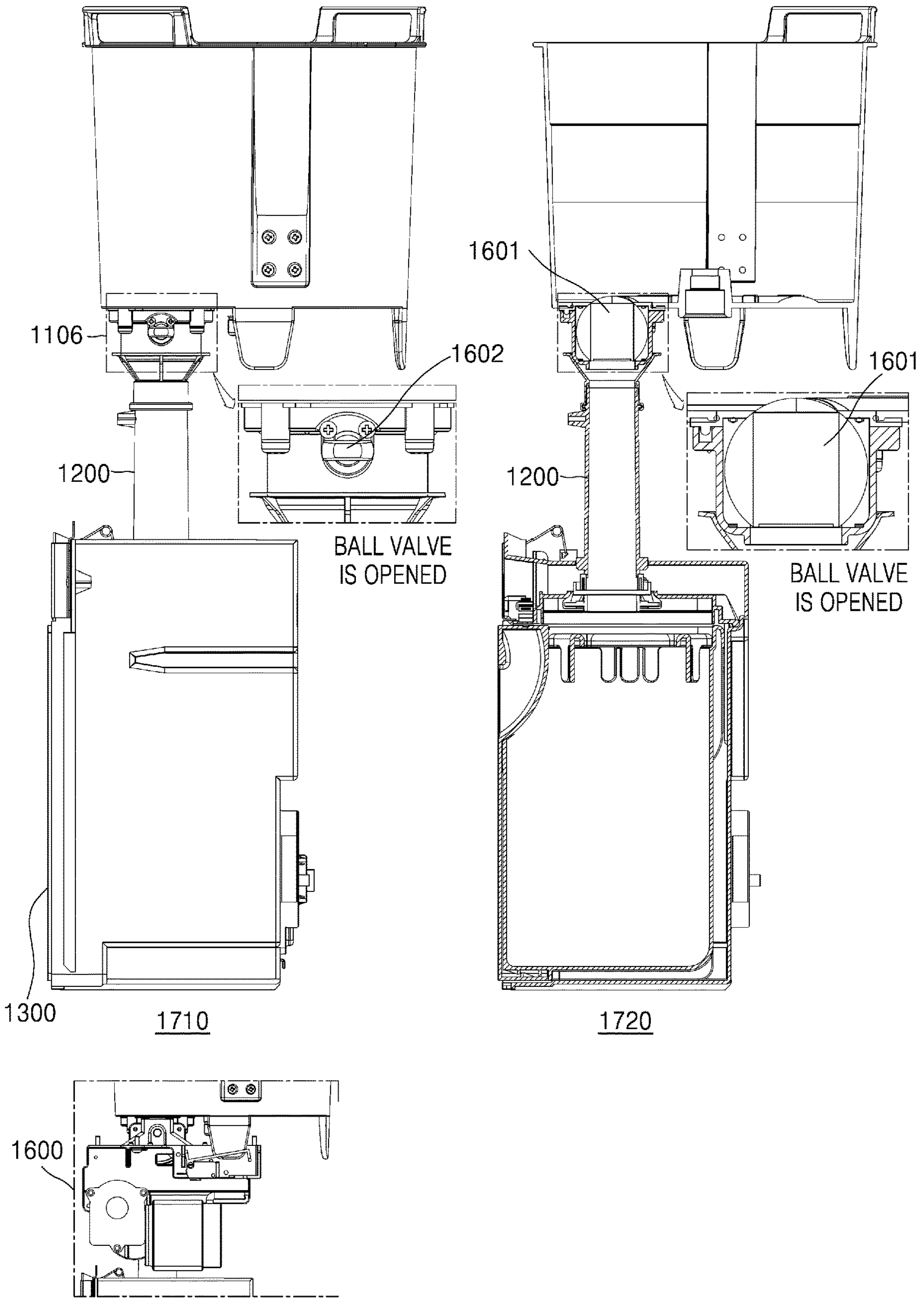
FIG. 17 is a diagram for describing a state in which the discharge port of the disposal assembly is opened, according to an embodiment of the disclosure.

Referring to FIGS. 16 and 17, the opening/closing portion 1106 may include a ball valve 1601. The ball valve 1601 of the opening/closing portion 1106 may be closed or opened by the driver 1600. For example, when a ball valve key 1602 is arranged horizontally with the transfer pipe 1200 by the driver 1600 (1610), the ball valve 1601 may be closed (1620). For example, when the ball valve key 1602 is arranged vertically with the transfer pipe 1200 by the driver 1600 (1710), the ball valve 1601 may be opened (1720).

According to an embodiment of the disclosure, when the distance from the first distance sensing module 1410 to the by-product is less than or equal to the critical distance, the food disposer 1000 may control the opening/closing portion 1106 to maintain the closed state without opening the discharge port of the disposal assembly 1100 even when the disposal assembly 1100 completes the production of a new by-product. According to an embodiment of the disclosure, when the distance from the first distance sensing module 1410 to the by-product reaches the critical distance while the by-product newly produced in the disposal assembly 1100 is automatically transferred to the storage container 1310 through the transfer pipe 1200, the food disposer 1000 may control the opening/closing portion 1106 to close the discharge port of the disposal assembly 1100 even when the by-product is not completely transferred. For example, the at least one processor 1500 of the food disposer 1000 may transmit, to the driver 1600, a control signal for rotating the ball valve key 1602 arranged vertically on the transfer pipe 1200 by 90 degrees.

In operation S1550, when the distance from the first distance sensing module 1410 to the by-product, which is measured by the first distance sensing module 1410, is greater than the critical distance (NO in S1520), the food disposer 1000 according to an embodiment of the disclosure may open the discharge port of the disposal assembly 1100.

According to an embodiment of the disclosure, when the by-product is newly produced in the disposal assembly 1100 and the distance from the first distance sensing module 1410 to the by-product is greater than the critical distance, there may be enough space in the storage container 1310 to store the by-product. Accordingly, the food disposer 1000 may open the discharge port of the disposal assembly 1100 so that the by-product newly produced in the disposal assembly 1100 is discharged to the storage container 1310 through the transfer pipe 1200.

For example, the control signal for rotating the ball valve key 1602 arranged horizontally on the transfer pipe 1200 by 90 degrees may be transmitted to the driver 1600. At this time, because the ball valve key 1602 is arranged vertically on the transfer pipe 1200, the ball valve 1601 may be opened and the by-product in the storing portion 1101 of the disposal assembly 1100 may be transferred to the storage container 1310 through the transfer pipe 1200.

On the other hand, in FIG. 15A, a case where the critical distance for generating the notification is equal to the critical distance for controlling the opening and closing of the discharge port of the disposal assembly 1100 (the opening and closing of the upper portion of the transfer pipe 1200) has been described as an example, the disclosure is not limited thereto. The operating method of the food disposer 1000 when the critical distance for generating the notification (referred to as a 'first critical distance) is different from the critical distance for controlling the opening and closing of the discharge port of the disposal assembly 1100 (referred to as a second critical distance) will be described with reference to FIG. 15B.

Figure 15B:
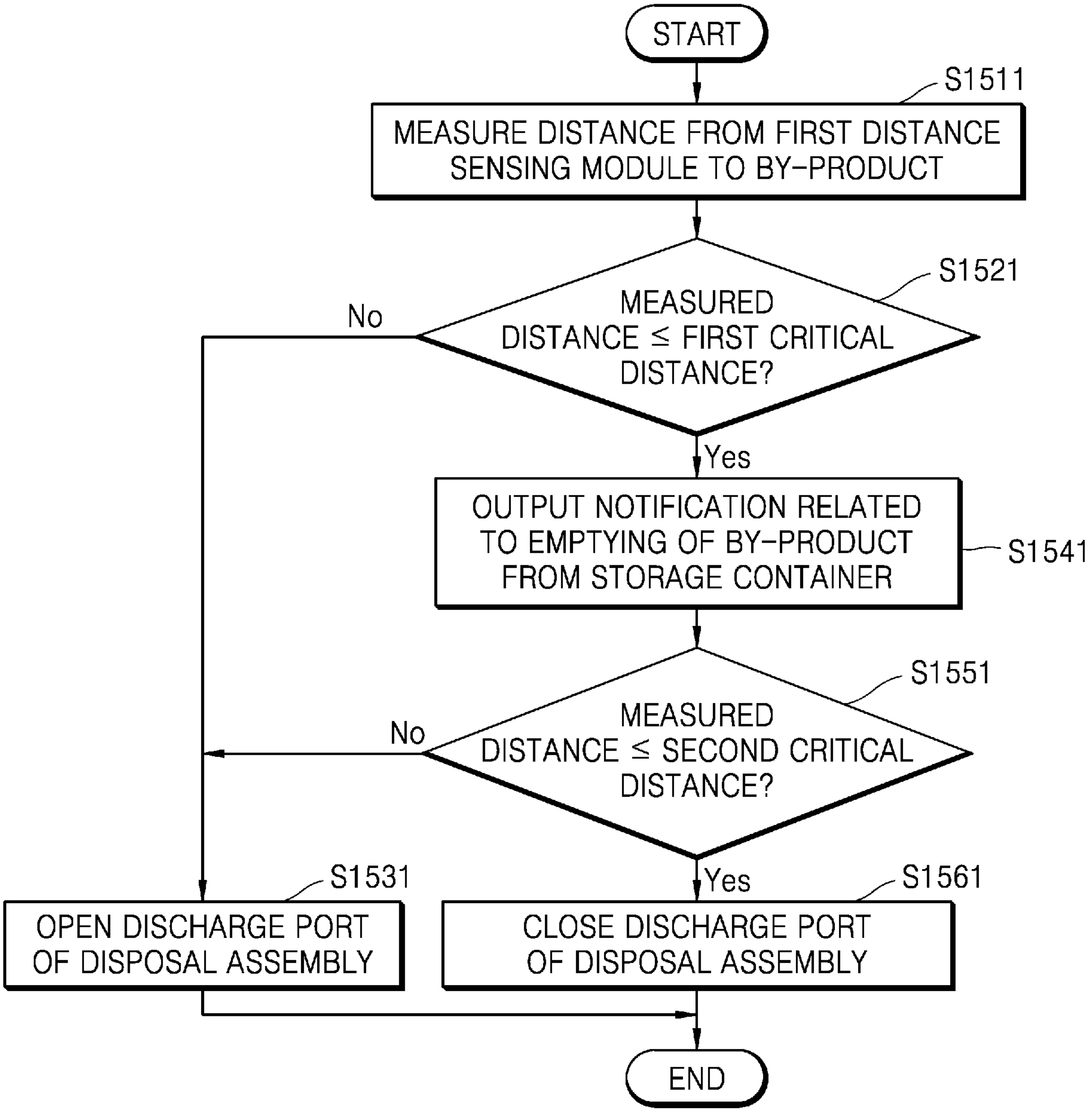
FIG. 15B is a flowchart of a method of controlling opening and closing of a discharge port of a disposal assembly, according to an embodiment of the disclosure.

FIG. 15B is a flowchart of a method of controlling the opening and closing of the discharge port of the disposal assembly 1100, according to an embodiment of the disclosure.

In operation S1511, the food disposer 1000 according to an embodiment of the disclosure may measure the distance to the by-product in the storage container 1310 through the first distance sensing module 1410 provided in the storage container cover 1320. Because operation S1511 corresponds to operation S810 of FIG. 8, a detailed description thereof is omitted.

In operation S1521, the food disposer 1000 according to an embodiment of the disclosure may compare the distance measured by the first distance sensing module 1410 with the first critical distance. The first critical distance may be a distance preset for providing the notification related to emptying of the by-product. Because operation S1521 corresponds to operation S820 of FIG. 8, a detailed description thereof is omitted.

In operation S1531, when the distance from the first distance sensing module 1410 to the by-product, which is measured by the first distance sensing module 1410, is greater than the first critical distance (NO in S1520), the food disposer 1000 according to an embodiment of the disclosure may open the discharge port of the disposal assembly 1100.

According to an embodiment of the disclosure, when the by-product is newly produced in the disposal assembly 1100 and the distance from the first distance sensing module 1410 to the by-product is greater than the first critical distance, there may be enough space in the storage container 1310 to store the by-product. Accordingly, the food disposer 1000 may open the discharge port of the disposal assembly 1100 so that the by-product newly produced in the disposal assembly 1100 is discharged to the storage container 1310 through the transfer pipe 1200.

In operation S1541, when the distance from the first distance sensing module 1410 to the by-product, which is measured by the first distance sensing module 1410, is less than or equal to the first critical distance (YES in S1521), the food disposer 1000 according to an embodiment of the disclosure may output the notification related to emptying of the by-product from the storage container 1310. That is, when the distance from the first distance sensing module 1410 to the by-product, which is measured by the first distance sensing module 1410, is less than or equal to the first critical distance, the loading height of the by-product reaches a notification generation height, and thus, the food disposer 1000 may output the notification related to emptying of the by-product from the storage container 1310.

In operation S1551, the food disposer 1000 according to an embodiment of the disclosure may compare the distance measured by the first distance sensing module 1410 with the second critical distance. The second critical distance may be a distance preset for closing the discharge port of the disposal assembly 1100. The second critical distance may be less than the first critical distance.

According to an embodiment of the disclosure, when the distance from the first distance sensing module 1410 to the by-product, which is measured by the first distance sensing module 1410, is less than or equal to the first critical distance (YES in S1521) and is greater than the second critical distance (NO in S1551), the food disposer 1000 may output the notification related to emptying of the by-product from the storage container 1310 and may open the discharge port of the disposal assembly 1100 (S1531). That is, when the distance from the first distance sensing module 1410 to the by-product, which is measured by the first distance sensing module 1410, is between the first critical distance and the second critical distance, this is a suitable time to empty the by-product of the storage container 1310, but there may be some space left in the storage container 1310 to store the by-product. Accordingly, the food disposer 1000 may control the opening/closing portion 1106 to open the discharge port of the disposal assembly 1100.

In operation S1561, when the distance from the first distance sensing module 1410 to the by-product, which is measured by the first distance sensing module 1410, is less than or equal to the second critical distance (YES in S1551), the food disposer 1000 according to an embodiment of the disclosure may close the discharge port of the disposal assembly 1100.

According to an embodiment of the disclosure, when the distance from the first distance sensing module 1410 to the by-product is less than or equal to the second critical distance, the food disposer 1000 may control the opening/closing portion 1106 to close the discharge port of the disposal assembly 1100 in order to prevent the by-product newly produced in the disposal assembly 1100 from being discharged to the storage container 1310 through the transfer pipe 1200. That is, when the distance from the first distance sensing module 1410 to the by-product is less than or equal to the second critical distance shorter than the first critical distance, the food disposer 1000 may do not have space in the storage container 1310 to store the by-product any more. Accordingly, the food disposer 1000 may control the opening/closing portion 1106 to close the discharge port of the disposal assembly 1100.

Because operation S1561 corresponds to operation S1540 of FIG. 15A, a redundant description thereof is omitted.

According to an embodiment of the disclosure, when the storage container 1310 is full of the by-product, the food disposer 1000 may prevent the by-product from overflowing in the storage container 1310 by closing the discharge port of the disposal assembly 1100 (or the transfer pipe 1200).

On the other hand, according to an embodiment of the disclosure, the food disposer 1000 may control the food disposal operation of the disposal assembly 1100 when the storage container 1310 is full of the by-product. A method, performed by the food disposer 1000, of controlling the food disposal operation of the disposal assembly 1100 will be described in detail with reference to FIG. 18.

Figure 18:
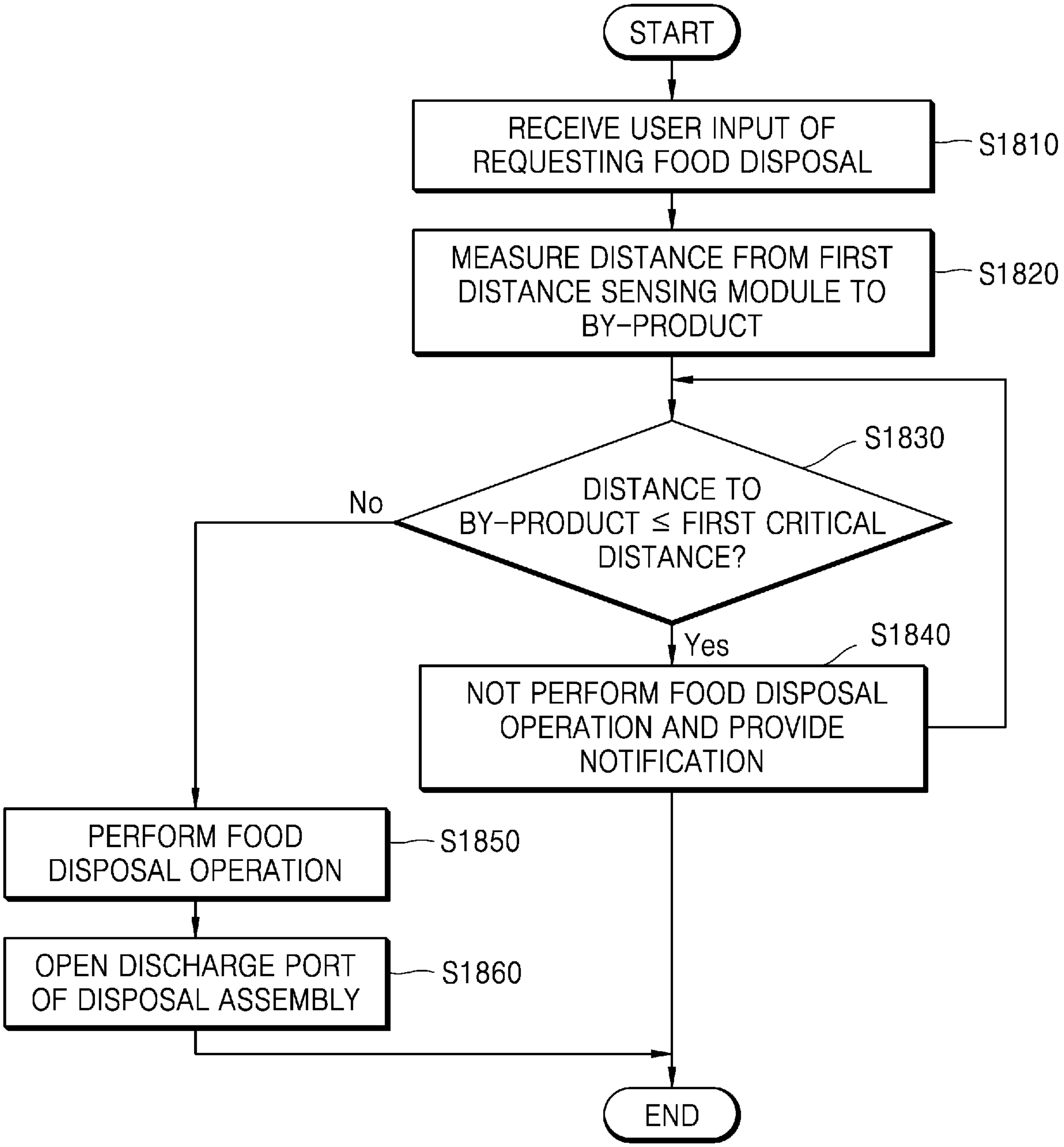
FIG. 18 is a flowchart of a method of controlling a food disposal operation, according to an embodiment of the disclosure.

FIG. 18 is a flowchart of the method of controlling the food disposal operation, according to an embodiment of the disclosure.

In operation S1810, the food disposer 1000 according to an embodiment of the disclosure may receive a user input of requesting food disposal. For example, the user may open the upper cover of the food disposer 1000, put food into the storing portion 1101, and then select the power button (or the operation start button).

In operation S1820, the food disposer 1000 according to an embodiment of the disclosure may measure the distance from the first distance sensing module 1410 provided on the storage container cover 1320 to the by-product. Because operation S1820 corresponds to operation S810 of FIG. 8, a detailed description thereof is omitted.

In operation S1830, the food disposer 1000 according to an embodiment of the disclosure may compare the distance measured by the first distance sensing module 1410 with the critical distance. The critical distance may be a distance preset for providing the notification related to byproduct emptying or stopping the disposal operation of the disposal assembly 1100.

In operation S1840, when the distance from the first distance sensing module 1410 to the by-product, which is measured by the first distance sensing module 1410, is less than or equal to the critical distance (YES in S1830), the food disposer 1000 according to an embodiment of the disclosure may do not perform the food disposal operation and may provide the notification related to emptying of the by-product from the storage container 1310.

For example, when the distance from the first distance sensing module 1410 to the by-product, which is measured by the first distance sensing module 1410, is less than or equal to the critical distance, the loading height of the by-product reaches the notification generation height, and thus, the food disposer 1000 may control the disposal assembly 1100 not to perform the food disposal operation (e.g., pulverizing, agitating, drying, heating, etc.) even when the user input of requesting food disposal is received. Instead, the food disposer 1000 may output the notification related to emptying of the by-product from the storage container 1310.

Therefore, according to an embodiment of the disclosure, when the storage container 1310 is full of the by-product, the food disposer 1000 may stop the food disposal operation until the storage container 1310 is emptied.

In operation S1850, when the distance from the first distance sensing module 1410 to the by-product, which is measured by the first distance sensing module 1410, is greater than the critical distance (NO in S1520), the food disposer 1000 according to an embodiment of the disclosure may control the disposal assembly 1100 to perform the food disposal operation (e.g., pulverizing, agitating, drying, heating, etc.).

In operation S1860, when the distance from the first distance sensing module 1410 to the by-product, which is measured by the first distance sensing module 1410, is greater than the first critical distance (NO in S1520), the food disposer 1000 according to an embodiment of the disclosure may open the discharge port of the disposal assembly 1100 when the disposal assembly 1100 completes the food disposal.

According to an embodiment of the disclosure, when the by-product is newly produced in the disposal assembly 1100 and the distance from the first distance sensing module 1410 to the by-product is greater than the critical distance, there may be enough space in the storage container 1310 to store the by-product. Accordingly, the food disposer 1000 may open the discharge port of the disposal assembly 1100 so that the by-product newly produced in the disposal assembly 1100 is discharged to the storage container 1310 through the transfer pipe 1200.

On the other hand, according to an embodiment of the disclosure, the food disposer 1000 may provide information about the loading amount of the by-product in the storage container 1310, based on distance information about the distance measured by the first distance sensing module 1410. A method, performed by the food disposer 100, of providing information on the loading amount of the by-product will be described in detail with reference to FIG. 19.

Figure 19:
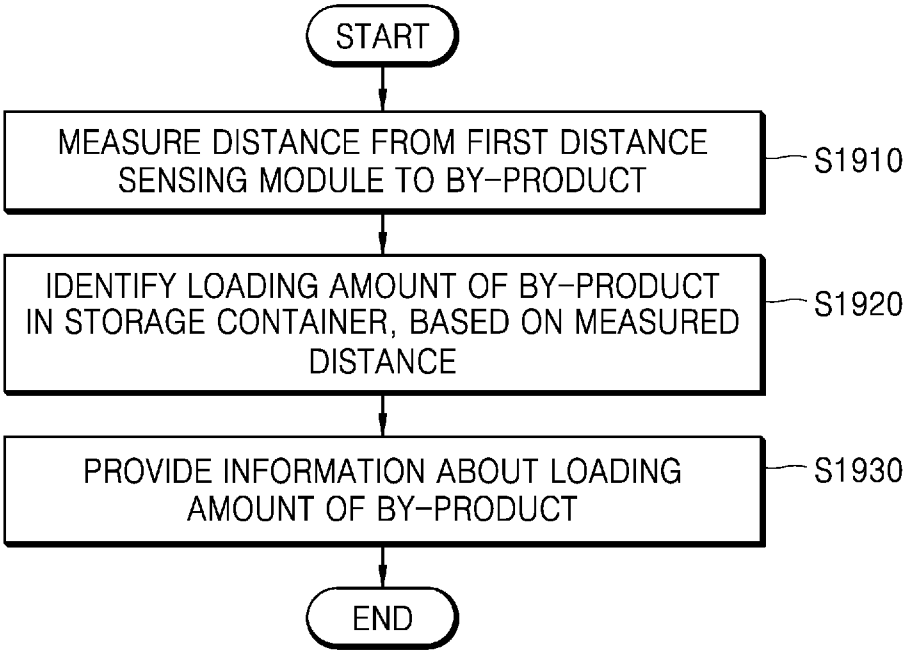
FIG. 19 is a flowchart of a method of providing information about a loading amount of a by-product, according to an embodiment of the disclosure.

FIG. 19 is a flowchart of the method of providing the information about the loading amount of the by-product, according to an embodiment of the disclosure.

In operation S1910, the food disposer 1000 according to an embodiment of the disclosure may measure the distance to the by-product in the storage container 1310 through the first distance sensing module 1410 provided in the storage container cover 1320. Because operation S1910 corresponds to operation S810 of FIG. 8, a detailed description thereof is omitted.

In operation S1920, the food disposer 1000 according to an embodiment of the disclosure may identify the loading amount of the by-product in the storage container 1310, based on the distance from the first distance sensing module 1410 to the by-product. Because the first distance sensing module 1410 is located at the upper end of the storage container 1310, as the distance from the first distance sensing module 1410 to the by-product increases, the loading height of the by-product may decrease, and as the distance from the first distance sensing module 1410 to the by-product decreases, the loading amount of the by-product may increase.

According to an embodiment of the disclosure, the food disposer 1000 may identify the loading amount of the by-product in the storage container 1310 by using a table defining the correlation between the distance (measured distance) from the first distance sensing module 1410 to the by-product and the loading amount of the by-product, or a graph showing the correlation between the measured distance and the loading amount of the by-product.

Referring to FIG. 20, a table 2001 defining the correlation between the distance (measured distance) from the first distance sensing module 1410 to the by-product and the loading amount of the by-product may be stored in a memory of the food disposer 1000. According to an embodiment of the disclosure, the food disposer 1000 may measure the distance from the first distance sensing module 1410 to the by-product, and search the table 2001 for the loading amount or loading ratio corresponding to the measured distance. For example, when the measured distance is 240 mm, the food disposer 1000 may obtain, from the table 2001, information indicating that the loading amount of the byproduct is 1 L and the loading ratio is 25%. When the measured distance is 180 mm, the food disposer 1000 may obtain, from the table 2001, information indicating that the loading amount of the byproduct is 2 L and the loading ratio is 50%. When the measured distance is 80 mm, the food disposer 1000 may obtain, from the table 2001, information indicating that the loading amount of the byproduct is 4 L and the loading ratio is 100%.

In operation S1930, the food disposer 1000 according to an embodiment of the disclosure may provide information about the loading amount (or loading ratio) of the byproduct.

According to an embodiment of the disclosure, the food disposer 1000 may provide information about the loading amount (or loading ratio) of the byproduct to the user through the output interface of the food disposer 1000. For example, the food disposer 1000 may output a voice indicating the current loading amount of the by-product in the storage container 1310 through the audio output interface (e.g., the speaker). In addition, the food disposer 1000 may display, on the display (e.g., the LCD), text or an image indicating the loading amount (or loading ratio) of the by-product. In addition, the food disposer 1000 may blink as many LED lamps as the loading amount (or loading ratio) or may blink the LED lamp with a color corresponding to the loading amount (or loading ratio).

According to an embodiment of the disclosure, the food disposer 1000 may provide information about the storage volume of the storage container 1310. For example, when the total volume of the storage container 1310 to store the by-product is 4 L and the current loading amount of the by-product identified based on the distance from the first distance sensing module 1410 to the by-product is 1 L, the food disposer 1000 may display 3 L (75%) on the display as the storage volume.

According to an embodiment of the disclosure, the food disposer 1000 may output information about the loading amount of the by-product in the storage container 1310 through the user terminal 3000 connected to the food disposer 1000. For example, the food disposer 1000 may transmit, to the server device 2000, information about the loading amount of the by-product in the storage container 1310. At this time, the server device 2000 may output information (e.g., 1 L, 25%) about the loading amount of the by-product in the storage container 1310 or the storage volume (e.g., 3 L, 75%) through the execution window of the application installed on the user terminal 3000. The user may confirm the loading amount of the by-product displayed on the execution window of the application installed on the user terminal 3000 and empty the by-product of the storage container 1310 in time.

On the other hand, in FIG. 19, a case where the table 2001 defining the correlation between the distance (measured distance) from the first distance sensing module 1410 to the by-product and the loading amount of the by-product is stored in the food disposer 1000 has been described as an example, the disclosure is not limited thereto. The table 2001 may be stored in the memory of the server device 2000. When the table 2001 is stored in the memory of the server device 2000, the server device 2000 may identify the loading amount of the by-product in the storage container 1310. Hereinafter, a method, performed by the server device 2000, of identifying the loading amount of the by-product in the storage container 1310 will be described in detail with reference to FIG. 21.

Figure 21:
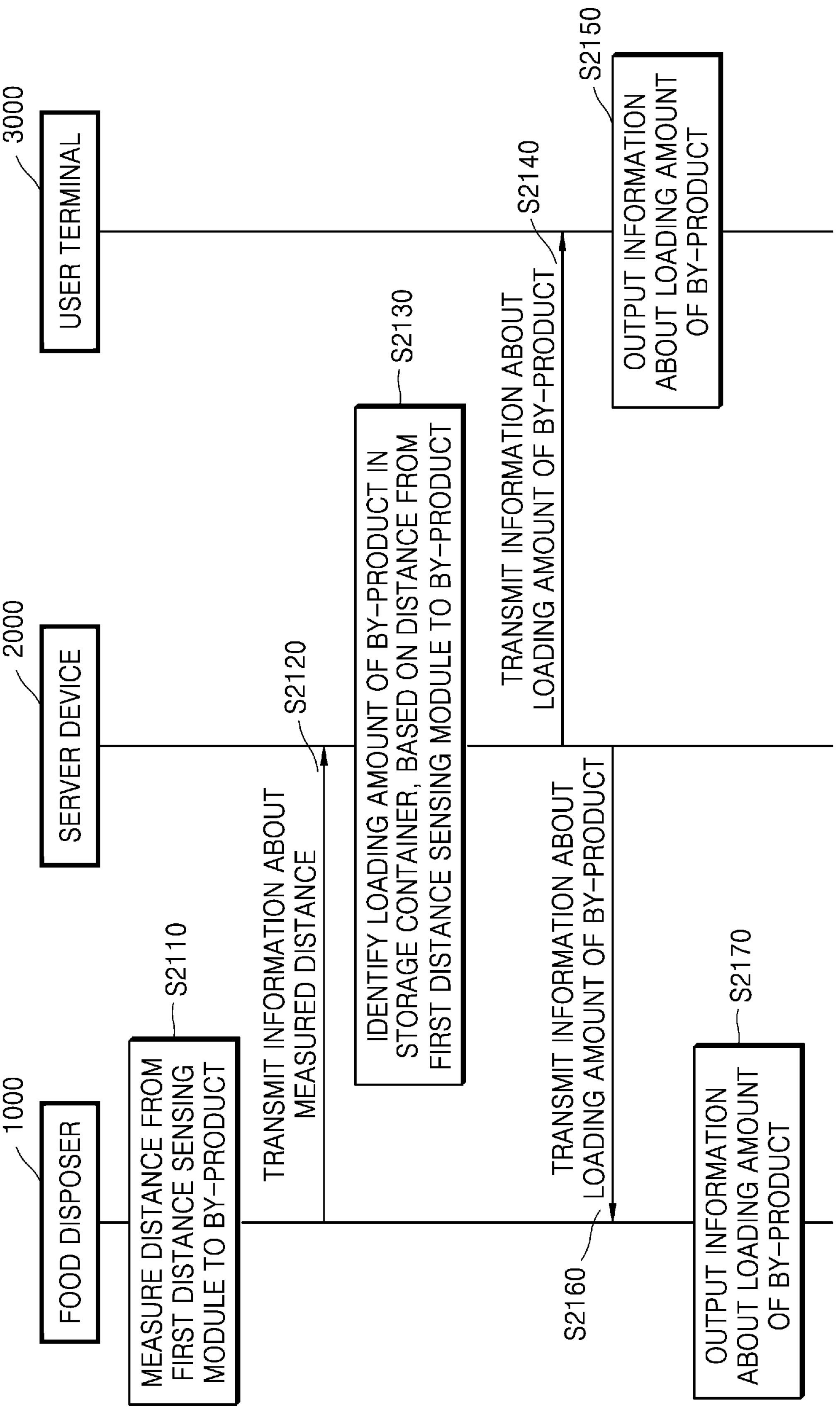
FIG. 21 is a flowchart of a method, performed by a server device, of identifying a loading amount of a by-product in a storage container, according to an embodiment of the disclosure.

FIG. 21 is a flowchart of a method, performed by the server device 2000, of identifying the loading amount of the by-product in the storage container 1310, according to an embodiment of the disclosure.

In operation S2110, the food disposer 1000 according to an embodiment of the disclosure may measure the distance from the first distance sensing module 1410 to the by-product in the storage container 1310 through the first distance sensing module 1410 provided in the storage container cover 1320.

In operation S2120, the food disposer 1000 according to an embodiment of the disclosure may transmit, to the server device 2000, information about the distance (measured distance) from the first distance sensing module 1410 to the by-product.

According to an embodiment of the disclosure, the food disposer 1000 may transmit information about the measured distance to the server device 2000 through long-range communication (e.g., Wireless Fidelity (Wi-Fi)™ communication). The food disposer 1000 may transmit information about the measured distance to the server device 2000 at certain intervals, and may transmit information about the measured distance to the server device 2000 whenever the distance from the first distance sensing module 1410 to the by-product is measured. In addition, the food disposer 1000 may transmit information about the measured distance to the server device 2000 in response to a request from the server device 2000.

In operation S2130, when information about the measured distance is received from the food disposer 1000, the server device 2000 according to an embodiment of the disclosure may identify the loading amount of the by-product in the storage container 1310, based on the distance (measured distance) from the first distance sensing module 1410 to the by-product.

According to an embodiment of the disclosure, the server device 2000 may identify the loading amount of the by-product in the storage container 1310 by using a table defining the correlation between the measured distance stored in the memory of the server device 2000 and the loading amount of the by-product, or a graph showing the correlation between the measured distance and the loading amount of the by-product.

For example, referring to FIG. 20, when the measured distance is 240 mm, the server device 2000 may obtain, from the table 2001, information indicating that the loading amount of the byproduct is 1 L and the loading ratio is 25%. When the measured distance is 180 mm, the server device 2000 may obtain, from the table 2001, information indicating that the loading amount of the byproduct is 2 L and the loading ratio is 50%. When the measured distance is 80 mm, the server device 2000 may obtain, from the table 2001, information indicating that the loading amount of the byproduct is 4 L and the loading ratio is 100%.

In operation S2140, the server device 2000 according to an embodiment of the disclosure may transmit information about the loading amount of the by-product to the user terminal 3000.

According to an embodiment of the disclosure, the server device 2000 may transmit information about the loading amount of the by-product in the storage container 1310 to the user terminal 3000 through a specific application (e.g., a home appliance management application) installed on the user terminal 3000.

In operation S2150, the user terminal 3000 may output information about the loading amount of the by-product, which is received from the server device 2000.

According to an embodiment of the disclosure, the user terminal 3000 may display information about the loading amount (or loading ratio) of the by-product through the execution window of the specific application (e.g., the home appliance management application). For example, the user terminal 3000 may display, on the execution window of the application, text or an image indicating the loading amount. The user terminal 3000 may output information about the loading amount or the loading ratio as a voice through the audio output interface (e.g., the speaker).

In operation S2160, the server device 2000 according to an embodiment of the disclosure may transmit information about the loading amount of the by-product in the storage container 1310 to the food disposer 1000.

In operation S2170, the food disposer 1000 according to an embodiment of the disclosure may output information about the loading amount of the by-product, which is received from the server device 2000.

According to an embodiment of the disclosure, the food disposer 1000 may provide information about the loading amount (or loading ratio) of the byproduct to the user through the output interface of the food disposer 1000. For example, the food disposer 1000 may output a voice indicating the current loading amount of the by-product in the storage container 1310 through the audio output interface (e.g., the speaker). In addition, the food disposer 1000 may display, on the display (e.g., the LCD), text or an image indicating the loading amount (or loading ratio) of the by-product. The food disposer 1000 may blink as many LED lamps as the loading amount (or loading ratio) or may blink the LED lamp with a color corresponding to the loading amount (or loading ratio).

An operation by which the food disposer 1000 or the user terminal 3000 provides information about the loading amount of the by-product will be described in more detail with reference to FIG. 22.

Figure 22:
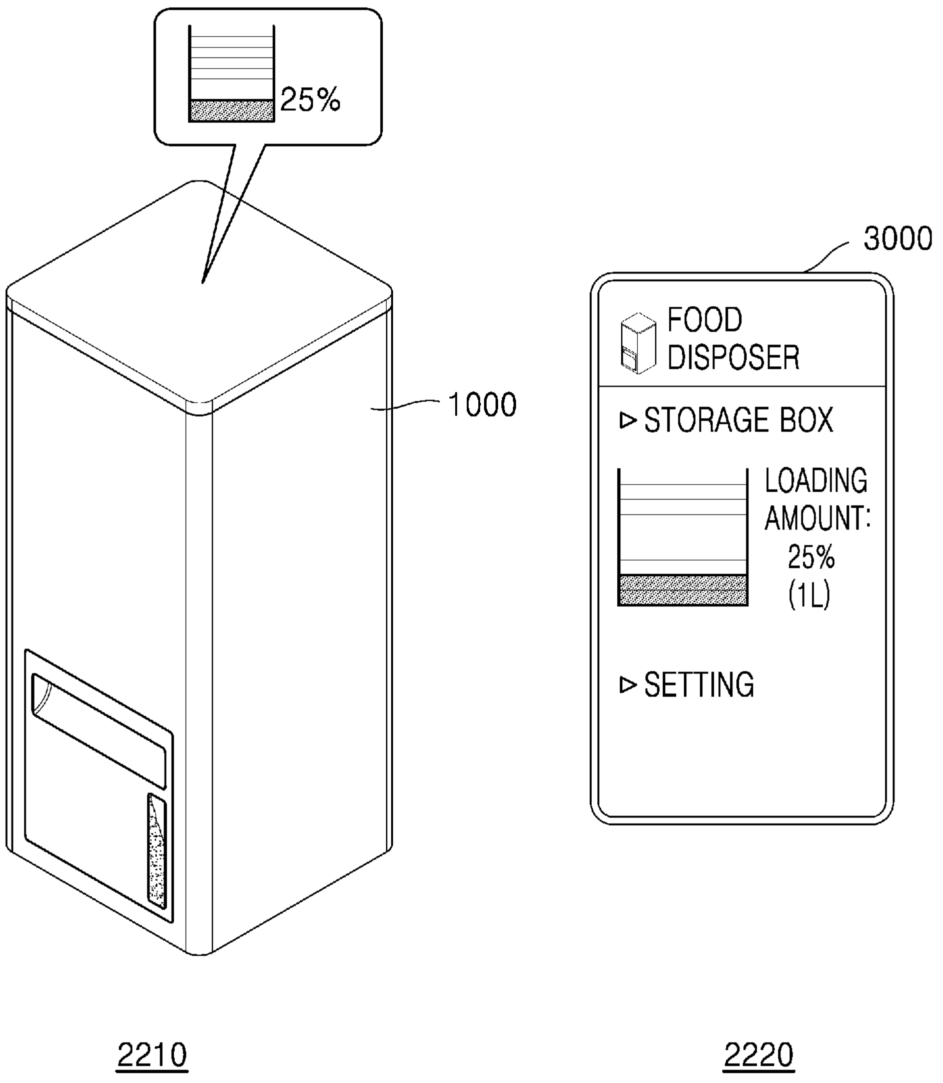
FIG. 22 is a diagram for describing an operation of providing information about a loading amount of a by-product in a storage container, according to an embodiment of the disclosure.

FIG. 22 is a diagram for describing the operation of providing information about the loading amount of the by-product in the storage container 1310, according to an embodiment of the disclosure.

Referring to 2210 of FIG. 22, the food disposer 1000 may provide information about the loading amount of the by-product in the storage container 1310 through the output interface. For example, when the total volume of the storage container 1310 to store the by-product is 4 L and the current loading amount of the by-product identified based on the distance from the first distance sensing module 1410 to the by-product is 1 L, the food disposer 1000 may display, on the display, text (e.g., 25%) indicating the loading ratio and an icon indicating the loading amount. Accordingly, the user may easily recognize the current loading amount of the by-product in the storage container 1310 according to the information displayed on the display, without opening the storage container 1310.

Referring to 2220 in FIG. 22, when the user executes a specific application related to the food disposer 1000, the user terminal 3000 may provide information about the loading amount of the by-product in the storage container 1310 to the user through the execution window of the application. For example, when the total volume of the storage container 1310 to store the by-product is 4 L and the current loading amount of the by-product identified based on the distance from the first distance sensing module 1410 to the by-product is 1 L, the user terminal 3000 may display, on the execution window of the application, text (e.g., 1 L) indicating the loading amount, text (e.g., 25%) indicating the loading ratio, and an icon indicating the loading amount. The user may intuitively recognize the current loading amount of the by-product in the storage container 1310 through the execution window of the application.

Figure 23:
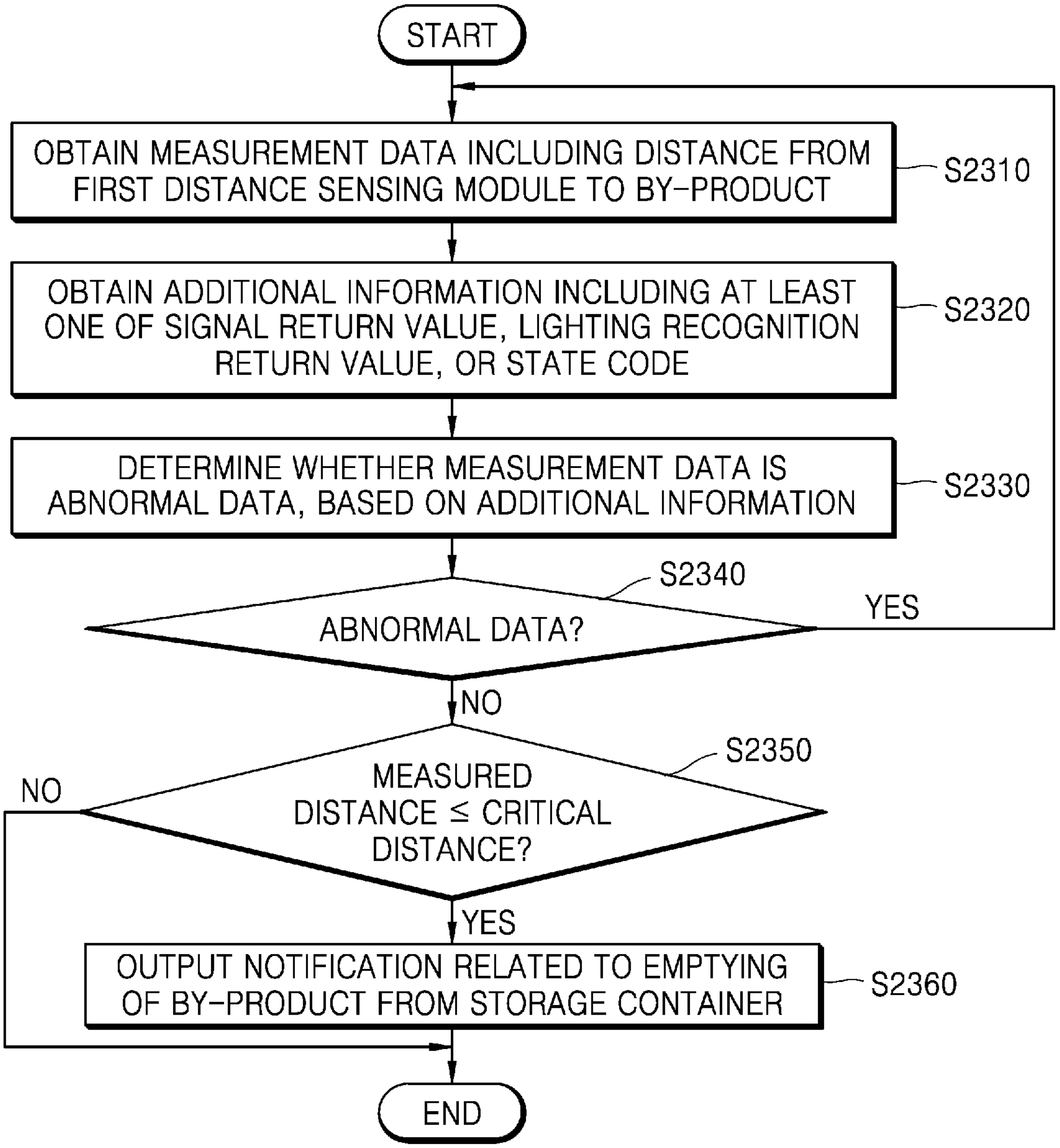
FIG. 23 is a flowchart of a method of determining whether measurement data is abnormal data, based on additional information of a distance sensing module, according to an embodiment of the disclosure.

FIG. 23 is a flowchart of a method of determining whether measurement data is abnormal data, based on additional information of the distance sensing module 1400, according to an embodiment of the disclosure.

In operation S2310, the food disposer 1000 according to an embodiment of the disclosure may obtain measurement data including the distance from the first distance sensing module 1410 to the by-product. For example, the at least one processor 1500 of the food disposer 1000 may receive the measurement data from the MCU 1402 of the first distance sensing module 1410.

In operation S2320, the food disposer 1000 according to an embodiment of the disclosure may obtain additional information including at least one of a signal return value, a lighting recognition return value, or a state code from the first distance sensing module 1410. For example, the at least one processor 1500 of the food disposer 1000 may receive, from the MCU 1402 of the first distance sensing module 1410, at least one of the signal return value, the lighting recognition return value, or the state code together with measurement data.

According to an embodiment of the disclosure, when an air gap occurs, light emitted by the light emitter may cause diffuse reflection. Accordingly, the intensity of the light in the light receiver may be lowered and the signal return value may be lowered. When the signal return value is low, the erroneous sensing probability of the first distance sensing module 1410 may increase.

According to an embodiment of the disclosure, when a light source (e.g., an infrared (IR) light source) is input outside of the time when the sensor 1401 transmits and receives a signal, the lighting recognition return value may increase. Because a high lighting recognition value means an increase in noise signal, the erroneous sensing probability of the first distance sensing module 1410 may increase as the lighting recognition value increases.

According to an embodiment of the disclosure, the first distance sensing module 1410 may output '0' as a state code in a normal state and may output a value other than 0 as a state code in an abnormal state (error state). For example, when the signal is low, when calibration is not accurately performed, when there is an abnormality in the main body of the first distance sensing module 1410, the MCU 1402 of the first distance sensing module 1410 may output an error code value other than 0 as a state code.

In operation S2330, the food disposer 1000 according to an embodiment of the disclosure may determine whether the measurement data is abnormal data, based on the additional information.

According to an embodiment of the disclosure, the at least one processor 1500 of the food disposer 1000 may determine the measurement data as abnormal data when the signal return value is less than a threshold value. For example, when the signal return value output from the first distance sensing module 1410 is 50% or less of a reference signal return value, the at least one processor 1500 of the food disposer 1000 may determine the measurement data of the first distance sensing module 1410 as abnormal data. The reference signal return value may be a signal return value that is output when the first distance sensing module 1410 normally measures the distance.

According to an embodiment of the disclosure, when the lighting recognition value output from the first distance sensing module 1410 is greater than a reference lighting recognition value, the at least one processor 1500 of the food disposer 1000 may determine the measurement data of the first distance sensing module 1410 as abnormal data. The reference lighting recognition value may be a lighting recognition value that is output when the first distance sensing module 1410 normally measures the distance.

According to an embodiment of the disclosure, the at least one processor 1500 of the food disposer 1000 may determine the measurement data of the first distance sensing module 1410 as normal data when the state code output from the first distance sensing module 1410 is ‘0’ and may determine the measurement data of the first distance sensing module 1410 as abnormal data when the state code is not ‘0.’

In operation S2340, when the measurement data is abnormal data (YES in S2340), the food disposer 1000 according to an embodiment of the disclosure may obtain measurement data again from the first distance sensing module 1400 (S2310).

In operation S2350, when the measurement data is normal data (NO in S2340), the food disposer 1000 according to an embodiment of the disclosure may determine whether the distance (measured distance) from the first distance sensing module 1410 to the by-product is less than or equal to the critical distance.

According to an embodiment of the disclosure, when the distance (measured distance) from the first distance sensing module 1410 to the by-product is greater than the critical distance, the food disposer 1000 may perform the food disposal operation without providing the notification related to emptying of the by-product from the storage container 1310. In addition, after the food disposal operation is completed, the food disposer 1000 may open the discharge port of the disposal assembly 1100 and automatically transfer the by-product newly produced in the disposal assembly 1100 to the storage container 1310.

In operation S2360, when the distance (measured distance) from the first distance sensing module 1410 to the by-product is less than or equal to the critical distance, the food disposer 1000 according to an embodiment of the disclosure may output the notification related to emptying of the by-product from the storage container 1310.

In addition, when the distance (measured distance) from the first distance sensing module 1410 to the by-product is less than or equal to the critical distance, the food disposer 1000 may stop the food disposal operation or close the discharge port of the disposal assembly 1100 so that the by-product newly produced in the disposal assembly 1100 is not transferred to the storage container 1310.

According to an embodiment of the disclosure, The food disposer 1000 may determine whether the measurement data of the first distance sensing module 1410 is abnormal data, based on the additional information including at least one of the signal return value, the lighting recognition return value, or the state code, thereby preventing the notification related to emptying of the by-product from being erroneously provided or the food disposal operation from being erroneously stopped due to the erroneous sensing of the first distance sensing module 1400.

On the other hand, the operation by which the food disposer 1000 provides the notification by using the distance sensing module 1400 has been described as an example, but the disclosure is not limited thereto. For example, other home appliances (e.g., vacuum cleaners, refrigerators, etc.) may also provide notifications or control operations by using the distance sensing module 1400.

Figure 24:
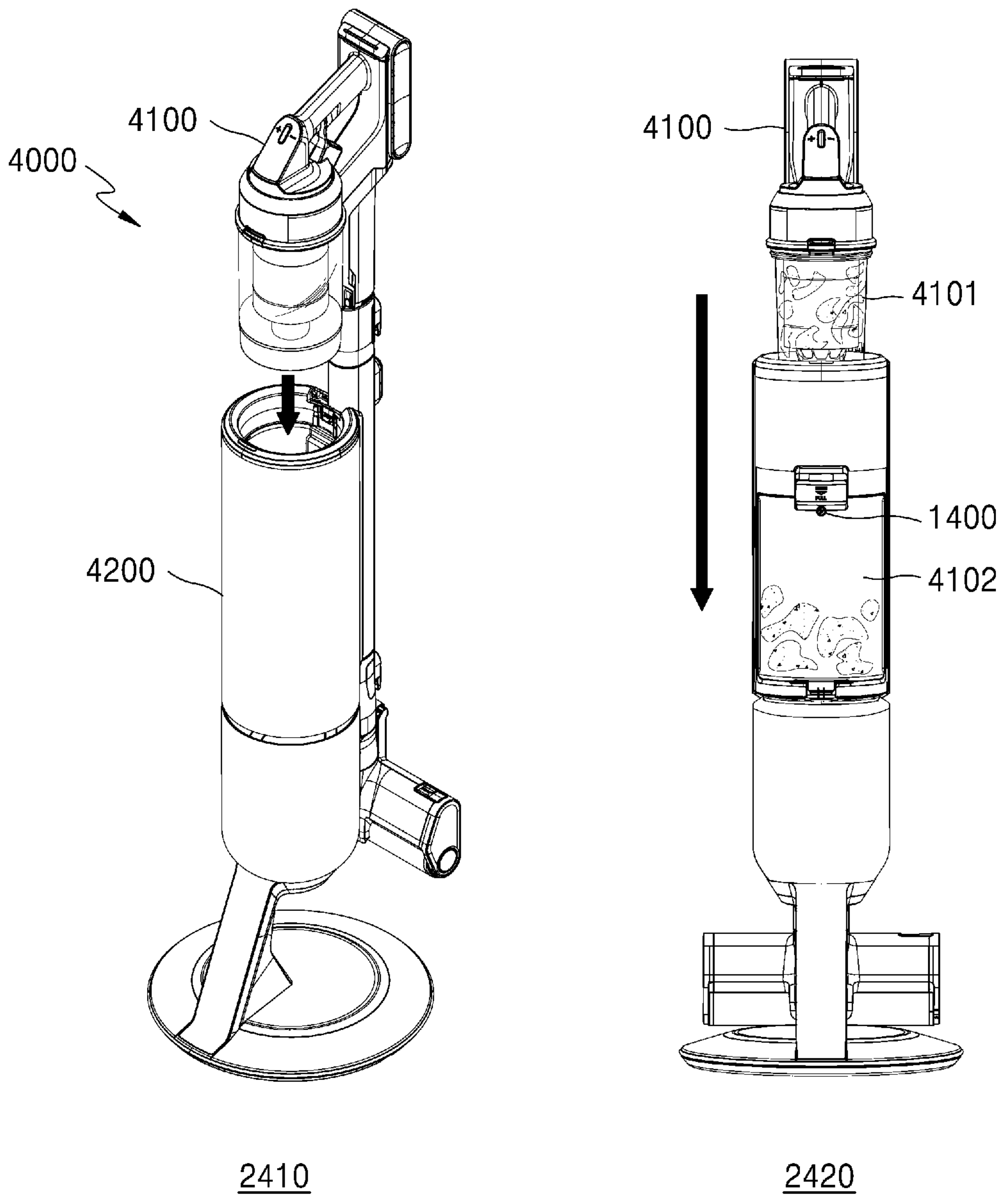
FIG. 24 is a diagram for describing a vacuum cleaner device that provides a dust bag replacement notification by using a distance sensing module, according to an embodiment of the disclosure.

FIG. 24 is a diagram for describing a vacuum cleaner device 4000 that provides a dust bag replacement notification by using a distance sensing module 1400, according to an embodiment of the disclosure.

Referring to FIG. 24, the vacuum cleaner device 4000 according to an embodiment of the disclosure may include a cordless vacuum cleaner 4100 and a station device 4200. However, all elements illustrated in FIG. 24 are not essential elements. The vacuum cleaner device 4000 may be implemented with more elements than the elements illustrated in FIG. 24, or may be implemented with fewer elements than the elements illustrated in FIG. 24.

The cordless vacuum cleaner 4100 may refer to a vacuum cleaner that has a built-in rechargeable battery and does not require a power cable to be connected to a discharge port during cleaning. A user may move the cordless vacuum cleaner 4100 back and forth by using a handle of a cleaner body, so that a brush device (cleaner head) sucks up dust or foreign matters (e.g., hair, garbage, etc.) from the surface to be cleaned. Foreign matters sucked up from the surface to be cleaned through the brush device may be collected in a dust collector (also referred to as a dust container) 4101 of the cleaner body. The cordless vacuum cleaner 4100 may include a suction motor that forms a vacuum inside the cordless vacuum cleaner 4100. Hereinafter, for convenience of explanation, the suction motor of the cordless vacuum cleaner 4100 may be referred to as a first suction motor. The cordless vacuum cleaner 4100 may include a communication interface for communication with the station device 4200. For example, the cordless vacuum cleaner 4100 may transmit and receive data to and from the station device 4200 through a wireless personal area network (WPAN). The cleaner body may further include at least one processor, a memory storing software related to control of the cordless vacuum cleaner 4100, and the like, but the disclosure is not limited thereto.

The station device 4200 may be a device for dust discharge, battery charging, or storage of the cordless vacuum cleaner 4100. The station device 4200 may also be referred to as a clean station. According to an embodiment of the disclosure, the station device 4200 may communicate with the cordless vacuum cleaner 4100 or the server device 2000 through a network. For example, the station device 4200 may transmit and receive data to and from the cordless vacuum cleaner 4100 through a WPAN, without passing through an access point (AP). The station device 4200 may transmit and receive data to and from the server device 2000 through an AP that connects a local area network (LAN), to which the station device 4200 is connected, to a wide area network (WAN), to which the server device 2000 is connected. For example, the station device 4200 may be connected to the cordless vacuum cleaner 4100 through Bluetooth Low Energy (BLE) communication, and may be connected to the server device 2000 through Wi-Fi™ (IEEE 802.11) communication, but the disclosure is not limited thereto.

According to an embodiment of the disclosure, the station device 4200 may include a communication interface, at least one processor, a suction motor (hereinafter referred to as a second suction motor), and a collecting portion 4102, but the disclosure is not limited thereto. The second suction motor may be a device that generates suction force for discharging, from the cordless vacuum cleaner 4100, foreign matters collected in the dust collector 4101 of the cordless vacuum cleaner 4100. For example, the second suction motor may generate a pressure difference inside the dust collector 4101. The second suction motor may be located below the collecting portion 4102 in a state in which the station device 4200 is erected.

The collecting portion 4102 is a space in which foreign matters discharged from the dust collector 4101 of the cleaner body may be collected. The collecting portion 4102 may include a dust bag in which foreign matters discharged from the dust collector 4101 are collected. The dust bag may include a material that allows air to pass therethrough and prevents foreign matters from passing therethrough, so as to collect foreign matters introduced from the dust collector 4101 into the collecting portion 4102. The dust bag may be detachable from the collecting portion 4102. The station device 4200 may include an ultraviolet light emitter that emits ultraviolet light to the collecting portion 4102. The ultraviolet light emitter may include a plurality of ultraviolet lamps.

Referring to 2410 of FIG. 24, after using the cordless vacuum cleaner 4100, the user may dock the cordless vacuum cleaner 4100 on the station device 4200. The station device 4200 may use a docking detection sensor to determine whether the cordless vacuum cleaner 4100 is docked on the station device 4200. The docking detection sensor may be a tunnel magneto-resistance (TMR) sensor, but the disclosure is not limited thereto. When the user docks the cleaner body on the station device 4200, a distance between a magnetic material attached to the dust collector 4101 of the cleaner body and the docking detection sensor becomes closer, and thus, the docking detection sensor may detect the magnetic material attached to the dust collector 4101. When the docking detection sensor detects the magnetic material, the station device 4200 may identify that the cordless vacuum cleaner 4100 is docked thereon.

Referring to 2410 in FIG. 24, according to an embodiment of the disclosure, when the cordless vacuum cleaner 4100 is docked on the station device 4200, the station device 4200 may measure the distance from the distance sensing module 1400 to the foreign matter in the collecting portion 4102 by using the distance sensing module 1400 provided at the upper end of the collecting portion 4102. Because the distance sensing module 1400 is provided at the upper end of the collecting portion 4102, the loading amount of the foreign matter in the collecting portion 4102 may increase as the distance measured by the distance sensing module 1400 decreases.

According to an embodiment of the disclosure, when the distance measured by the distance sensing module 1400 is less than or equal to the critical distance, the station device 4200 may provide a notification related to duct bag replacement, without opening the cover of the dust collector 4101 included in the cordless vacuum cleaner 4100. That is, when the distance measured by the distance sensing module 1400 is less than or equal to the critical distance, the station device 4200 may determine that the dust bag is full of foreign matters, and may provide the notification related to dust bag replacement, without performing a dust discharge operation.

Figure 25:
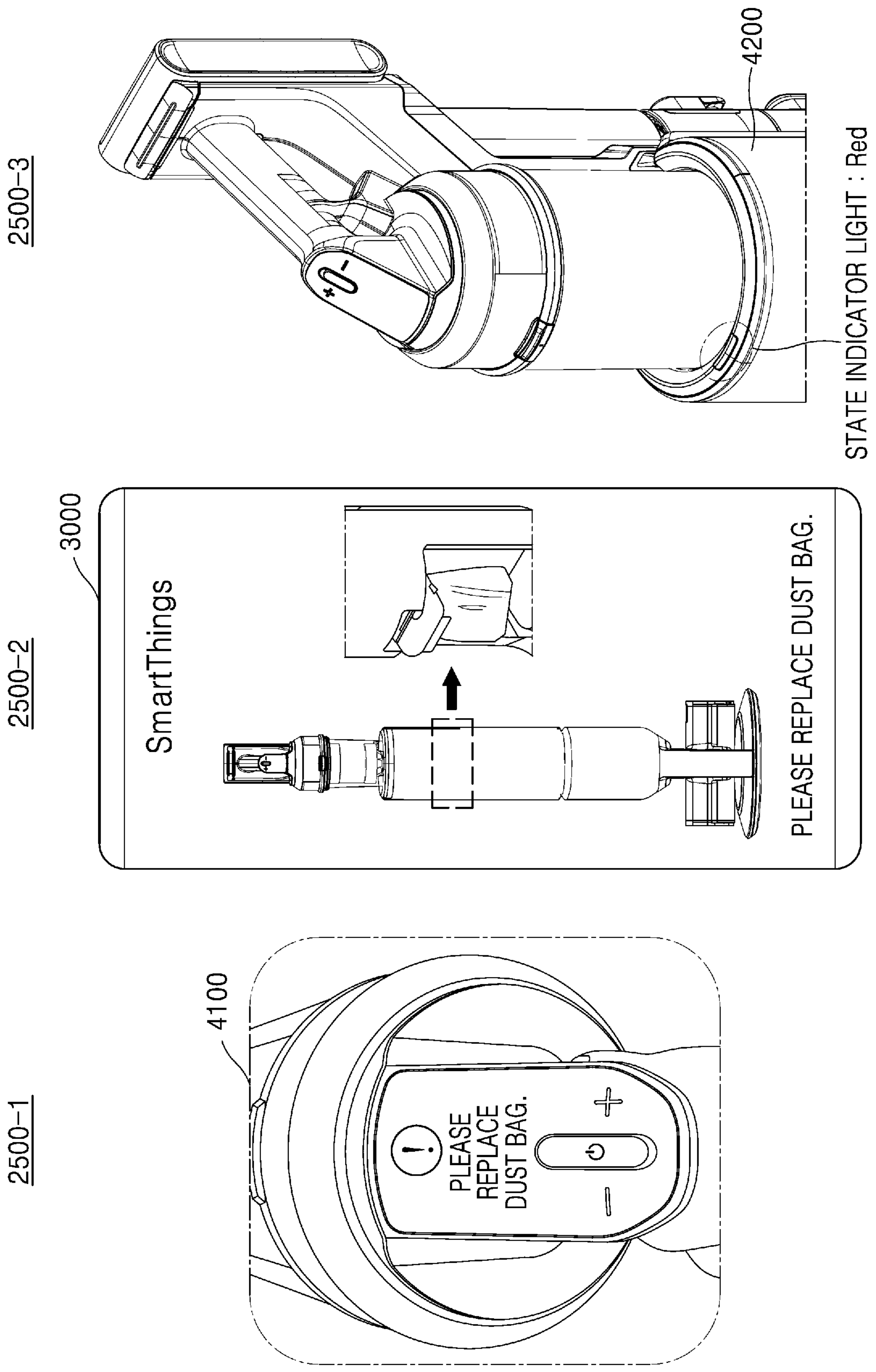
FIG. 25 is a diagram for describing a dust bag replacement notification according to an embodiment of the disclosure.

Referring to 2500-1 of FIG. 25, when the distance measured by the distance sensing module 1400 is less than or equal to the critical distance, the station device 4200 may transmit information indicating to replace the dust bag of the station device 4200 to the cordless vacuum cleaner 4100 through short-range wireless communication (e.g., BLE communication). In this case, the cordless vacuum cleaner 4100 may control the output interface (e.g., LCD) to output the notification to replace the dust bag of the station device 4200. The user may confirm the notification of the cordless vacuum cleaner 4100 and replace the dust bag of the station device 4200.

Referring to 2500-2 of FIG. 25, the station device 4200 may transmit information indicating that the dust bag needs to be replaced to the server device 2000 through long-range communication (e.g., Wi-Fi™ communication). At this time, the server device 2000 may transmit information indicating to replace the dust bag of the station device 4200 to the user terminal 3000 registered with the same account as the station device 4200. The user terminal 3000 may output the notification to replace the dust bag on the execution window of the application, based on the information received from the server device 2000.

Referring to 2500-3 of FIG. 25, the station device 4200 may control a state indicator light (e.g., LED) to output a color (e.g., red) indicating that the dust bag is full. When the state indicator light of the station device 4200 turns red, the user may recognize that the dust bag needs to be replaced.

On the other hand, when the distance measured by the distance sensing module 1400 is greater than the critical distance, the station device 4200 may control a step motor to open the cover of the dust collector 4101 included in the cordless vacuum cleaner 4100. After the cover of the dust collector 4101 is opened, the dust discharge operation may be performed to discharge dust from the dust collector 4101 to the collecting portion 4102. That is, when the distance measured by the distance sensing module 1400 is greater than the critical distance, the station device 4200 may determine that there is a space left in the collecting portion 4102 to store foreign matter, and may automatically or manually perform the dust discharge operation.

Figure 26:
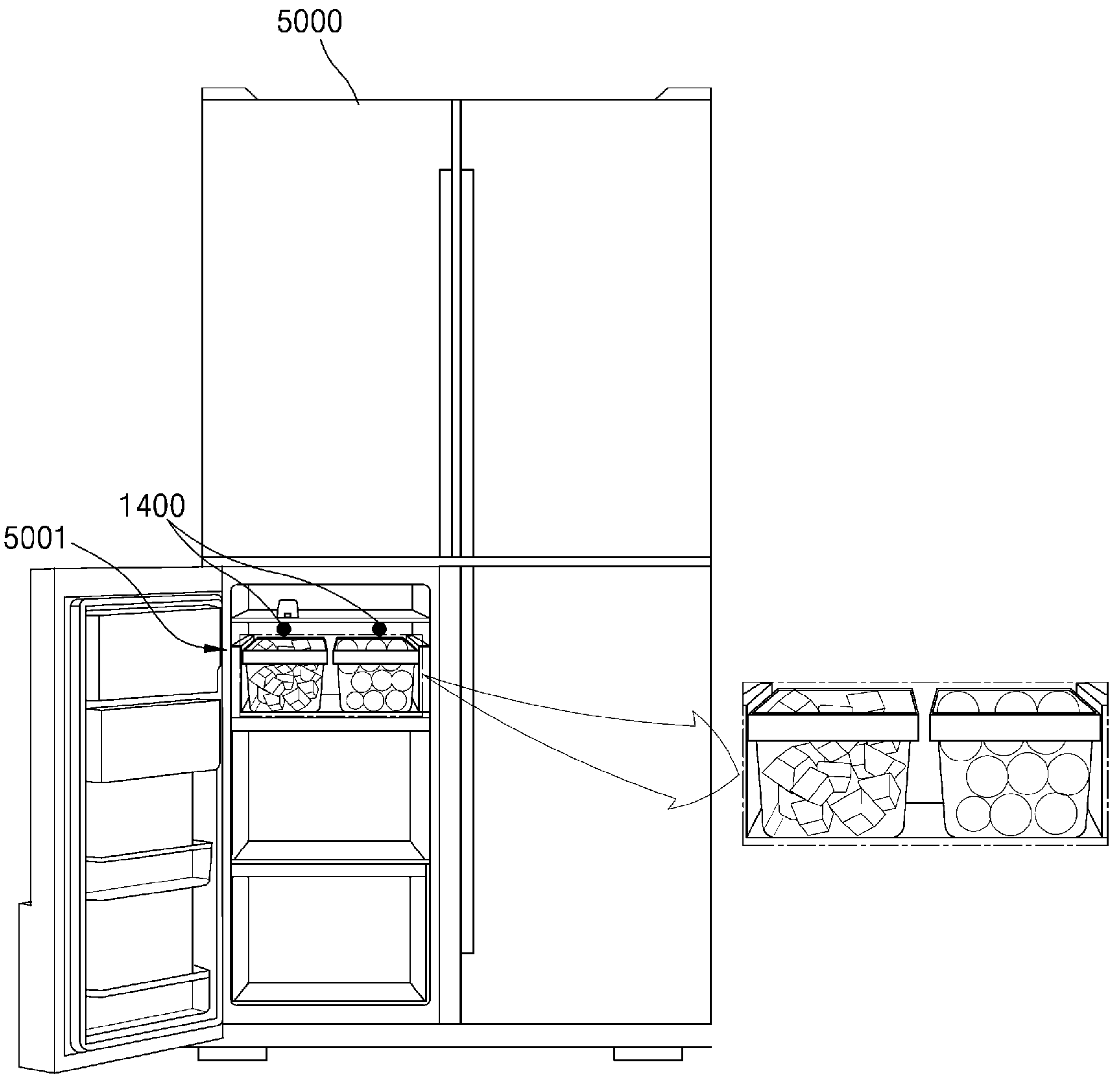
FIG. 26 is a diagram for describing a refrigerator that controls ice formation by using a distance sensing module, according to an embodiment of the disclosure.

FIG. 26 is a diagram for describing a refrigerator 5000 that controls ice formation by using a distance sensing module 1400, according to an embodiment of the disclosure.

The refrigerator 5000 according to an embodiment of the disclosure may include a main body.

The main body may include an inner case, an outer case provided outside the inner case, and a heat insulator between the inner case and the outer case.

The inner case may include at least one of a case, a plate, a panel, or a liner, which forms a storage compartment. The inner case may be formed as a single body or may be formed by assembling a plurality of plates. The outer case may form the exterior of the main body, and may be coupled to the outer side of the inner case so that the heat insulator is between the inner case and the outer case.

The heat insulator may insulate the inside and the outside of a storage compartment so that the inside of the storage compartment is maintained at a set appropriate temperature, without being affected by an environment outside the storage compartment. According to an embodiment of the disclosure, the heat insulator may include a foam heat insulator. The foam heat insulator may be molded by injecting and foaming urethane foam, in which polyurethane and a foaming agent are mixed, between the inner case and the outer case.

According to an embodiment of the disclosure, the heat insulator may include, in addition to the foam heat insulator, a vacuum heat insulator, or the heat insulator may include only a vacuum heat insulator instead of the foam heat insulator. The vacuum heat insulator may include a core material and an envelope that accommodates the core material and seals the interior with a vacuum or a pressure close to vacuum. However, the heat insulator is not limited to the foam heat insulator or the vacuum heat insulator and may include various materials usable for heat insulation.

The storage compartment may include a space defined by the inner case. The storage compartment may further include the inner case defining the space corresponding to the storage compartment. Various items, such as food, medicine, or cosmetics, may be stored in the storage compartment, and at least one side of the storage compartment may be opened so as to put in and take out items.

The refrigerator 5000 may include one or more storage compartments. When two or more storage compartments are formed in the refrigerator 5000, the respective storage compartments may have different purposes and may be maintained at different temperatures. To this end, the storage compartments may be partitioned from each other by partition walls each including a heat insulator.

The storage compartment may be maintained in an appropriate temperature range depending on the purpose, and may include a refrigerating compartment, a freezing compartment, or a changeable temperature compartment, which is divided according to the purpose and/or the temperature range. The refrigerating compartment may be maintained at a temperature suitable for keeping items refrigerated, and the freezing compartment may be maintained at a temperature suitable for keeping items frozen. The refrigerating may refer to cooling items to the extent that the items do not freeze. As an example, the refrigerating compartment may be maintained in a range of about 0° C. to about 7° C. The freezing may refer to freezing or cooling items to remain frozen. As an example, the freezing compartment may be maintained in a range of about −20° C. to about −1° C. The changeable temperature compartment may be used as either a refrigerating compartment or a freezing compartment according to or regardless of a user's choice.

The storage compartment may also be referred to as various names, such as a vegetable compartment, a fresh compartment, a cooling compartment, and an ice making compartment, in addition to the refrigerating compartment, the freezing compartment, and the changeable temperature compartment. The terms "refrigerating compartment," "freezing compartment," and "changeable temperature compartment" as used herein should be understood as encompassing the storage compartments having the corresponding purposes and temperature ranges.

According to an embodiment of the disclosure, the refrigerator 5000 may include at least one door configured to open and close one open side of the storage compartment. The at least one door may be provided to open and close at least one storage compartment, or one door may be provided to open and close a plurality of storage compartments. The door may be rotatably or slidably installed on the front surface of the main body.

The door may be configured to close the storage compartment when the door is closed. Like the main body, the door may include a heat insulator to insulate the storage compartment when the door is closed.

According to an embodiment of the disclosure, the door may include a door outer plate forming the front surface of the door, a door inner plate forming the rear surface of the door and facing the storage compartment, an upper cap, a lower cap, and a door heat insulator provided therein.

A gasket may be provided at the edge of the door inner plate so as to seal the storage compartment by being in close contact with the front surface of the main body when the door is closed. The door inner plate may include a dyke protruding backward to mount a door basket capable of storing items.

According to an embodiment of the disclosure, the door may include a door body, and a front panel detachably coupled to the front side of the door body and forming the front surface of the door. According to an embodiment of the disclosure, the door may include a door outer plate forming the front surface of the door body, a door inner plate forming the rear surface of the door body and facing the storage compartment, an upper cap, a lower cap, and a door heat insulator provided therein.

The refrigerator 5000 may be classified into a French door type refrigerator, a side-by-side type refrigerator, a bottom mounted freezer (BMF), a top mounted freezer (TMF), or a one-door refrigerator 5000 according to the arrangement of the door and the storage compartment.

According to an embodiment of the disclosure, the refrigerator 5000 may include a cold air supply device provided to supply cold air to the storage compartment.

The cold air supply device may include a machine, an appliance, an electronic device, and/or a combination system thereof, which are capable of generating and guiding cold air so as to cool the storage compartment.

According to an embodiment of the disclosure, the cold air supply device may generate cold air through a refrigeration cycle including compression, condensation, expansion, and evaporation of a refrigerant. To this end, the cold air supply device may include a refrigeration cycle device having a compressor, a condenser, an expansion device, and an evaporator, which are capable of driving a refrigeration cycle. According to an embodiment of the disclosure, the cold air supply device may include a semiconductor, such as a thermoelectric element. The thermoelectric element may cool the storage compartment by heating and cooling operations through a Peltier effect.

According to an embodiment of the disclosure, the refrigerator 5000 may include a machine compartment in which at least some parts belonging to the cold air supply device are provided.

The machine compartment may be partitioned and insulated from the storage compartment so as to prevent heat generated from parts provided in the machine compartment from being transferred to the storage compartment. The inside of the machine compartment may be configured to communicate with the outside of the main body so as to dissipate heat from parts provided inside the machine compartment.

According to an embodiment of the disclosure, the refrigerator 5000 may include a dispenser provided on the door to dispense water and/or ice. The dispenser may be provided on the door so that the user may access the dispenser without opening the door.

According to an embodiment of the disclosure, the refrigerator 5000 may include a controller that controls the refrigerator 5000.

The controller may include a memory storing or memorizing programs and/or data for controlling the refrigerator 5000, and a processor that outputs a control signal for controlling the cold air supply device or the like according to the programs and/or data stored in the memory.

The memory may store or record a variety of information, data, instructions, programs, etc. required for the operation of the refrigerator 5000. The memory may store temporary data generated while control signals for controlling the elements included in the refrigerator 5000 are generated. The memory may include at least one of volatile memory or non-volatile memory, or a combination thereof.

The processor controls overall operations of the refrigerator 5000. The processor may control the elements of the refrigerator 5000 by executing the programs stored in the memory. The processor may include a separate NPU that performs the operation of an AI model. In addition, the processor may include a CPU, a GPU, and the like. The processor may generate a control signal for controlling the operation of the cold air supply device. For example, the processor may receive temperature information of the storage compartment from a temperature sensor and generate a cooling control signal for controlling the operation of the cold air supply device, based on the temperature information of the storage compartment.

In addition, the processor may process a user input of a user interface and control the operation of the user interface according to programs and/or data memorized and/or stored in the memory. The user interface may be provided by using an input interface and an output interface. The processor may receive the user input from the user interface. In addition, the processor may transmit, to the user interface, a display control signal and image data for displaying an image on the user interface in response to the user input.

The processor and the memory may be provided integrally or separately. The processor may include one or more processors. For example, the processor may include a main processor and at least one sub-processor. The memory may include one or more memories.

According to an embodiment of the disclosure, the refrigerator 5000 may include a memory and a processor that controls all elements included in the refrigerator 5000, and may include a plurality of memories and a plurality of processors that individually control the elements of the refrigerator 5000. For example, the refrigerator 5000 may include a memory and a processor that controls the operation of the cold air supply device according to the output of the temperature sensor. In addition, the refrigerator 5000 may separately include a memory and a processor that controls the operation of the user interface according to the user input.

The communication module may communicate with an external device, such as a server, a mobile device, or other home appliances, through a peripheral AP. The AP may connect a LAN, to which the refrigerator 5000 or a user equipment is connected, to a WAN, to which the server is connected. The refrigerator 5000 or the user equipment may be connected to the server through the WAN.

The input interface may include a key, a touch screen, a microphone, etc. The input interface may receive the user input and transmit the received user input to the processor.

The output interface may include a display, a speaker, etc. The output interface may output various notifications, or messages, which are generated by the processor.

Referring to FIG. 26, the refrigerator 5000 may further include an ice maker 5001 configured to make ice. The ice maker 5001 may include an ice tray that stores water, an ice separator that separates ice from the ice tray, and an ice bucket that stores ice made in the ice tray. A plurality of buckets may be provided.

According to an embodiment of the disclosure, the distance sensing module 1400 may be provided at the upper end of the ice maker 5001. When the ice maker 5001 includes a plurality of ice buckets that store ice, a plurality of distance sensing modules 1400 may be provided at the upper end of the ice maker 50001.

According to an embodiment of the disclosure, the refrigerator 5000 may measure the distance from the distance sensing module 1400 to the ice in the ice bucket by using the distance sensing module 1400 provided at the upper end of the ice maker 5001. Because the distance sensing module 1400 is provided at the upper end of the ice maker 5001, the loading amount of ice in the ice bucket may increase as the measured distance decreases. Accordingly, according to an embodiment of the disclosure, the refrigerator 5000 may identify the loading amount of ice in the ice bucket, based on the measured distance. The refrigerator 5000 may provide information about the loading amount of ice in the ice bucket to the user through the output interface.

According to an embodiment of the disclosure, when the distance from the distance sensing module 1400 to the ice in the ice bucket is less than or equal to the critical distance, the refrigerator 5000 may stop the ice making operation of the ice maker 5001. When the distance from the distance sensing module 1400 to the ice in the ice bucket is less than or equal to the critical distance, the refrigerator 5000 may stop the ice making operation because the ice bucket may be full of ice. For example, the processor of the refrigerator 5000 may control the dispenser not to supply water to the ice tray or may control the ice separator not to separate ice from the ice tray.

On the other hand, the refrigerator 5000 may obtain the loading ratio of ice in the ice bucket, based on the distance from the distance sensing module 1400 to the ice in the ice bucket. In this case, when the loading ratio of ice is lower than a critical ratio (e.g., %), the refrigerator 5000 may control the ice maker 5001 to perform the ice making operation. For example, the processor of the refrigerator 5000 may control the dispenser to supply water to the ice tray or may control the ice separator to separate ice from the ice tray.

Therefore, according to an embodiment of the disclosure, the refrigerator 5000 may use the distance sensing module 1400 to control the ice making operation so that the appropriate amount of ice is maintained in the ice bucket, or may provide information about the loading amount of ice in the ice bucket to the user.

Figure 27:
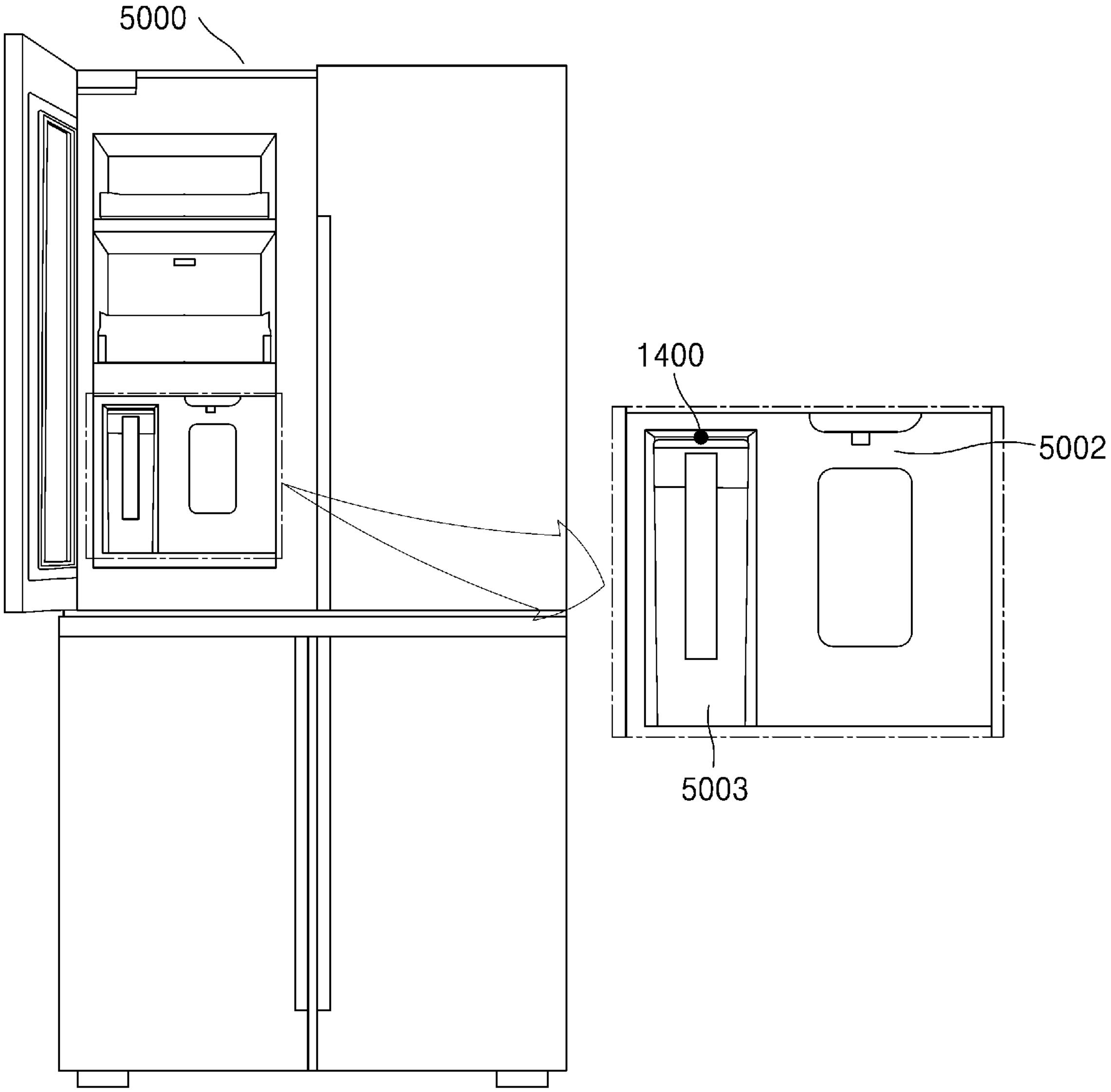
FIG. 27 is a diagram for describing a refrigerator that automatically fills water in a water tank by using a distance sensing module, according to an embodiment of the disclosure.

FIG. 27 is a diagram for describing a refrigerator 5000 that automatically fills water in a water tank 5003 by using a distance sensing module 1400, according to an embodiment of the disclosure.

Referring to FIG. 27, the refrigerator 5000 may include a dispenser 5002 that provides purified water and/or ice, and the water tank 5003 that stores water automatically supplied from the dispenser 5002. The water tank 5003 may include an infuser into which a tea bag may be put. In addition, the distance sensing module 1400 may be provided in a cover of the water tank 5003.

According to an embodiment of the disclosure, the refrigerator 5000 may measure the distance from the distance sensing module 1400 provided in the cover of the water tank 5003 to water in the water tank 5003. Because the distance sensing module 1400 is provided at the upper end of the water tank 5003, the amount of water stored in the water tank 5003 may increase as the measured distance decreases. Accordingly, according to an embodiment of the disclosure, the refrigerator 5000 may identify the amount of water in the water tank 5003, based on the measured distance. The refrigerator 5000 may provide information about the amount of water in the water tank 5003 to the user through the output interface.

According to an embodiment of the disclosure, when the distance from the distance sensing module 1400 to the water in the water tank 5003 is less than or equal to the critical distance, the refrigerator 5000 may control the dispenser 5002 to stop supplying water to the water tank 5003. When the distance from the distance sensing module 1400 to the water in the water tank 5003 is less than or equal to the critical distance, the water tank 5003 may be full of water. Accordingly, in order to prevent the water tank 5003 from overflowing, the refrigerator 5000 may control the dispenser 5002 to stop supplying water to the water tank 5003.

According to an embodiment of the disclosure, the refrigerator 5000 may obtain the ratio of water in the water tank 5003, based on the distance from the distance sensing module 1400 to the water in the water tank 5003. In this case, when the ratio of water in the water tank 5003 is lower than the critical ratio (e.g., 10%), the refrigerator 5000 may control the dispenser 5002 to supply water to the water tank 5003.

Therefore, according to an embodiment of the disclosure, the refrigerator 5000 may use the distance sensing module 1400 to control the dispenser 5002 so that the appropriate amount of water is maintained in the water tank 5003, or may provide information about the amount of water in the water tank 5003 to the user.

According to an embodiment of the disclosure, because the notification related to emptying of the by-product from the storage container 1310 according to the loading height of the by-product in the storage container 1310, the food disposer 1000 may prevent the by-product from overflowing in the storage container 1310.

According to an embodiment of the disclosure, because the operation of the disposal assembly 110 or the opening and closing of the discharge port of the disposal assembly 1100 may be adjusted according to the loading height of the by-product in the storage container 1310, the food disposer 1000 may prevent the by-product from overflowing in the storage container 1310.

According to an embodiment of the disclosure, the food disposer 1000 may identify the loading amount of the by-product in the storage container 1310 by using the distance sensing module 1400 and may provide information about the loading amount of the by-product in real time.

The food disposer 1000 according to an embodiment of the disclosure may include the disposal assembly 1100 that produces the by-product by drying or pulverizing food, the transfer pipe 1200 that is connected to the disposal assembly 1100 and transfers the by-product produced in the disposal assembly 1100, the storage container 1310 that is connected to the lower portion of the transfer pipe 1200 and stores the by-product transferred through the transfer pipe 1200, the first distance sensing module 1410 that is spaced apart from the transfer pipe 1200 by a certain distance and provided in the cover 1320 that seals the upper portion of the storage container 1310, and measures the distance to the by-product stored in the storage container 1310, and the at least one processor 1500 that controls the output interface to output the notification related to emptying of the by-product from the storage container 1310 when the distance from the first distance sensing module 1410 to the by-product, which is measured by the first distance sensing module 1410, is less than or equal to the critical distance.

The first distance sensing module 1410 may be tilted by a certain angle in a direction in which the transfer pipe 1200 is located, and may be provided in the cover 1320 that seals the upper portion of the storage container 1310.

The first distance sensing module 1410 may obtain, as the distance from the first distance sensing module 1410 to the by-product, an average value of the remaining distance values excluding the lowest value and the highest value among distance values measured for a certain time or an average value of the remaining distance values excluding the lowest value and the highest value among a certain number of distance values.

The first distance sensing module 1410 may include: the sensor 1401 including the light emitter that emits light and the light receiver that receives incident light; and the MCU 1402 that processes raw data obtained from the sensor 1401.

The first distance sensing module 1410 may be coupled to the sensor case 1403 including the light emitter slit 1403*a* through which some of the light emitted by the light emitter passes and the light receiver slit 1403*b* through which some of the light incident on the light receiver passes. The sensing area of the first distance sensing module 1410 may be adjusted by the first width of the light emitter slit 1403*a* and the second width of the light receiver slit 1403*b*.

The surface of the first distance sensing module 1410 on which the sensor 1401 is provided may be coupled to the transparent cover 1404 such that foreign matters are prevented from being attached.

The food disposer 1000 may further include the second distance sensing module 1420 provided on one side of the storage container 1310. The second distance sensing module 1420 may be located a certain distance below the cover 1320 provided to seal the upper portion of the storage container 1310, and may sense the by-product accumulated above the height at which the second distance sensing module 1420 is located.

The output interface may include at least one of a display or a speaker. When the by-product is sensed by the second distance sensing module 1420, the at least one processor 1500 may control the display to display the notification related to emptying of the by-product from the storage container 1310, or may control the speaker to output, as a sound signal, the notification related to emptying of the by-product from the storage container 1310.

The food disposer 1000 may further include the capacitive sensor 1430 provided below the outer circumferential surface of the transfer pipe 1200. The at least one processor 1500 may sense through the capacitive sensor 1430 that the storage container 1310 is full of the by-product.

The at least one processor 1500 may identify the loading amount of the by-product in the storage container 1310, based on the distance from the first distance sensing module 1410 to the by-product, which is measured by the first distance sensing module 1410. The at least one processor 1500 may provide information about the loading amount of the by-product.

When the distance from the first distance sensing module 1410 to the by-product is less than or equal to the critical distance, the at least one processor 1500 may control the opening/closing portion 1106 to close the discharge port of the disposal assembly 1100 in order to prevent the by-product newly produced in the disposal assembly 1100 from being discharged to the storage container 1310 through the transfer pipe 1200.

When the distance from the first distance sensing module 1410 to the by-product is greater than the critical distance, the at least one processor 1500 may control the opening/closing portion 1106 to open the discharge port of the disposal assembly 1100 so that the by-product newly produced in the disposal assembly 1100 is discharged to the storage container 1310 through the transfer pipe 1200.

When the distance from the first distance sensing module 1410 to the by-product is less than or equal to the critical distance, the at least one processor 1500 may control the disposal assembly 1100 not to perform the operation of drying or pulverizing food in the disposal assembly 1100.

The at least one processor 1500 may obtain additional information including at least one of the signal return value, the lighting recognition return value, or the state code from the first distance sensing module 1410. The at least one processor 1500 may identify whether measurement data including the distance from the first distance sensing module 1410 to the by-product is abnormal data, based on the additional information.

According to an embodiment of the disclosure, an operating method of the food disposer 1000, which includes the disposal assembly 1100 that produces by-product by drying or pulverizing food, the transfer pipe 1200 that transfers the by-product, and the storage container 1310 that stores the by-product, may include measuring the distance from the first distance sensing module 1410 to the by-product stored in the storage container 1310 through the first distance sensing module 1410 spaced apart from the transfer pipe 1200 by a certain distance and provided in the cover 1320 that seals the upper portion of the storage container 1310 (S810), and outputting the notification related to emptying of the by-product from the storage container 1310 when the measured distance is less than or equal to the critical distance (S830).

The measuring of the distance according to an embodiment of the disclosure may include obtaining, as the distance from the first distance sensing module 1410 to the by-product, an average value of the remaining distance values excluding the lowest value and the highest value among distance values measured for a certain time or an average value of the remaining distance values excluding the lowest value and the highest value among a certain number of distance values.

The food disposer 1000 may include the second distance sensing module 1420 located a certain distance below the cover 1320 provided to seal the upper portion of the storage container 1310. The operating method of the food disposer 1000 according to an embodiment of the disclosure may include, when the second distance sensing module 1420 senses the by-product accumulated above the height at which the second distance sensing module 1420 is located, displaying, on the display, the notification related to emptying of the by-product from the storage container 1310, or outputting, as the sound signal, the notification related to emptying of the by-product from the storage container 1310 through the speaker.

The operating method of the food disposer 1000 according to an embodiment of the disclosure may include identifying the loading amount of the by-product in the storage container 1310, based on the measured distance (S1920), and providing information about the loading amount of the by-product (S1930).

The operating method of the food disposer 100 according to an embodiment of the disclosure may include, when the measured distance is less than or equal to the critical distance, controlling the opening/closing portion 1106 to close the discharge port of the disposal assembly 1100 in order to prevent the by-product newly produced in the disposal assembly 1100 from being discharged to the storage container 1310 through the transfer pipe 1200.

The operating method of the food disposer 1000 according to an embodiment of the disclosure may include obtaining additional information including at least one of the signal return value, the lighting recognition return value, or the state code from the first distance sensing module 1410 (S2320), and identifying whether measurement data including the measured distance is abnormal data, based on the additional information (S2330).

A machine-readable storage medium may be provided in the form of a non-transitory storage medium. The "non-transitory storage medium" is a tangible device and only means not including a signal (e.g., electromagnetic wave). This term does not distinguish between a case where data is semi-permanently stored in a storage medium and a case where data is temporarily stored in a storage medium. For example, the non-transitory storage medium may include a buffer in which data is temporarily stored.

According to an embodiment of the disclosure, the methods according to various embodiments of the disclosure may be provided by being included in a computer program product. The computer program products may be traded between a seller and a buyer as commodities. The computer program product may be distributed in the form of a machine-readable storage medium (e.g., CD-ROM), or may be distributed (e.g., downloaded or uploaded) online either via an application store or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

The invention claimed is:

1. A food disposer comprising:

a disposal assembly configured to produce a by-product by drying or pulverizing food;

a transfer pipe, connectable to the disposal assembly, to transfer the by-product produced in the disposal assembly while the transfer pipe is connected to the disposal assembly;

a storage container, connectable to a lower portion of the transfer pipe, to store the by-product in the disposal assembly transferred through the transfer pipe while the storage container is connected to the lower portion of the transfer pipe;

a distance sensing module, arrangeable relative to a cover that seals an upper portion of the storage container and spaced apart from the transfer pipe by a certain distance, the distance sensing module being configured to measure a distance from the distance sensing module to the by-product stored in the storage container; and at least one processor configured to control an output interface to output a notification related to emptying of the by-product from the storage container based on the distance from the distance sensing module to the by-product, which is measured by the distance sensing module, being less than or equal to a critical distance, wherein the distance sensing module is a first distance sensing module and the food disposer further comprises a second distance sensing module arrangeable on one side of the storage container, and wherein the second distance sensing module arrangeable at a certain distance below the cover that seals the upper portion of the storage container and the second distance sensing module is configured to sense the by-product that is accumulated above a height at which the second distance sensing module is located.

2. The food disposer of claim 1, wherein the distance sensing module is tilted by a certain angle relative to a direction along which the transfer pipe is connected to the disposal assembly, and the distance sensing module is on the cover of the storage container.

3. The food disposer of claim 1, wherein the distance sensing module is further configured to obtain, as the distance from the distance sensing module to the by-product, an average value of distance values excluding a lowest value and a highest value among distance values measured for a certain time, or an average value of distance values excluding a lowest value and a highest value among a certain number of distance values.

4. The food disposer of claim 1, wherein the distance sensing module comprises:

a sensor comprising a light emitter configured to emit light and a light receiver configured to receive incident light; and a microcontroller (MCU) to process raw data obtained from the sensor.

5. The food disposer of claim 4, further comprising a sensor case to which the distance sensing module is couplable, the sensor case comprising:

a light emitter slit through which some of the light emitted by the light emitter passes and a light receiver slit through which some of the incident light on the light receiver passes; and a sensing area of the distance sensing module is adjustable by a first width of the light emitter slit and a second width of the light receiver slit.

6. The food disposer of claim 4, wherein the sensor is on a surface of the distance sensing module, and the surface is couplable to a transparent cover such that foreign matters are prevented from being attached.

7. The food disposer of claim 1, wherein the output interface comprises at least one of a display or a speaker, and based on the by-product being sensed by the second distance sensing module, the at least one processor is further configured to control the display to display the notification related to the emptying of the by-product from the storage container, or to control the speaker to output, as a sound signal, the notification related to the emptying of the by-product from the storage container.

8. The food disposer of claim 1, further comprising a capacitive sensor below an outer circumferential surface of the transfer pipe, wherein the at least one processor is further configured to identify through the capacitive sensor that the by-product in the storage container is full.

9. The food disposer of claim 1, wherein the at least one processor is further configured to:

identify a loading amount of the by-product in the storage container, based on the distance from the distance sensing module to the by-product, which is measured by the distance sensing module; and provide information about the loading amount of the by-product.

10. The food disposer of claim 1, wherein the at least one processor is further configured to:

based on the distance from the distance sensing module to the by-product being less than or equal to the critical distance, control an opening/closing portion to close a discharge port of the disposal assembly in order to prevent a by-product newly produced in the disposal assembly from being discharged to the storage container through the transfer pipe.

11. The food disposer of claim 10, wherein the at least one processor is further configured to:

based on the distance from the distance sensing module to the by-product is greater than the critical distance, control the opening/closing portion to open the discharge port of the disposal assembly so that the by-product newly produced in the disposal assembly is discharged to the storage container through the transfer pipe.

12. The food disposer of claim 1, wherein the at least one processor is further configured to:

based on the distance from the distance sensing module to the by-product being less than or equal to the critical distance, control the disposal assembly not to perform an operation of drying or pulverizing the food in the disposal assembly.

13. The food disposer of claim 1, wherein the at least one processor is further configured to:

obtain additional information including at least one of a signal return value, a lighting recognition return value, or a state code from the distance sensing module; and identify whether measurement data including the distance from the distance sensing module to the by-product is abnormal data, based on the additional information.

14. An operating method of a food disposer, comprising:

measuring, by a distance sensing module, a distance from the distance sensing module to a by-product that is produced by a disposal assembly by drying or pulverizing food and stored in a storage container, the distance sensing module being arrangeable relative to a cover that seals an upper portion of the storage container and spaced apart from a transfer pipe that transfers the by-product from the disposal assembly to the storage container by a certain distance; and outputting a notification related to emptying of the by-product from the storage container based on the measured distance being less than or equal to a critical distance, wherein the distance sensing module is a first distance sensing module and the food disposer further comprises a second distance sensing module arrangeable on one side of the storage container, and wherein the second distance sensing module arrangeable at a certain distance below the cover that seals the upper portion of the storage container and the second distance sensing module is configured to sense the by-product that is accumulated above a height at which the second distance sensing module is located.

15. The operating method of claim 14, wherein the measuring of the distance comprises:

obtaining, as the distance from the distance sensing module to the by-product, an average value of distance values excluding a lowest value and a highest value among distance values measured for a certain time, or an average value of distance values excluding a lowest value and a highest value among a certain number of distance values.

16. The operating method of claim 14 the operating method further comprises:

based on the second distance sensing module sensing that the by-product has accumulated above a height at which the second distance sensing module is located, displaying, on a display, the notification related to the emptying of the by-product from the storage container, or outputting, through a speaker, as a sound signal, the notification related to the emptying of the by-product from the storage container.

17. The operating method of claim 14, further comprising:

identifying a loading amount of the by-product in the storage container, based on the measured distance; and providing information about the loading amount of the by-product.

18. The operating method of claim 14, further comprising:

based on the measured distance being less than or equal to the critical distance, controlling an opening/closing portion to close a discharge port of the disposal assembly in order to prevent a by-product newly produced in the disposal assembly from being discharged to the storage container through the transfer pipe.

19. The operating method of claim 14, further comprising:

obtaining additional information including at least one of a signal return value, a lighting recognition return value, or a state code from the distance sensing module; and identifying whether measurement data including the measured distance is abnormal data, based on the additional information.

* * * * *